(12) United States Patent
Markhovsky et al.

(10) Patent No.: US 7,787,886 B2
(45) Date of Patent: *Aug. 31, 2010

(54) SYSTEM AND METHOD FOR LOCATING A TARGET USING RFID

(75) Inventors: Russ Markhovsky, Edgewater, MD (US); Sergei Osipov, St. Petersburg (RU); Andrey Tiurlikov, St. Petersburg (RU); Sergei Ivaniya, St. Petersburg (RU); Stanislav Markhovsky, St. Petersburg (RU); Evgenii Vityaev, Novosibirsk (RU); Evgenii Mikhienko, Novosibirsk (RU)

(73) Assignee: Invisitrack, Inc., Annapolis, MD (US)

( * ) Notice: Subject to any disclaimer, the term of this patent is extended or adjusted under 35 U.S.C. 154(b) by 1785 days.

This patent is subject to a terminal disclaimer.

(21) Appl. No.: 10/786,144

(22) Filed: Feb. 24, 2004

(65) Prior Publication Data

US 2005/0020279 A1    Jan. 27, 2005

Related U.S. Application Data

(60) Provisional application No. 60/449,702, filed on Feb. 24, 2003.

(51) Int. Cl.
*H04Q 7/20* (2006.01)

(52) U.S. Cl. .................................. 455/456.1; 455/456.5

(58) Field of Classification Search ....... 455/456.1–457
See application file for complete search history.

(56) References Cited

U.S. PATENT DOCUMENTS

| | | | | |
|---|---|---|---|---|
| 5,926,133 A * | 7/1999 | Green, Jr. | ................... | 342/363 |
| 6,738,697 B2 * | 5/2004 | Breed | .......................... | 701/29 |
| 6,785,553 B2 * | 8/2004 | Chang et al. | ............. | 455/456.5 |
| 6,868,074 B1 * | 3/2005 | Hanson | ...................... | 370/328 |

* cited by examiner

*Primary Examiner*—Temica M Beamer
(74) *Attorney, Agent, or Firm*—Bardmesser Law Group

(57) ABSTRACT

A wireless system and method for determining the location of a fixed or mobile target configured to have a transponder on the target, a transceiver monitoring the target location, communicating between the transponder and transceiver, and a processor for finding the target by virtual triangulation based on values of received position information. The processor is determines virtual triangulation based on successive values of the position information using at least three points $P_1$, $P_2$ and $P_3$ of the transponder respective of the transceiver. The present invention discloses methods for finding with virtual triangulation by: (1) finding with virtual triangulation by generating position information in real-time, in the case of (i) stationary and moving target, and or (ii) in the case of the presence of obstacles; (2) finding with virtual triangulation relating to the average speed of the motion of operator; and or (3) finding with simplified virtual triangulation.

131 Claims, 30 Drawing Sheets

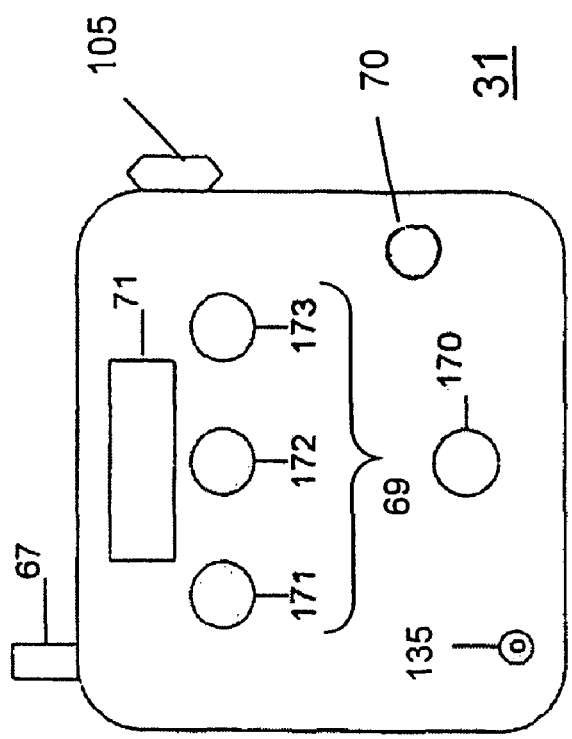
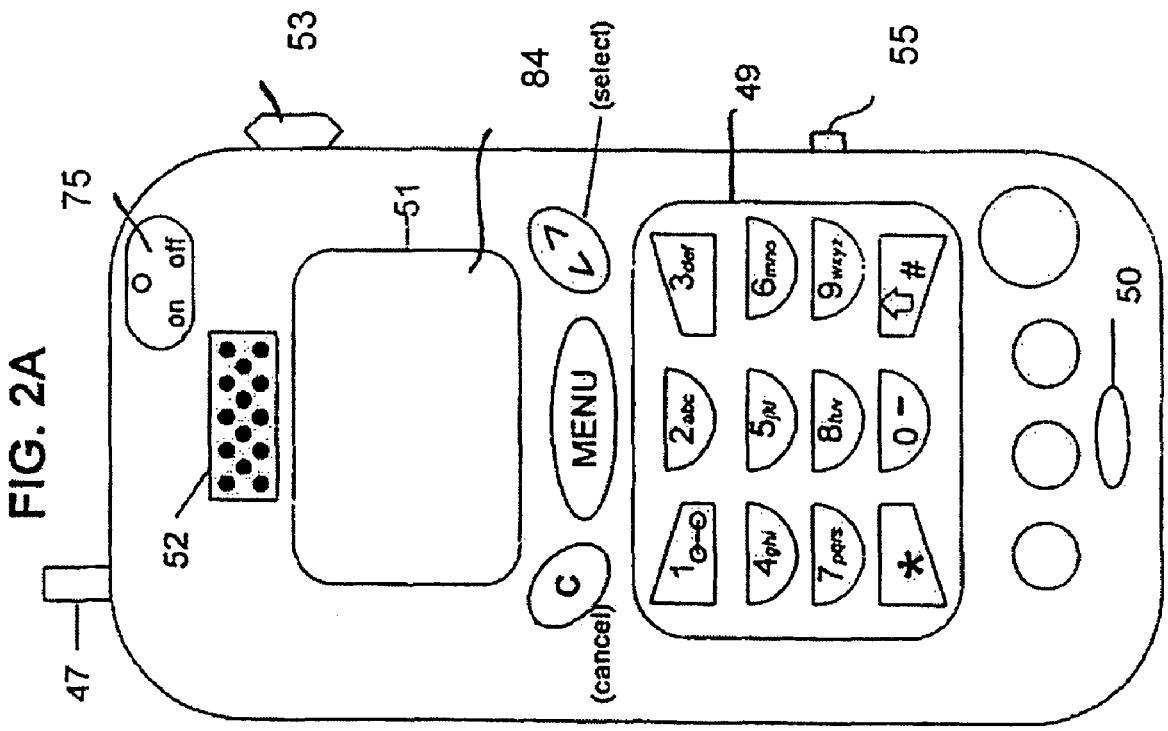

DISTANCE/TIME MEASUREMENT SEQUENCE - OPTION 1

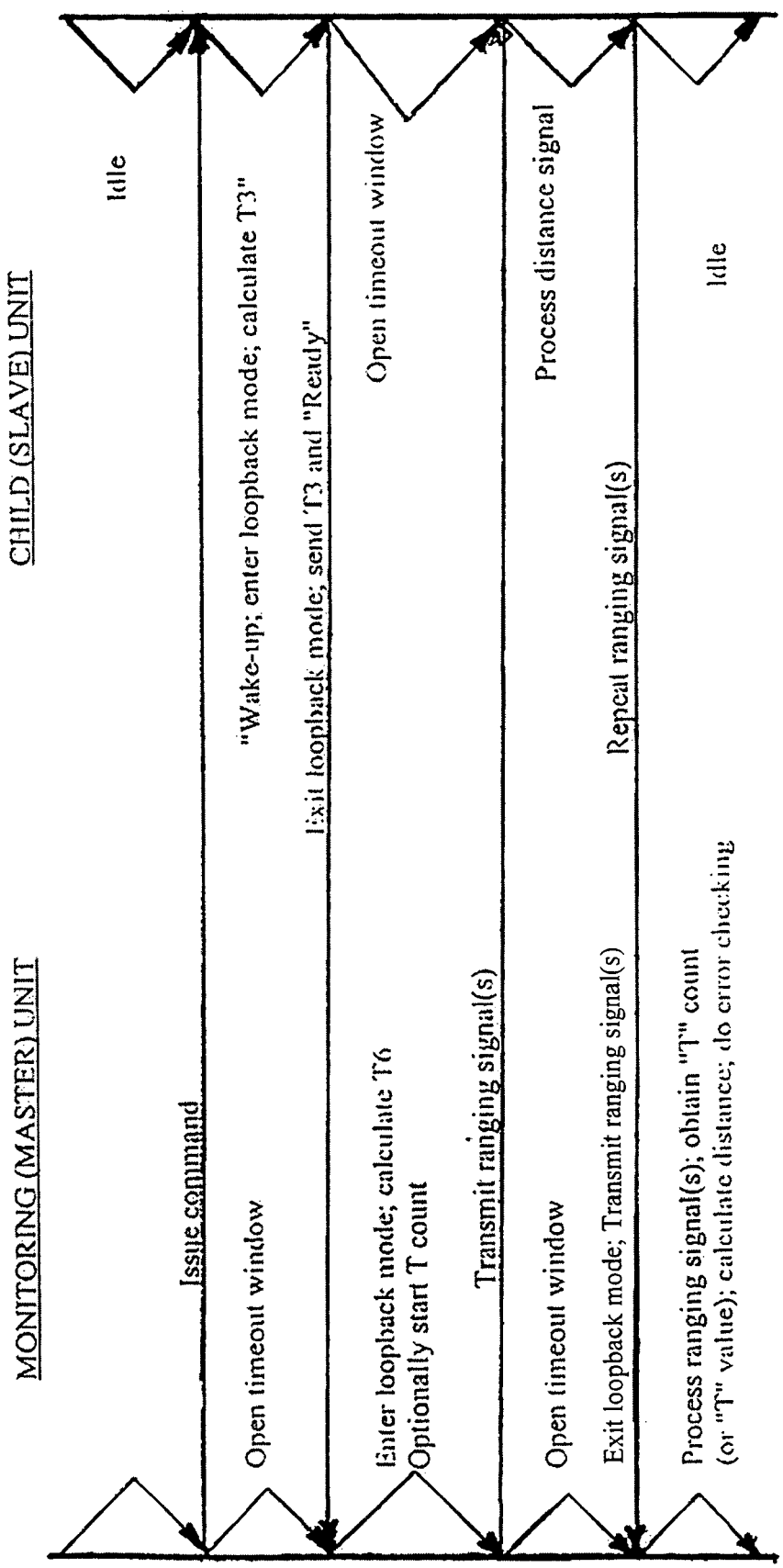

Position Determination Example

Position Determination Ambiguity

SYSTEM AND METHOD FOR LOCATING A TARGET USING RFID

This application claims the benefit of U.S. Provisional Patent Application No. 60/449,702 filed Feb. 24, 2003.

BACKGROUND OF THE INVENTION

1. Field of the Invention

The present invention relates generally to locator systems and techniques, and more particularly, to finding systems for determining the location of objects and/or subjects.

2. Description of the Related Art

Most systems for locating a subject or object employ the use of direction locating antennas to determine the position of the subject. However, such locating systems are characterized by shortcomings associated with the size of the antenna at the bandwidth that is optimal for the application. Direction locating antennas experience significant degradation of directional capabilities in close range conditions wherein the separation between a search unit and a target is about several hundred feet or less.

It is well known that there is a correlation between antenna size and RF wavelength. A larger antenna is needed for a longer RF wavelength. The need for small antenna size forces the selection of relatively high frequency bands of 900 MHz and higher where there is a lot of interference in the form of reflections and where there is considerable signal degradation as the signal passes over small objects or obstacles. In short, relatively high frequency bands are not suited for searches where the separation between the search unit and the target is greater than a hundred feet.

Moreover, the use of directional antennas precludes coordinated searches wherein several search units are homing in on a target or are tracking multiple targets. The use of directional antennas also precludes monitoring a plurality of subjects at the same time because a monitoring unit employing a directional antenna cannot receive and transmit signals in multiple directions. Because of significant directional errors that are associated with directional antennas, the operator also is required to have special skills in performing the search, i.e., locator systems employing directional antennas are not user friendly.

Known locator systems rely on distance measurement to determine the separation between a monitoring unit and a subject whose location is being monitored. Distance measurement generally is carried out either by measuring signal strength or by measuring the propagation time between sending a ranging signal and receiving a ranging signal. Examples of systems that use signal strength to determine distance to locate a subject are disclosed in U.S. Pat. No. 5,086,290 and in U.S. Pat. No. 5,650,769, for example. Systems that rely on measurement of signal strength are prone to be unreliable due to noise, interference, signal strength changes, reflections, etc. as well as signal degradation as the signals pass over obstacles. Moreover, measurement error is a function of signal strength, whereby large signal attenuation typically occurs within a building as opposed to outside of a building. In these systems accuracy of measurement is distance dependent, whereby if the distance change is small such systems function appropriately, although, they are known to be less accurate at larger distances.

Another system disclosed in U.S. Pat. No. 5,525,967 uses timing to determine distance. Time measurement does not rely on signal strength and is immune to the signal attenuation. Also, the distance measurement error is constant and does not distant depend signal attenuation. Some of the known time measurement locator systems rely on variations of directional antennas, for example a phase array antenna. Such variations allow the reduction of antenna size. However, the price for these improvements is a complex antenna design and an extremely complex signal processing requirements, which result in a lower accuracy, higher cost and power consumption. Also, such antennas are subject to operating frequency limitations and require a wide bandwidth. Known distance measurement systems that employ time-measurement techniques require a large bandwidth in order to achieve a desired accuracy. This results in increased interference, higher circuit complexity and power consumption as well as higher cost. Wide bandwidth requirements also limit the number of devices that can operate simultaneously within a given band. These devices have wide bandwidth requirements that have particular disadvantages such as, for example, such devices cannot operate on business or otherwise unlicensed bands that prohibit ease of the units to transmit and receive in an unregulated environment, limit the units from being sold "over the counter" or integrated with mass-produced popular hand-held radios.

In U.S. patent Publication No. 2002/0155845, a position location system is disclosed that uses spread spectrum technology for determining range information in a severe multi-path environment. The system uses ranging processes wherein ranging pulses at eight different frequencies within a band are exchanged between a master radio unit and each of at least four reference radio units. The position and velocity information obtained by the ranging process enables determination of the position of the master radio's position in three dimensions. This system uses a variation of time-measurement based techniques for distance determination. As a result, it carries all of the drawbacks mentioned above plus its operation frequencies and or bands are limited. The system does not employ a directional antenna. Instead, it uses additional four fixed references with known coordinates, or four mobile references that have their coordinates continuously updated via GPS or manually. This system allows simultaneous operation of many units. In this system, the usage of a directional antenna is eliminated. However, the system has disadvantages that include adding a complex infrastructure requiring multiple references, fixed and or mobile, that all include GPS or otherwise need continuous manual updating of coordinate data; limited operating band; increased complexity of the system both technological and logistical; cost; and power consumption. As a result, the system has a very narrow usage in specialized applications. The present invention overcomes such disadvantages of the prior art to provide methods and devices for finding subjects and objects that reduce and or eliminate the infrastructure overhead, for example, the present invention operates without (i) usage of a directional antenna, (ii) any position references, and or (iii) operating band limitations so as to lower the complexity of the system and the overall cost of the devices.

SUMMARY OF THE INVENTION

A wireless system and method for determining the location of a fixed or mobile subject or object includes a transponder disposed on the target, a transceiver for monitoring the location of the target, a wireless communication system operating on at least one Radio Frequency (RF) band configured to allow communication between the transponder and the transceiver, and a processor configured to find the target by virtual triangulation based on values of position information received from the transponder and the transceiver. The processor is configured to determine virtual triangulation based on successive values of the position information using at least three points $P_1$, $P_2$ and $P_3$ of the transponder respective of the transceiver. The processor can include a successive pattern movement technique configured to find the target by correcting the direction to the location of the target T based on the values of the position information. The processor can also determine the position of the target based on the average speed of the motion of the user of the transponder respective of the transceiver. Furthermore, the processor can determine virtual triangulation based on successive values of the position information from user input on the transceiver.

The present invention uses various methods, software, and techniques for finding the target T ("finder" techniques) based on one or more position determination principles including determining the position of the target using virtual triangulation between the master or monitoring unit and at least one target T, whereby the monitoring device $M_s$ measures the distance between it and the slave unit and, alternatively, in addition to measuring the distance between itself and the slave unit, between itself and another monitoring unit, or the monitoring device $M_s$ measures the distance between its own successive locations.

The present invention relates to several methods for finding with virtual triangulation relates including: (1) finding with virtual triangulation by generating position information in real-time, in the case of (i) stationary and moving target, and or (ii) in the case of the presence of obstacles; (2) finding with virtual triangulation relating to the average speed of the motion of operator; and or (3) finding with simplified virtual triangulation, whereby the user-device interaction is minimized—eliminating the need for monitoring device $M_s$ to measure the distance between its own successive locations as well as the user's signaling to the monitoring or master unit when in motion or during stops.

The present invention is further configured to provide the method for finding by virtual triangulation as well as for finding using a mobile network on a computer-readable medium having stored thereon a plurality of sequences of instructions, which plurality of sequences of instructions including sequences of instructions, when executed by a processor, cause said processor to perform the steps of determining a value of a point $P_1$ from position information received by a transceiver corresponding to a location of a transponder disposed on a target. The user is prompted for a transceiver or a predetermined transceiver to move to a point $P_2$ relative to a location of the target. Another value of a point $P_2$ is determined from position information of the transceiver or predetermined transceiver corresponding to a location of the transponder. Another request is made for a value of a point $P_3$ of the transceiver or of point $P_2$ of the predetermined transceiver corresponding to a location of the transceiver or the predetermined transceiver. The target is found using virtual triangulation principals in accordance with each of said values for said points $P_1$, $P_2$ and $P_3$.

DESCRIPTION OF THE DRAWINGS

These and other advantages of the present invention are best understood with reference to the drawings, in which:

FIG. 2A a simplified representation of the master unit of FIG. 2;

FIG. 3A a simplified representation of the slave unit of FIG. 3;

FIG. 4B is a timing diagram illustrating the states sequence of the master and slave units of the tracking and locating system of FIG. 1, including a second calibration option;

FIG. 6A is a functional block diagram of the slave unit of FIG. 3, and FIG. 6B is a simplified representation of the allocation of frequency ranges of the modulation bandwidth to allow multiplexing of voice, ranging signals and data transmission for the RF mobile tracking and locating system of FIG. 1;

DETAILED DESCRIPTION OF THE PREFERRED EMBODIMENT

Figure 1:
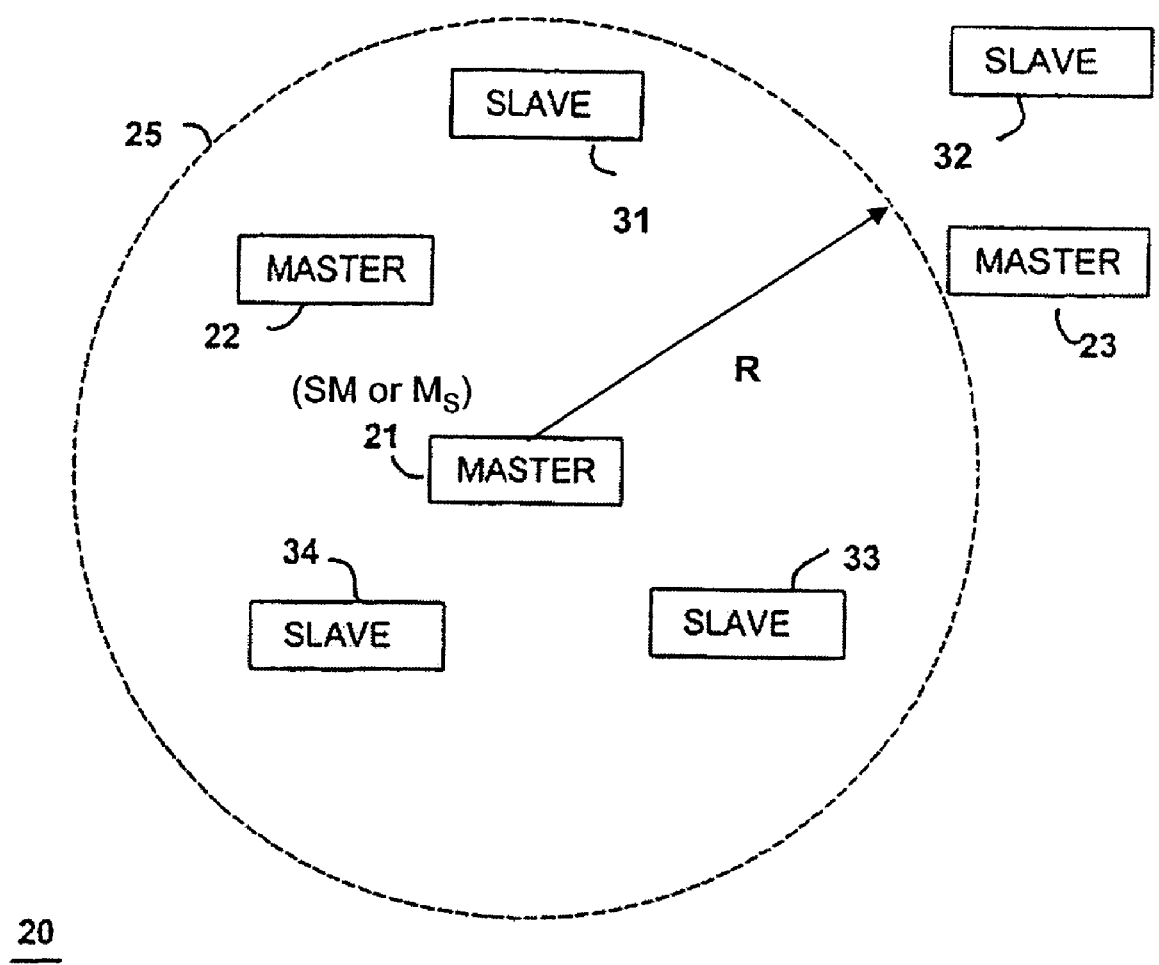
FIG. 1 is a simplified representation of an RF mobile tracking and locating system provided by an embodiment the present invention.

Referring to FIG. 1, a tracking and locating system 20 is illustrated according to an exemplary embodiment of the present invention for finding, locating, monitoring and or tracking of at least one target (T) that can be animate or inanimate, or both. The tracking and locating system 20 and method is described herein in several exemplary embodiments that have application for finding the location of a target T and or for allowing tracking of numerous targets T in different contexts. The method and system of the present invention is not limited to such enumerated exemplary embodiments in the different contexts as it should be appreciated that techniques and devices of the tracking and locating system 20 can be used for tracking and locating other animate things and or subjects such as pets and other animals. The method, techniques and tracking and locating system 20 can be used in locating inanimate things and subjects such as keys, eyeglasses, wallets, purses, portable telephones or cell phones, remotes for television sets, video cassette recorders and digital video disc players, and generally any item, particularly those carried by a person that may be prone to misplacement. In addition, the tracking and monitoring system 20 can be used for to find, track and monitor mobile targets T such as, for example, tagged animals, personnel, waste management, inventory, time and attendance, postal tracking, airline baggage reconciliation, toll road management, transportation and logistics, manufacturing and processing, inventory or supply chain management, as well as security and surveillance. In other embodiments, the method, techniques and tracking and locating system 20 also can be combined with GPS, Wi-Fi, Bluetooth and other wireless technology for further advantages such as adding capabilities techniques and devices of the tracking and locating system 20 to reduce the workload and steps of a user in the finding, tracking or monitoring function.

The tracking and locating system 20 includes at least one master or searching monitor ($M_s$), such as master units 21, 22, and 23 and at least one slave unit such as slave units 31, 32, 33 and 34, and in an alternative exemplary embodiments, combinations of monitoring, master and slave units as is described herein. The master units 21, 22, and 23 are generally configured to operate as a transceiver. The slave units 31, 32, 33 and 34 are generally configured to operate as a transponder. Each of the master units 21, 22, and 23 and slave can have added functionality as is described herein. Each of the master units 21, 22, and 23 and slave units 31, 32, 33 and 34 are configured to have a unique identification (ID) or tag to identify and distinguish from each other. For purposes of this detailed description, once the unique identification (ID) or tag is disposed on a subject or object, such object or subject can be a Target (T) to be monitored, tracked, located and or found by the techniques employed by the present invention whether the tag is located in a slave unit, or alternatively a master unit.

The master units 21, 22, and 23 are configured generally for monitoring, tracking and locating each other and or slave units 31, 32, 33 and 34, as each master or slave unit can be disposed on a user or one or more targets T. The master or slave unit are generally are secured, carried, worn or otherwise affixed to targets T such that they do not separate readily from the target T. Communication between the master units and the slave units is carried using RF signaling techniques on separate bands or on one band utilizing various techniques such as spread spectrum or spread signal to lower the possibility of detection and efficiently utilize the bandwidth of the particular band.

In operation, master and slave units can be disposed and located anywhere with the position of any one master or slave unit being located if such unit is within the communicating range of the master unit and or slave unit in the manner described herein to convey position and range related information. A user can hold or wear the master unit 21 and the slave unit 31 can be disposed on an object or subject such as, for example, a person can carry the master unit 21 and the slave unit 31 can be carried or worn by another person such as a child, or other target, whose location is to be monitored and, if necessary, is to be located and found. Additionally, a group of subjects having master units can form a mobile network to track master and slave units disposed on each subject and or objects, which may operate as a waypoint, an obstacle to be avoided, or as an object to be retrieved.

The master units can be configured so as to monitor slave units to determine whether the slave units are within a preset or programmed range such as, for example, a value of the range of monitoring of a master unit is set to be ten to thirty meters. Referring to FIG. 1, the circle of radius R represents and illustrates the range 25 of the master unit 21 which is located at the center of the circle, thereby indicating the predetermined range 25, relative to master unit 21. The slave units 31, 33 and 34 are within the predetermined range 25. Sometimes a slave unit 32 will be located outside of the predetermined range 25 relative to master unit 21. However, the slave unit 32 can be located nonetheless within the predetermined range of other master units such as, for example, master unit 23 and master units 21 and 23 can communicate and locate the slave unit 32 using the techniques of the present invention. It should be appreciated that such permissible range 25 is not the receiving range, but rather represents an allowable separation between a values of the location of a slave unit 32 relative to the master unit 21.

In the exemplary embodiment, each master unit can communicate with the four slave units 31 through 34 to determine the position of each of the slave units. The master unit transmits a ranging signal to the slave units and receives reply ranging signals from each of the slave units. As above, each master and slave unit is configured to have a unique identification code or address so as to make each master and slave unit addressable individually. Master and slave units can operate on the same frequency or, in other exemplary embodiments described herein, different frequencies are used for transmitting from the master units to the slave units and transmitting from the slave units back to the master units. This configuration allows for full-duplex audio, video and data message transmission and or communication and provide additional advantages such as improved position measurement accuracy and lower device complexity as described herein.

Moreover, the tracking and locating system 20 also can provide for voice communication either bi-directional or unidirectional from the master units to the slave units. However, in another exemplary embodiment, the slave units do not have a speaker or microphone. However, in such embodiment, the slave units can be adapted to receive a headset and or microphone, for example, allowing bi-directional voice communication.

Each master unit, such as master unit 21, operates to determine periodically the distance between the master unit and each of the slave units 31-34 by sending a ranging signal to the slave units. The slave units 31-34, such as slave unit 31, transmit responsively a reply ranging signal back to the master unit 21. The master unit 21 responds to the reply ranging signal received from the slave unit 31 and measures the time elapsed between the transmission of ranging signals to the reception of the reply ranging signal from a slave unit.

In another exemplary embodiment, a processor or signal processing unit of the master unit 21 determines the time of each signal such as, for example, a value of the time that the ranging signal was sent by the master unit 21 to the target unit 31. Once a value of the elapsed time is determined, together with a value for the time of incidence of the ranging signal, the processor determines a value of the distance between the slave unit 31 disposed on the target and the monitoring or master unit 21. The distance is determined by taking the elapsed time, i.e., the total time for a ranging signal originated by the master unit 21 to travel from the master or monitoring unit 21 to the slave or target unit 31 and a reply ranging signal originating from the slave unit 31 to travel back to the master or monitoring unit 21, less a value for error correction determined from several factors such as, for example, an offset amount indicative of internal delays of the slave or target unit 31 and the master or monitoring unit 21. The propagation delay within the master and slave units becomes a problem for short distances such as a few hundred meters or less. The RF signal is transmitted at the speed of light in air, but its transmission is slower in the electronic circuits of the master unit 21 and the slave unit 31 due to propagation delays, which vary by temperature, supply voltage, time and the like. The present invention determines this factor for the value for calibrating units to determine the propagation time through the master and slave units to determine a value of error correction or offset time, which is subtracted from the total time in making distance calculations. The value of the offset time can be determined using a calibration and or loop back procedure as will be described herein. Also, in order to increase the accuracy of a single measurement, the ranging signal may traverse continuously between master and slave units more than once before a measurement is made, as will be described.

The ranging signal propagation time can be measured directly or indirectly. In other embodiments, ranging signals are successively transmitted and the tracking and locating system uses detection of phase shift between successive ranging signals. One example of such indirect measurement is measurement of a value of a ranging signal phase shift. The phase shift is proportional to the distance traveled by the ranging signal as well as the value of error correction or offset time for propagation delays in the electronic circuits of the master and slave units. The value of error correction or offset time propagation delays in the master and slave units are determined using a calibration procedure.

The calibration procedure of the operating cycle is continuously tested by measuring the delay time (i.e., "calibrating" or periodically testing the master and slave units) to determine the signal propagation time through each unit. Calibration procedure is determined periodically such as, for example, at the time each unit is powered up, at the beginning of each transmission or calibration also can be carried out on a periodic basis during operation to achieve improved performance.

Referring again to FIG. 1, according to an exemplary embodiment of the present invention, if slave unit 32 moves out of the allowable range, master unit 21 can enter automatically a search or homing mode. In the search or homing mode, the master unit 21 uses a technique termed "virtual triangulation" or, simple, establishing its own reference points, to determine the location of a slave unit, which can be utilized whether the slave unit is in or is out of the allowable predetermined and or permissible range, for example, slave unit 32 as is shown in FIG. 1. Virtual triangulation advantageously allows the searcher to home in on the slave unit 32 without need of additional references, whether fixed or mobile. The technique of virtual triangulation of the present invention results in higher accuracy and the improved "outcome" of finding the target quickly.

The technique of virtual triangulation is involved in various applications to demonstrate the capabilities of the present invention. For example, the slave unit 31 can be stationary, or substantially stationary, or moving at a speed that is comparable with the speed capability of the master unit 21 in which case the location and tracking of the slave unit 31 can be determined using a single master unit 21, which will be termed the searching master or monitoring unit ($M_S$). The user operating the master unit 21 as a monitoring unit $M_S$ moves in a pattern and periodically checks to determine the target T position relative to the user. The master unit 21 through an interface gives instructions to the user, in order to correct the path of movement in accordance with the technique of virtual triangulation. Alternatively, according to another embodiment of the present invention, the monitoring unit requests input from other master units queried by the monitoring unit $M_S$ thereby locating the slave unit 31. It will be appreciated that, of course, at the same time, the master unit 21 can monitor, determine the location of, and or track other targets T.

In addition, one or more of the master units, such as master units 22 and 23, whereby unit 25 is represented as out of range, can function as a fixed or mobile position reference for the master unit 21 and can be queried in determining the location of a slave unit, such as slave unit 31. Such coordinated effort of the master units 22 and 23 allows for efficient and effective determination of the location of the slave unit 31 relative to a master unit 21 when the subject is stationary, out of the predetermined range, fast moving or otherwise is in motion relative to the master unit 21. In other embodiments of the present invention, a plurality of master units, such as master units 22 and 23 (that will come in and out of range 25 depending on the movement of master unit 21), can be used as position reference units in determining the location of a slave unit, such as slave unit 31, with the position reference units being fixed or movable with respect to the master unit 21 that originated the finding of the target T operation. Also, as is described in another method of the present invention, the monitoring unit $M_S$ can use stationary slave unit(s) that can be employed as a fixed reference.

In another exemplary embodiment of the present invention, the technique of the monitoring unit $M_S$ querying other master units is a useful method to find the target T, especially if a target being tracked moves out of the range of a monitoring unit that has principal responsibility or is principally engaged with tracking such target. Such monitoring unit may nonetheless find such target by making a request to other master units, fixed or mobile, as to whether the target is in their communication range so as to find the target. For example, the technique of the monitoring unit $M_S$ querying other master units for finding a target in a network of master units, fixed or mobile, can be accomplished by the monitoring unit requesting a list of targets (ID's) in the range of each master unit within the communication range of the monitoring unit. Once a master unit receives the request from the monitoring unit and determines the targets in the range and their unique identification. Once a list of the targets is identified in the area of the particular master unit receiving the request, the master unit responds by sending signals concerning each identified target to the monitoring unit. The monitoring unit can identify the particular target such as, for example, from the ID or from last known position and rate information correlated with the position of the master unit sending the list, thereby locating the target. The method is adaptable such that the monitoring unit can hand off the principal responsibility of monitoring such target to a desired master unit so as to create a dynamic locating and tracking network.

Moreover, the monitoring unit $M_S$ can utilize other position information, according to an additional embodiment of the virtual triangulation technique, such as the time of arrival of ranging signals transmitted between a master unit 21 and slave units to determine a value of the measured distance to each slave unit 31, 33 and 34 with respect to master unit 21. If any of the slave units move out of the permissible range of the master unit 21 such as, for example, if slave unit 31 should move to the position occupied by slave unit 32, the master unit 21 can be configured to enter a search mode using virtual triangulation to determine from the range measurements provided by the master unit 21, the relative location between the master unit 21 and the slave unit 32 currently out of range.

In another embodiment where the slave unit 31 is moving relative to the master unit 21, a plurality of fixed position reference monitoring, master or slave units, such as master units 22 and 23 (if in range 25) or fixed slave units (not shown in FIG. 1), can be used to provide position reference points, allowing the user of master unit 21, or another single unit, to determine the location of the target associated with the slave unit 31.

In a further embodiment in which the slave unit 31 is moving fast with respect to the master unit 21 capabilities, a plurality of mobile position reference units are used to define references that can be used by the master unit 21 to determine the location of the target. Preferably, the mobile position reference units are master units 22-23 or other units configured as a transceiver. In this embodiment, the master units or other transceivers provide the reference signals as well as the master unit 21 used to locate target T can be moving with respect to the target T and with respect to other units. This mode of operation allows coordinated searches and or movement where several master units are homing in on a target, or are tracking multiple targets while, at the same time, monitoring other targets such as those associated with slave units 32-34.

In another exemplary embodiment of the technique of virtual triangulation, the monitoring unit $M_S$ can be configured to utilize additional channels or frequency bands for position information and or communication purposes, for example, the ranging signal includes frequency modulated RF signals transmitted in four channels, one channel for each of the slave units 31-34, and receive reply ranging signals on such channels or on another band. Voice and other communications can be on another band, sub channel or portion of a channel. Alternatively, as is apparent to those skilled in the art, the master and slave units can transmit in the same frequency bands using a time division multiplexing arrangement or spread spectrum techniques.

It should be appreciated that although the foregoing general description makes specific reference to master unit 21 and slave unit 31, each of the other master units, such as master units 22 and 23, can function in the manner described for master unit 21, and the slave units 32-34 can function in the manner described for slave unit 31. Moreover, the master and slave units are configured to serve as a position reference unit such as, for example, master units 21 and 23 operate in a search as fixed or mobile position reference units for master unit 22 and, similarly, master units 21 and 22 can serve as fixed or mobile position reference units for master unit 23.

While only four slave units are shown and discussed in the exemplary tracking and locating system 20 illustrated in FIG. 1, a command and control system can be configured so as to track and locate multiple master and slave units whereby one monitoring unit is designated as the command unit. In applications where it is necessary to monitor multiple units, the number of transmission channels available in the exemplary embodiment of the present invention can be exhausted. In such an application, the tracking and locating system 20 can be configured to be scalable so as to provide multiple time slots or to provide additional transmission channels to allow for expansion of the tracking and locating system 20 so as to increase the number of master and slave units—to potentially an unlimited number of units. Moreover, interference between two or more master units in same zone is possible, whereby the tracking and locating system 20 can be adapted to account for multiple master units in same zone by assigning different frequency channels to master and slave units, employing time division multiplexing as well as various standards, such as CDMA, or standard and or proprietary communications protocols.

In the embodiment of the invention concerning the command and control unit, the location of the master and slave units and all related information can be reported by the query technique to one or more monitoring units $M_S$ designated as a control and command unit. The control and command unit can display, process and analyze the mobile network topology dynamically in real-time, including position information of the units in a particular area such as a geographic area. The control and command unit can be configured to alert the user if a particular unit is unaccounted for, outside of the predetermined range, or otherwise is out of certain predetermined location or signaling parameters. The control and command unit can be configured to enter a search or homing mode to allow a monitoring unit $M_S$ queried by the control and command unit to search for a particular master or slave in the geographic area. As master units are routing the information about other master units and their targets, the command and control unit can limit the ability of a routing master unit to convey this information to its operator. The control and command unit advantageously can be configured to purposefully limit visibility of certain units in the field to other units in the field by manipulation of data tracked by a database as well as display techniques supported by data values generated in the query technique such as, for example, the monitoring unit $M_S$ passes specific information in query technique to some units but to other units. For higher reliability the command and control unit can be made redundant. In such an embodiment, if necessary, additional processing capability can be configured into the control and command unit or by connecting a monitoring unit designated as the command and control unit to a computer through Ethernet, wireless, Bluetooth or other WiFi communication schemes such as, for example, WiFi Protocols 813.11a,b or g.

Master or Searching Monitor Unit

Figure 2:
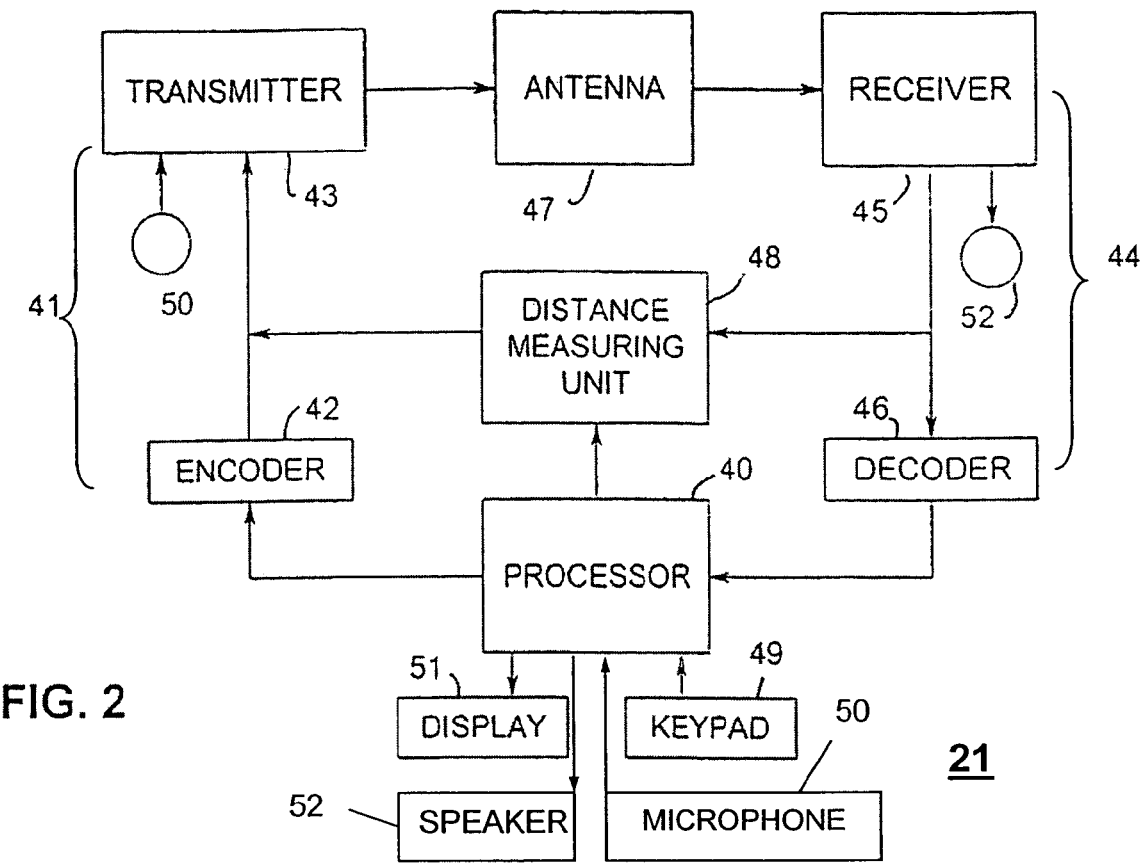
FIG. 2 is a block diagram of a master unit of the RF mobile tracking and locating system of FIG. 1.

Referring to FIGS. 2 and 2A, FIG. 2 is a block diagram of an exemplary embodiment of the circuitry of the master unit 21 and, similarly, FIG. 2A is an exemplary embodiment of the physical arrangement of the master unit 21, whereby master units 22-23, as shown in FIG. 1, being configured and operating the same as master unit 21 except for the unique identifying address. The master unit 21 is a transceiver unit that includes a processor 40 for processing data signals, a transmitter section 41 that includes an encoder circuit 42 and a transmitter 43, a receiver section 44 that includes a receiver 45 and a decoder circuit 46, and an antenna 47. In addition, the master unit 21 includes a distance measuring unit 48. The master unit 21 further includes input devices such as, for example, a keypad 49 and a microphone 50, which can be used for voice activation of the processor 40 or for sending a voice transmission to a designated slave unit through the transmitter 43, and output devices such as, for example, a display unit 51 and or a speaker 52. The master unit 21 also includes a Step button 53 and a jack 55 for allowing the operator to use a headset including a microphone and an earphone to hear audible prompts and voice communications. A switch 75 enables the operator to hear synthesized commands generated by the data processor 40 and applied to the speaker 52.

The microphone 50 and the speaker 52, which advantageously may be configured as a headset, comprise an interface to allow for audio communications such as voice communication at least with the other master units, and provides the user's with an audio interface for to send and receive audio instructions from the master unit to other master units or to a slave unit. The keypad 49 provides an interface for the entry of data and commands to the master unit. For example, the Step button 53 is used by the user for entering reference point indications that are indicative of how far the user has walked between reference points during a homing operation when a first search method is being used in accordance with the present invention. The display unit 51 shows the status of a homing operation, provides instructions to the user and other information. The display unit 51 also can display a grid that shows the relative location of master unit 21 with respect to other master or slave units of the tracking and locating system 20.

The master unit 21 and the slave unit 31 can operate at different frequencies or bands to efficiently track a target T. Preferably, the tracking and locating system 20 of the present invention uses publicly available frequencies such as, for example, the FCC business or unlicensed bands. The wireless tracking and locating system 20 of the present invention can operate on different frequencies to determine using master and slave units 21 and 31, respectively, the location of a target T, for example, one frequency is utilized for transmitting from the master unit to the slave units and another frequency is used for transmitting from the slave units back to the master unit. In still yet another embodiment of the present invention, position ambiguity can be resolved advantageously by master and slave units operating on different frequencies for transmitting from master unit to slave units in a predetermined operating range, for example, the master and slave units operate on a low frequency when the units are large distances apart, and the units are configured to switch to a higher frequency when the units are short distances apart to aid in resolving position ambiguity. Utilizing multiple frequency bands has the advantage of increasing the accuracy and overall efficiency in the locating of the units utilizing multiple RF bands such as, for example, for power consumption, manufacturing cost, tracking and the like as is discussed herein.

In such an embodiment of the present invention, the master unit 21 operates in frequency bands of 150 MHz and 460 MHz, whereby a master unit 21 transmits in the 150 MHz band and receives in the 460 MHz band and is configured for simultaneous operations of transmitting and receiving. Similarly, slave units transmit in the 460 MHz band and receive in the 150 MHz band, such as slave unit 31 shown in FIGS. 3 and 3A, whereby such configuration increases the accuracy of distance measurement. In addition, such configuration supports full duplex in audio communications, for example, a push-to-talk button is not needed. In another embodiment, the operating or carrier frequencies for master and slave units are configured in other frequency bands in the RF range, other than the 150 MHz and 460 MHz frequency bands, for example, other GHz frequencies, frequencies in the infrared, microwave or ultrasonic bands.

Slave Unit

Figure 3:
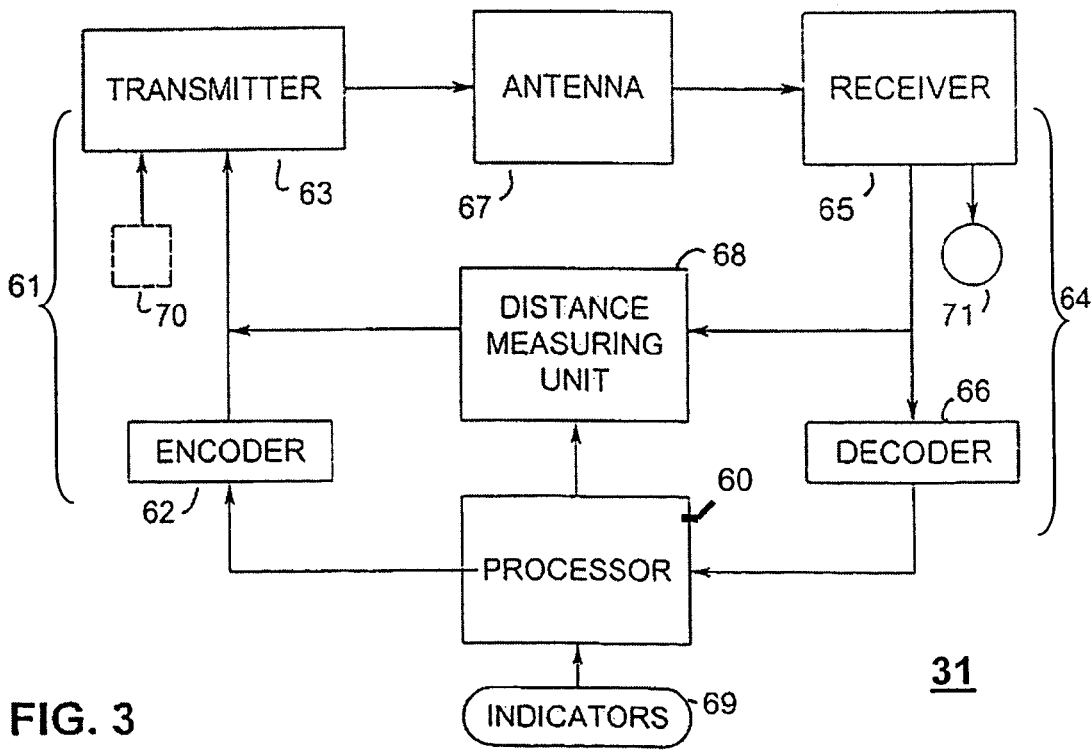
FIG. 3 is a block diagram of a slave unit of the RF mobile tracking and locating system of FIG. 1.

Referring to an exemplary embodiment of the present invention, the circuitry of the slave unit 31 is illustrated in FIGS. 3 and 3A, FIG. 3 in a block diagram format. FIG. 3A illustrates the physical packaging of a slave unit, for example slave units 31-34 of FIG. 1, each having a unique identifying address. The slave unit 31 is configured as a transponder configuration and, as similar to the master unit 21, includes a processor 60 for processing data signals, a transmitter section 61 configured with an encoder 62 and a transmitter 63, a receiver section 64 configured with a receiver 65 and a decoder 66, an antenna 67, and a distance measuring unit 68. The slave unit 31 does not include a microphone, as shown in FIG. 3, however it includes a speaker 71 for receiving voice communications from master units. In another embodiment, the slave unit 31 can also include a microphone 70, shown by the dashed line, to allow bi-directional voice communication with the master unit, as desired for a particular application, for example, the slave unit can include a jack 105 to allow use of a headset for the communication functions. The slave unit 31 further includes a plurality of indicators 69. The slave unit can also include a switch 125 that enables an individual to hear synthesized commands generated by the data processor 40 and applied to the speaker 52. A voice communication request button 170 enables the user to signal a monitoring unit if voice communication is desired. The master and slave units, 21 and 31, respectively, as shown in FIG. 3, are configured with similar transmitter and receiver sections, however, since the master unit 21 provides control and monitoring functions the transceiver includes additional components such as the interface components of the keypad 49 and the display unit 51.

Implementation of the Master and Slave Unit Circuitry

Referring to FIGS. 2 and 3, the data processing and control functions of the master and slave units can be implemented either in hardware or real-time firmware, or both. In each case, a digital architecture can be utilized advantageously for reduced power consumption, digital communications, and data manipulation to operate synchronously each unit using a common clock as a source of synchronization. Furthermore, the propagation delay of data signals through such synchronous hardware designs tend to stay constant, i.e., a data signal propagation does not change with temperature, supply voltage variations, or the like. As above, a value for the error correction relating to a propagation delay can be determined from simulations, loop back or a direct measurement. A crystal controlled oscillator can generate the clock signal and is selected for accuracy and stability, for example, accuracy to 0.001%.

Similarly, the data encoder 42 of the master unit 21, the data encoder 62 of slave unit 31, the data decoder 46 of the master unit 21, and the data decoder 66 of slave unit 31 can be configured to include synchronous hardware and to exhibit constant propagation delay properties. The data encoders 42 and 62 and the data decoders 46 and 66 can be implemented in real-time firmware as a part of the data processing and control block functionality.

A value for the error correction relating to the propagation delays of the transmitter sections 41 and 61 and the receiver sections 44 and 64 will change significantly with temperature, supply voltage variations or the like. Error correction values are taken to monitor such the variations in the delay times associated with the processing time of master unit 21 and slave unit 31. The processing time of master units is referred to herein as time $T_6$ and the processing time of slave units is referred to herein as time $T_3$. It should be appreciated that throughout this description certain representations for the capital letter T have been adopted for clarity, whereby (T) represents various time intervals of exemplary embodiments when it is followed by numerals such as, for example, $T_1$, $T_2, \ldots, T_n$ and (T) represents particular a Target when it is followed by alpha characters such as, for example, $T_A$, $T_B, \ldots, T_{2*n}$.

Data Transmission Packet Format

Figures 3B, 3C, 3D:
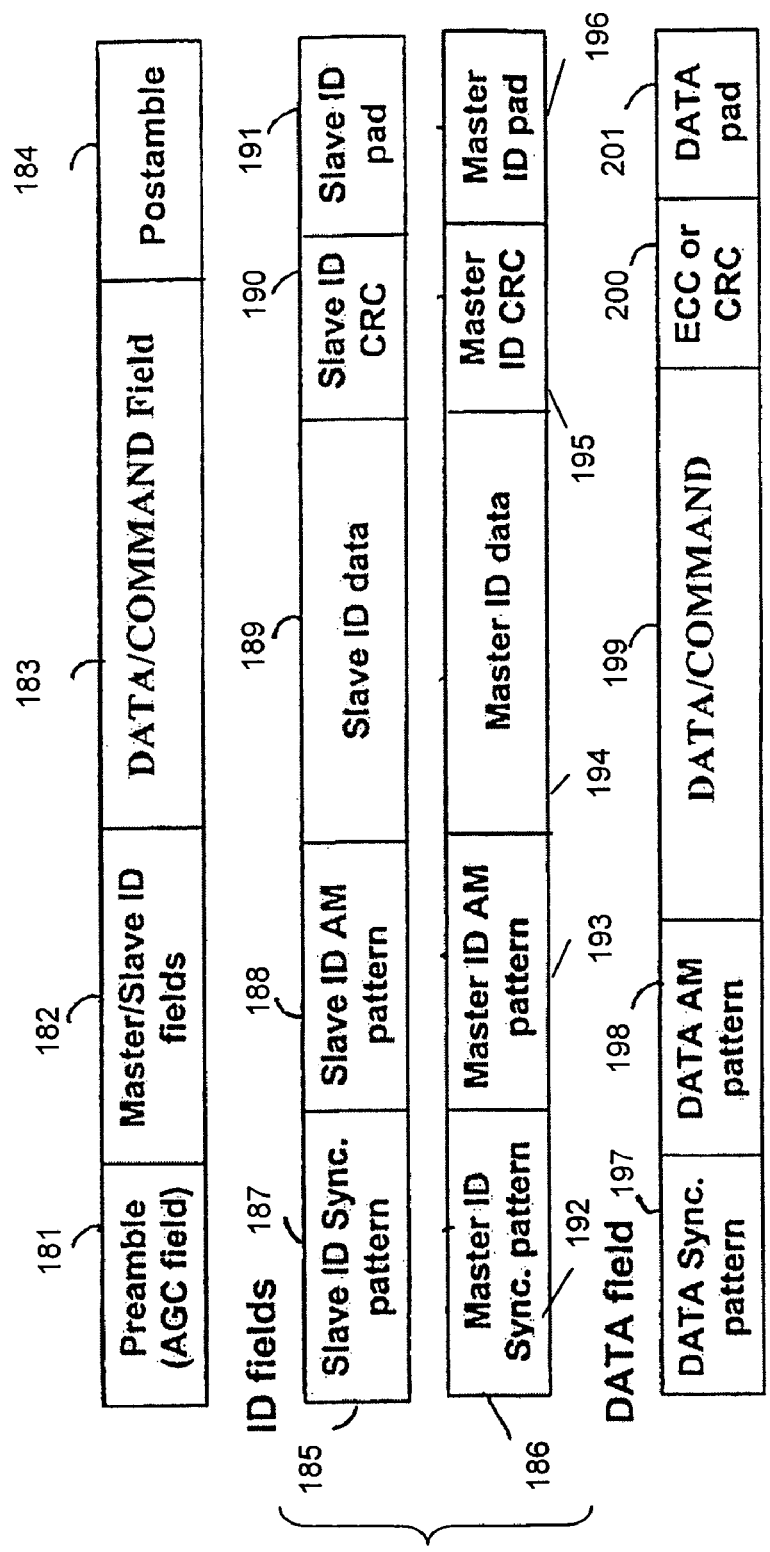
FIG. 3B illustrates the format for data packets used for communications between the master and slave units.
FIG. 3C illustrates the format for identification fields for the data packet format of FIG. 3B.
FIG. 3D illustrates the format for the data field for the data packet format of FIG. 3B.

Referring to FIG. 3B, the data packets configured to communicate between the master and slave units are illustrated. Each data packet includes a Preamble 181, Master and Slave ID fields 182, a Data field 183 and a Postamble 184. The Preamble 181 contains a data pattern that enables, or wakes up, the data decoding mechanism of a master or slave unit receiving the signal, respectively. The Preamble 181 can optionally serve as an automatic gain control (AGC) field to automatically set the signal gain for the receiver of the master or slave unit receiving the signal.

Referring to FIG. 3C, the Master and Slave ID fields 182 include separate slave ID fields 185 and master ID fields 186. The slave ID fields 185 include a slave ID synchronization pattern 187, a slave ID address mark (AM) pattern 188, a slave ID data field 189, a slave ID cyclic redundancy check (CRC) 190 and a slave ID pad 191. Similarly, the master ID fields 186 include a master ID synchronization pattern 192, a master ID address (AM) pattern 193, a master ID data field 194, a master ID cyclic redundancy check (CRC) 195, and or a master ID pad 196. The synchronization and address mark (AM) patterns allow synchronization of the decoder with the incoming data. The cyclic redundancy check (CRC) and the error correction check (EEC) allow the detection and correction (in case of ECC) of errors in the data field. The ID pads are bit patterns that move the decoder 46 or 66 to a state where the decoder is ready to receive the next field or message. The ID pads also provide the decoder with a time interval to reach this state.

Referring to FIG. 3D, the Data field 183 includes a data synchronization pattern 197, a data automatic mark (AM) pattern 198, a data field 199, a data error correction check (ECC) or cyclic redundancy check (CRC) 200 and a data pad 201. The synchronization and address mark (AM) patterns allow synchronization of the decoder with the incoming data. The cyclic redundancy check (CRC) and the error correction check (ECC) allow the detection of errors and or correction of errors in the data field. The ID pad are bit patterns that return the decoder 46 or 66 to a state and or to provide the decoder with a time interval to reach this state where it is ready to receive the next field or message.

Referring again to FIG. 3B, the Postamble 184 places the decoder 46 or 66 into a wait or low power consumption state after received data has been processed.

Operating Cycle

Referring to FIGS. 1, 2 and 2A, 3 and 3A, 3B-3D, and 4, the following general description of the operation makes specific reference to master unit 21 and slave unit 31. However, as is stated above, the description applies to the other master units 22-23 and to the other slave units 32-34. As is stated above, the master unit 21 measures the time between the RF signals to determine the distance between the two transponders such as one transponder in a master unit and one in a slave unit disposed on a target T.

Figure 4:
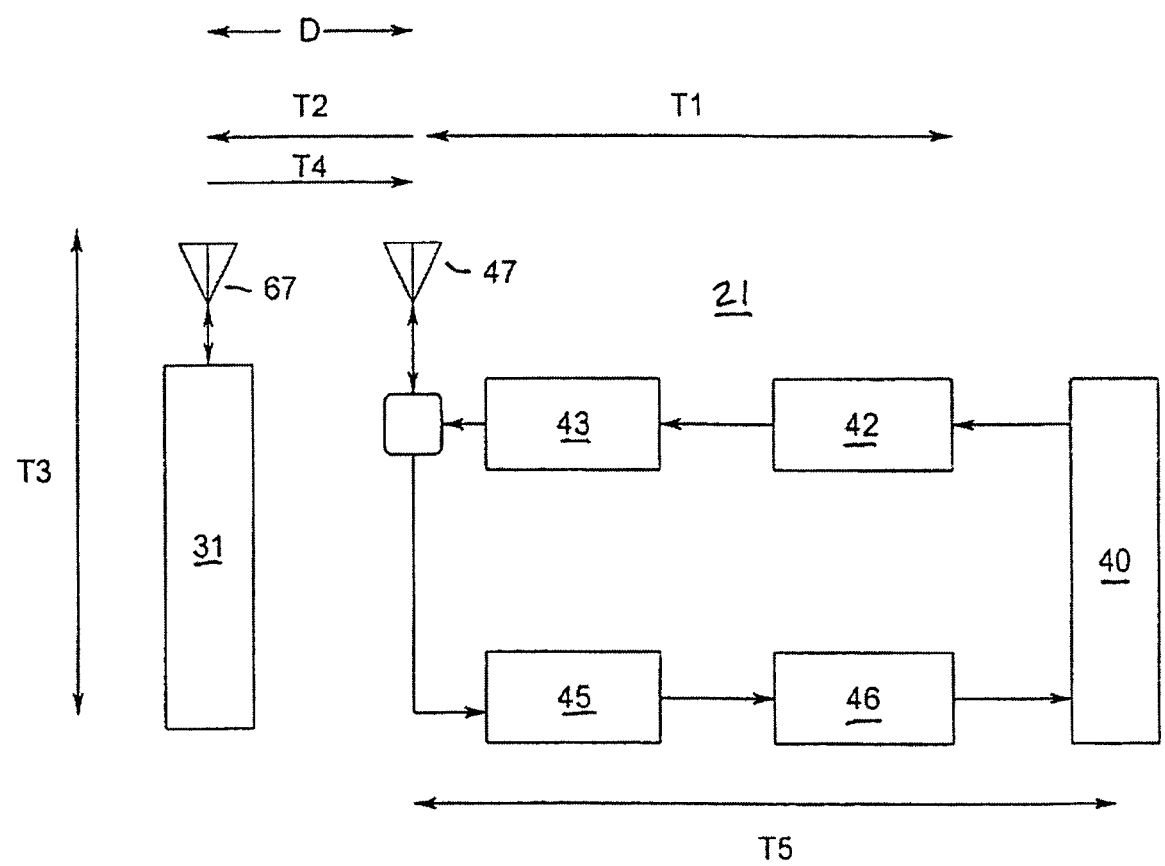
FIG. 4 is a block diagram of a master unit and a slave unit of the tracking and locating system of FIG. 1, and illustrating the timing points through the circuits of a master unit and the slave unit during signal transmission.

FIG. 4 is a block diagram of the master unit 21 and the slave unit 31 and illustrating the timing points through the circuits of the master and slave units during signal transmission. The mathematical formula for determining the distance D between two transponders is as follows:

$$D = ((T_2 + T_4) * V) / 2 \quad (1)$$

where $T_2 + T_4$ is the RF signal round trip time in the air between the master unit 21 and the slave unit 31. Again, throughout this description when (T) represents Time intervals it is followed by numerals and when (T) represents a Target it is followed by alpha characters.

$$T_2 + T_4 = (T - T_1 - T_3 - T_5) \quad (2)$$

where:
T is the total elapsed time from presenting the data to be transmitted by the data processing and control block of the master unit, to the reception and processing of the response (from the slave transponder) by the data processor 40 of the same master unit that initiated the transmission;

$T_1$ is the transmitter path propagation delay from the time the data to be transmitted have entered the data encoder 42 until the signal transmission commences, e.g. when the modulated RF signal reaches the antenna 47;

$T_2$ is the signal elapsed time of travel between the antenna 47 of the master unit 21 and the antenna 67 of the slave unit 31;

$T_3$ is the processing time of the slave unit 31 (for example, signal propagation delay in the receiver 65 plus (+) signal propagation delay in the decoder 66 plus (+) data processing time in the data processor 60 plus (+) signal propagation delay in the encoder 62 plus (+) signal propagation delay in the transmitter 63);

$T_4$ is the signal elapsed time of travel between the antenna 67 of the slave unit 31 and the antenna 47 of the master unit 21;

$T_5$ is the propagation delay over the receive path of the master unit 21 path plus data processing time (signal propagation delay in the receiver 45 plus the signal propagation delay in the decoder 46 plus the data processing time in the data processor 40); and V is the signal velocity in the open air ($3*10^8$ m/s constant).

Because the value of V is very large ($3*10^8$ m/s) and the value of the distance D is small (D<300 m), the RF signal round trip time in the air between the master unit 21 and the slave unit 31 is significantly less than either of the transmitter path propagation delay, the processing time of the slave unit 31 or the propagation delay over the receive path of the master unit 21 path plus data processing time $(T_2+T_4) << T_1$ or $T_3$ or $T_5$. As a result, the values of $T_1$, $T_3$ and $T_5$ are determined with a high accuracy in order to obtain precise distance measurements. Also, $$T_2 + T_4 = (T - T_1 - T_3 - T_5) = (T - T_3 - (T_1 + T_5)) \quad (3)$$

or, $$T_2 + T_4 = (T - T_3 - T_6) \quad (4)$$

where $T_6$ is the sum of $T_1 + T_5$ which is equal to the processing time of the master unit 21 (i.e., the sum of the signal propagation delays in the receiver 45, the decoder 46, the data processor 40, the encoder 42 and the transmitter 43).

Equations (1) and (4) yield:

$$D = (T - (T_3 + T_6)) * V / 2 \quad (5)$$

Therefore, the values of measurements of the times T, $T_3$ and $T_6$, within a short period of time, are used to compensate for the impact of variations in the propagation delays.

As propagation delays of the data processing and control functions remain constant, the values of $T_3$ and $T_6$ can be measured during the "loop back" mode of operation. In the loop back mode of operation, the output of the transmitter is connected directly to the input of the receiver, such that the transmitter output signal is forwarded to the input of the receiver via an attenuator. In some embodiments, the data processor 40 (or data processor 60 of a slave unit) places a special test data on the input of the encoder 42 (or 62), starts time measurement (timer) and waits for an Output data ready signal provided by the decoder 46 (or decoder 66 of a slave unit). Upon reception of the output data ready signal, the data processor 40 (or data processor 60 of a slave unit) verifies the validity of data and stops the timer. If the data are valid, the data processors 40 (or 60) calculate the times $T_6$ (or $T_3$) by reading the "loop back elapsed time" from the timer and adding the necessary data validation and data processing times.

In other embodiments, encoder and or decoder blocks are not in the path of the ranging signal. Here, the output of the transmitter section is permanently coupled to the input of the receiver section. The data processor 40, and in an alterative embodiment element 60, changes the transmitting frequency to the receiving frequency and enables the distance measuring unit 48 or enables distance measuring unit 68 of a slave unit. In this manner, the circuit generates the ranging signal and performs the distance measuring function. The results are translated, by the control and or processor 40 (or reference numeral 60 in the slave unit 31), back into time delays $T_3$ and $T_6$.

Calibration

In accordance with an exemplary embodiment of the invention, the master and slave units are periodically "calibrated". A test signal is transmitted through the master and or the slave units and the propagation time is measured. In some embodiments, the output of the transmitter section is coupled to the input of the receiver section. During calibration, the transmitting frequency such as, for example, 460 MHz, is changed to the receiving frequency of 150 MHz under the control of the data processor 40. The output RF filter of the transmitter attenuates the RF signal being supplied to the receiver section. In other embodiments the transmitting frequency is unchanged, however, the receiver is tuned to the transmitting frequency whereby signal is transmitted through the master and or slave units 21 and 31, respectively, and having front-end RF filter attenuates the RF signal being supplied to the receiver section.

Distance and or Time Measurement Sequence

Figure 4A:
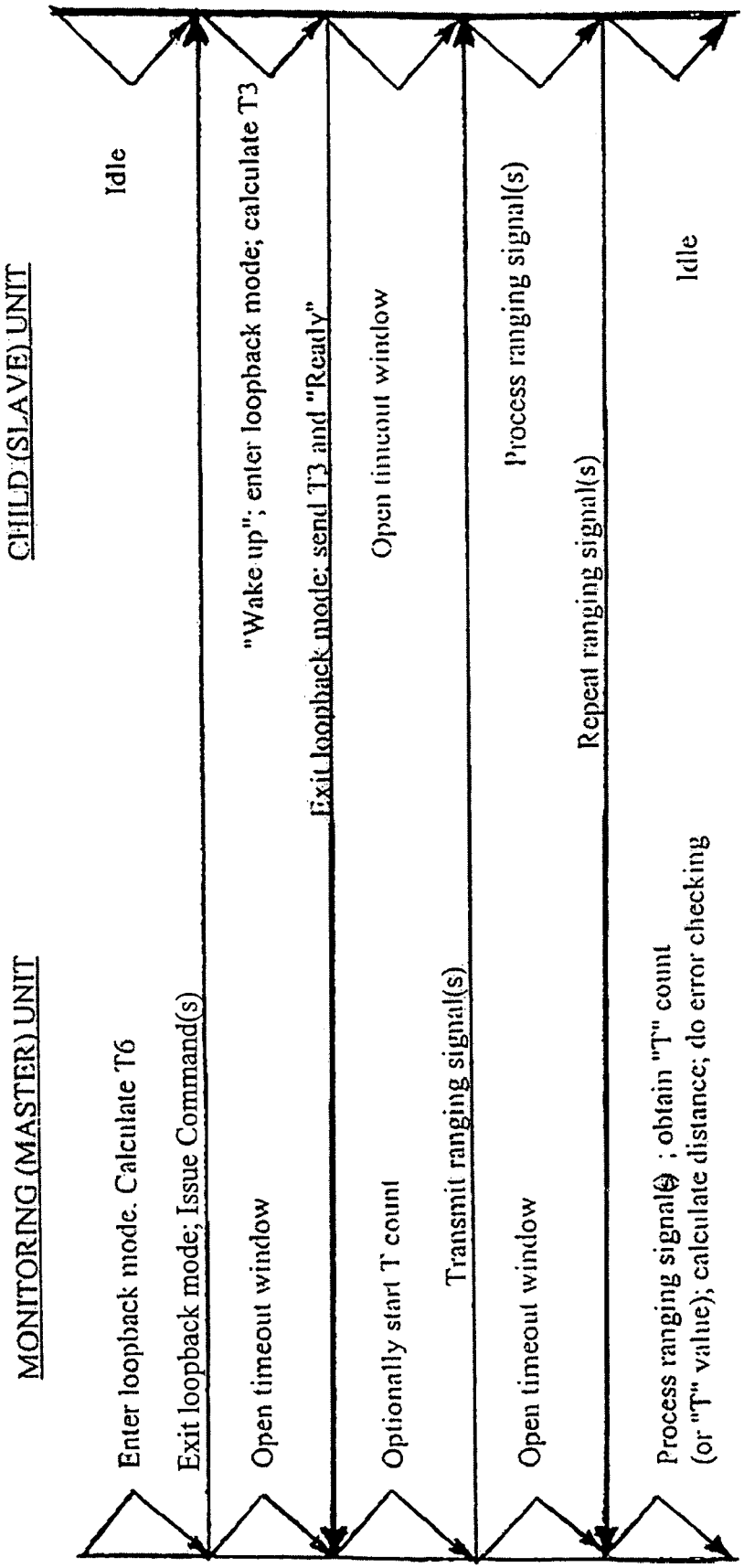
FIG. 4A is a timing diagram illustrating the states sequence of the master and slave units of the tracking and locating system of FIG. 1, including a first-calibration option.

Reference is now made to FIGS. 4A and 4B which show timing diagrams illustrating the sequence of the distance and or time measurement events, including calibration. In another embodiment, a one second time cycle time can be utilized to check for the current propagation delay time and to send the ranging signal to the slave unit 31 and receive a reply ranging signal from the slave unit 31. The ranging signal includes an identification field 182 as shown in FIG. 3B. The transmission also employs error checking, bit checking, and other known like means for generally insuring the integrity of the transmitted and received signal. A transmission operation can be aborted after a 5 to 10 second delay or timeout, when a reply signal fails to be received from a slave unit 31 to which an interrogation signal has been addressed.

The master unit 21 sends a command sequence configured, in part, to wake up the slave unit 31 maintained normally in a low power idle mode as power saving feature when not conducting ranging signal operations. Advantageously, the circuits of the master and slave units 21 and 31, respectively, may operate in a power saver mode in which energizing power is applied to circuits only when necessary for the master and slave units to operate.

Slave unit 31 performs a "propagation time check" (loop back calibration) and transmits a "delay factor" to the master unit 21. The master unit 21 also performs a propagation time check.

The master unit 21 receives the reply ranging signal and uses a value of the time of sending the ranging signal, the time of receipt of the reply ranging signal and the values for any error correction constants, in part, calculated by the slave unit 31 and the master unit 21 to calculate the distance between the master unit and the slave unit.

Referring to FIG. 4, the master unit 21 can request a calibration procedure from the slave unit each cycle or request a calibration periodically. This request can be made at any time in the operating cycle. Moreover, the master unit 21 can perform its own calibration with each transmission, for example, transmitting the test signal through the master unit and or the slave units on a periodic basis.

In another embodiment, the calibration process is carried out initially or "up front" such as, for example, at the start of each distance and or time measurement sequence in the master unit and the slave unit. Certain portion of the propagation delay can be determined at the factory, and such propagation delay will remain substantially constant for the data processing and control functions, such values of the propagation delays can be stored in a table or other memory of the unit for use in determining distance measurements.

As is indicated in FIGS. 4A and 4B, both the master unit 21 and the slave unit 31 employ predetermined values for timing out a particular distance and or time measurement sequence. For example, timeout windows can be configured during portions of the distance and or time measurement sequence when the master unit fails to receive a valid distance and or time signal (ranging signal, reply ranging signal or data sequence) within the time defined by a timeout window, the master unit 21 terminates the distance and or time measurement sequence. Thereafter, the master unit 21 can be configured to continue its attempts to obtain a valid distance and or time measurement. If all attempts fail, the master unit 21 enters an error recovery and diagnostics mode and informs the user through the interface by generating appropriate audio and or visual messages.

The slave unit 31 can be similarly configured to employ predetermined values for timing out a particular distance and or time measurement sequence. For example, timeout windows can be configured during portions of the distance and or time measurement sequence when the slave unit 31 fails to receive a valid ranging signal (or data sequence) within the a timeout window, the slave unit 31 terminates the distance measurement sequence and returns to an idle state.

In a first mode (FIG. 4A), referred to as Option 1, a master unit can enter the loop back mode at the beginning of the distance and or time measurement sequence. In a second mode (FIG. 4B), referred to as Option 2, a master unit can enter the loop back mode in the middle of the distance and or time measurement sequence.

Referring to FIG. 4A, in Option 1, the master unit 21 enters the loop back mode and to determine and or otherwise calculate the value for $T_6$. During this time, the slave unit 31 is idle. The master unit 21 issues a command to conduct a distance and or time measurement with calibration such as, for example, a predetermined data sequence; thereafter transmitting the command to the slave unit 31. The data processor 40 of the master unit 21 opens a timeout window and waits for a reply from the slave unit 31. The slave unit checks the slave ID data of the incoming signal. If the slave ID data indicates this transmission is intended for slave unit 31, the slave unit 31 enters the loop back mode and calculates the value of $T_3$. The slave unit 31 exits the loop back mode and transmits to the master unit a reply that includes a "Ready" status and the value calculated for $T_3$. The slave unit 31 opens the timeout window and waits for the ranging signal. The slave unit 31 also prepares to repeat a ranging signal.

Upon receiving the "Ready" status signal from the slave unit 31, the master unit 21 responsively receives and stores the $T_3$ value. Then, the master unit 21 starts the "t" count, or in the alternative embodiment using phase detection, enabling the distance measurement unit to generate the ranging signal or phases, and to transmit the ranging signal sequence to the slave unit 31. The master unit 21 opens the timeout window and waits for a reply from the slave unit 31.

Slave unit 31 detects and repeats the ranging signal, i.e. transmits the ranging signal back to the master unit 21 that originated this ranging signal. The slave unit 31 will detect and repeat the ranging signal each time it is transmitted by the master unit during a distance and or time measurement sequence. Thereafter, the slave unit enters an idle state.

Master unit 21 detects and processes the returned ranging signal and obtains the "t" count or, when phase detection is used, obtains the t value from the time-measurement or distance measurement unit. The master unit 21 calculates distance and checks for possible errors. The slave unit 31 remains idle during this time. The master unit 21 stores the values representing the internal delay for the master unit 21 and the slave unit 31.

Master unit 21 compares the calculated distance with a "range factor" to determine if the slave unit 31 is within the preset range. If the slave unit 31 is out of range, the master unit 21 activates the location method to locate the position of the slave unit 31. The location calculation uses distance calculation in the location finding procedure.

Referring to FIG. 4B, in Option 2, the master unit 21 operation begins with the distance measurement command and the master unit 21 enters the loop back mode later in the measurement sequence as is described below. The master unit 21 issues a command to conduct a distance and or time measurement (without requesting calibration) and transmits the command to the slave unit 31. The data processor 40 of the master unit 21 opens a timeout window and waits for a reply from the slave unit 31. The slave unit checks the slave ID data of the incoming signal. If the slave ID data indicates this transmission is intended for slave unit 31, the slave unit 31 enters the loop back mode and calculates the value of $T_3$. The slave unit 31 exits the loop back mode and transmits to the master unit a reply that includes a "Ready" status and the value calculated for $T_3$. The slave unit 31 opens the timeout window and waits for the ranging signal. The slave unit 31 also prepares to repeat a ranging signal.

Master unit 21 responds to the "Ready" status signal received from the slave unit 31 and enters the loop back mode and calculates the value of $T_6$. Then, the master unit 21 starts the "t" count, or in the alternative embodiment using phase detection, enabling the distance measurement unit to generate the ranging signal or phase, and to transmit the ranging signal sequence to the slave unit. The master unit 21 opens the timeout window and waits for a reply from the slave unit 31. The slave unit 31 detects and repeats the ranging signal, such as, for example, transmits the ranging signal back to the master unit 21 that originated this ranging signal. The slave unit 31 will detect and repeat the ranging signal each time it is transmitted by the master unit 21 during a distance and or time measurement sequence. Thereafter, the slave unit 31 enters an idle state.

Master unit 21 detects and processes the returned ranging signal and obtains the "t" count or, when phase detection is used, obtains the t-value from the time-measurement or distance measurement unit. The master unit 21 calculates distance and checks for possible errors. The slave unit 31 remains idle during this time. The master unit 21 stores the values representing the internal delay for the master unit 21 and the slave unit 31.

Master unit 21 compares the calculated distance with a "range factor" to determine if the slave unit 31 is within the preset range. The location calculation uses distance calculation in the location finding procedure. If the slave unit 31 is out of range, the master unit 21 activates methods according to the present invention to locate the position of the slave unit 31.

Processor for Processing Values of the Data Signals

Figure 5:
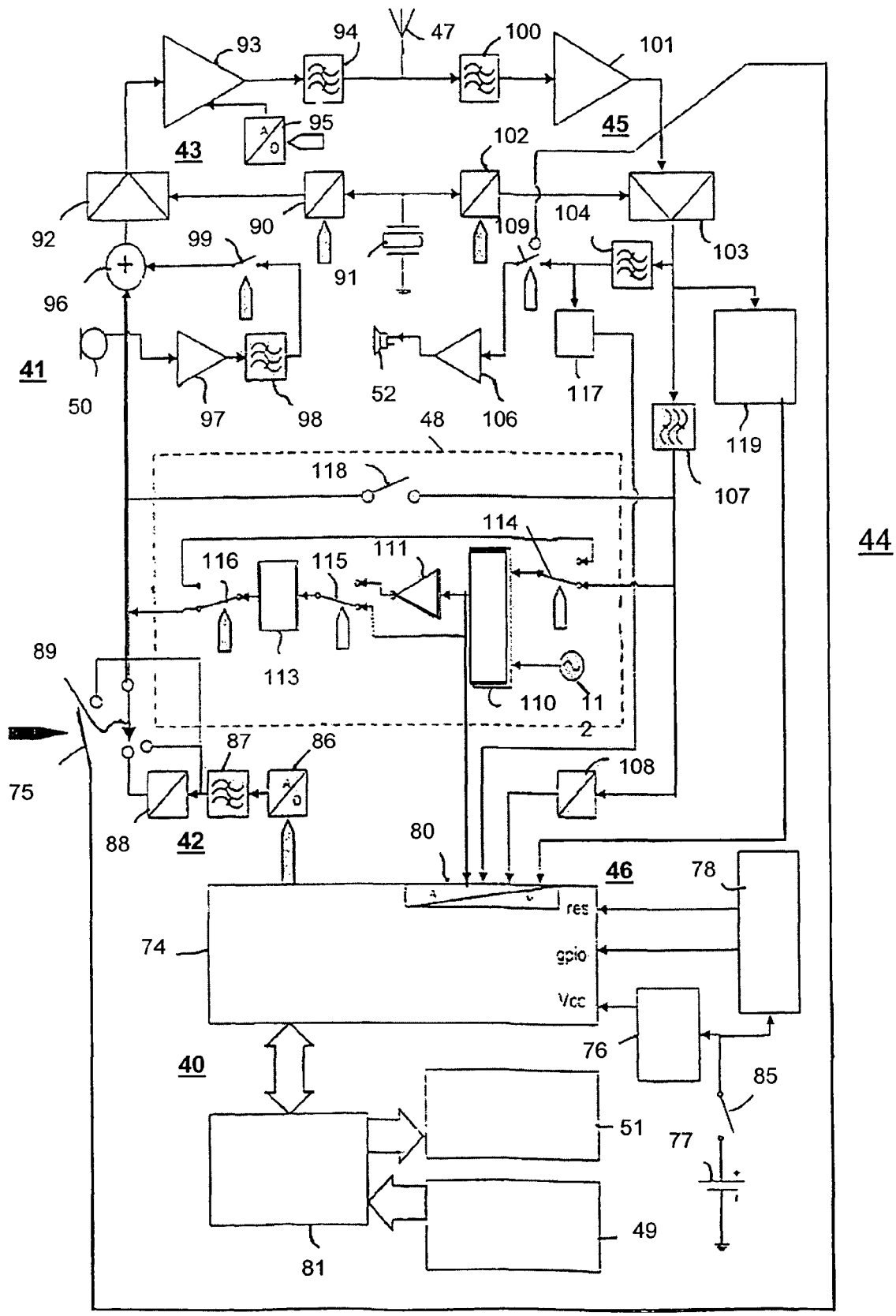
FIG. 5 is a functional block diagram of the master unit of FIG. 2.

Reference to FIG. 5, according to an exemplary embodiment of the present invention, the processor 40 is configured to determine position information and to process values of data signals. The processor 40 includes a digital signal processor (DSP) 74, a voltage stabilizer 76, and a battery supervisor 78. DSP 74 provides the central control for the master unit 21, thereby establishing the operating sequences for the master unit 21. DSP 74 further controls the components of the transmitter section 41, the receiver section 44 and the distance measuring unit 48 of the master unit 21 during operation of the master unit 21. The DSP 74 includes an analog to digital converter 80 that converts analog signals from the receiver section 44 into digital signals for use by the DSP 74. The voltage stabilizer 76 derives a regulated DC voltage from the battery 77 to supply to the DSP 74. The battery supervisor 78 advantageously provides to the interface an indication of a low battery voltage condition as an output to the DSP 74.

The processor 40 further includes a controller 81 configured to interface with the DSP 74 as well as interface, input and output devices such as the keypad 49 and the display unit 51. The display unit 51 can be a liquid crystal display (LCD) having a screen 84 (FIG. 2A) or, alternatively, can be incorporated into "heads up" eyepiece(s) or other headgear of the monitor. The keypad 49 of the master unit 21 can be similar that used in cell phones or otherwise keypad 49 includes a combination of alpha, numeric, control keys or otherwise multi-function keys.

Referring also to FIG. 2A, the keypad 49 includes keys for entering "command sequences" for initiating homing operations and for modifying a homing operation. The keypad 49 also includes function buttons (multiplexed with alphabetical characters, similar to those of a cell phone keypad) and or indicators to enable a user to enter control commands and to initiate functions of the master unit 21 during use of the master unit 21, particularly during homing operations. The function buttons can be implemented in software and be displayed include a portion of the display unit can function as a touch screen allowing a user to enter commands by pressing on images displayed on the display screen. The master unit 21 also includes an on/off switch 85 that is interposed between the battery 77 and the voltage stabilizer 76 as shown in FIG. 5.

Transmitter Section

Referring to FIG. 5, the encoder 42 of the transmitter section 41, includes a digital to analog converter (DAC) 86, a bandpass filter 87 and a frequency converter 88. The DAC 86 produces control signals under the control of the DSP 74 for transmission to the slave unit 31. Encoder functionality can be implemented in firmware for advantages including preprogramming, updating, upgrading and the like.

The digital to analog converter (DAC) 86 forms analog information from digital information signals as well as control signals under the control of the DSP 74. The frequency converter 88 operates to convert information and control signals produced by the digital to analog converter 86 at frequencies in the range of 100-3400 Hz into signals at frequencies in the range of 3500-6800 Hz. Switch 89 enables the synthesized speech signals to bypass the frequency converter 88. The information and control signals produced by the encoder are applied to an input of a summing amplifier 96, which passes the control signals to an FM modulator 92 of the transmitter 43.

The transmitter 43 includes a frequency synthesizer 90, a timing generator 91, embodied as a crystal oscillator, the FM modulator 92, a power output stage 93 and an output bandpass filter 94. The crystal generator produces a clock signal at 10 MHz as a time base for the frequency synthesizer 90 which, operating under the control of the DSP 74, produces a carrier frequency signal at 150 MHz, for the FM modulator 92. The carrier signal is frequency modulated by the control signals produced by the encoder 42. The output of the FM modulator 92 is connected to the input of the transmitter power stage 93, the output of which is coupled through the output bandpass filter 94 to the antenna 47.

The transmitter power stage 93 has an associated A/D converter 95 that is operated under the control of the DSP 74 to control the power level of the output power stage 93. The output bandpass filter 94 has a 150 MHz central frequency.

Receiver Section

Referring now to the receiver section 44, the receiver 45 includes a bandpass filter 100, a receiver front-end amplifier 101, a frequency synthesizer 102, and an FM demodulator 103. The receiver 45 sensitivity also is controlled by the DSP 74. The input band-pass filter 100 has a passband for passing the 460 MHz signal through the front-end amplifier 101 to the FM demodulator 103. The frequency synthesizer 102 operates under the control of the DSP 74 for providing synthesized signals at 460 MHz less the intermediate frequency value for driving the FM demodulator 103 to recover the low frequency data and voice signals from the frequency modulated 460 MHz carrier signals transmitted by the slave units.

Voice communication signals recovered from received input signals are coupled through a band pass filter 104, having a pass band of approximately 100 Hz to 3400 Hz, an analog switch 109 and a low-frequency power amplifier 106 which couple voice frequency signals to the speaker 52 when the master unit 21 is operating in the voice mode. The analog switch 109 is operated to a closed condition under the control of the DSP 74 during voice mode operation. A received voice frequency power measurement circuit 117 derives from voice frequency signals being extended to the speaker, a signal indicative of the amplitude of the voice frequency signal being received. In addition, switch 75 is connected between a terminal of the analog switch 109 at the input of low frequency power amplifier and the output of the bandpass filter 87, which in turn is connected to the output of the digital to analog converter (DAC) 86. The processor 40 can operate the switch 75, allowing the user to hear synthesized commands generated by the DSP 74, which are routed to the speaker 52 when the switch 75 is operated.

Information, data and ranging signals recovered from input signals are coupled through a band pass filter 107 to the distance measurement unit 48 and the decoder 46. The bandpass filter 107 has a pass band of approximately 3500 Hz to 6800 Hz. Decoder 46 includes a frequency converter 108, which converts the frequency from 3500 Hz-6800 Hz to 100 Hz-3400 Hz. The output of the frequency converter 108 is applied to the A/D converter 80 for conversion of digital signals supplied to the data processor 40. The decoder functionality can be implemented in firmware for advantages including preprogramming, updating, upgrading and the like.

Decoder 46 further includes a conventional Received Signal Strength Indicator (RSSI) 119. The RSSI 119 provides an input to the DSP 74 via the A/D converter 80. The RSSI 119 can be built from discrete components or integrated with demodulator 103.

Transmitter 43 configured to provide voice communication between the user and the slave unit 31, as control and ranging signals separated by frequency converters 88 and 108 and filters 98, 104, 107 and 87. In operation, the microphone 50 is coupled to an input of the summing amplifier 96 which output is supplied through a low frequency amplifier 97, with compression and or pre-emphasis, to a low pass filter 98 and an analog switch 99. The analog switch 99 is operated under the control of the DSP 74 to enable the user to send voice communications when the master unit 21 is operating in a voice mode.

In addition the antennae can be configured and selected to receive other wireless communications signals such as, for example, wireless communication between the in the command and control unit and a computer processor by Bluetooth and or Wi-Fi protocols, or other wireless signals such as GPS whereby the units can utilize the input signal in the calibration procedure, propagation delay and correct for other errors such as timing and the like. GPS, Bluetooth and Wi-Fi chipsets have been developed and the present invention is easily adapted to collect and route input and output signals from known wireless architectures such as, for example, either (GPS), Bluetooth or Wi-Fi chipsets, to the locating and tracking circuitry of the present invention so as to be operated on by such circuitry and returned to be sent as output signals. As a result, the cost of such chipsets can be economical and the time, distance and position information may be taken from appropriate outputs of the chipset and utilized by the interval processing and position processing systems of the present invention to provide virtual triangulation. In this manner, alternative exemplary embodiments of the present invention can be integrated with GPS, Bluetooth, WiFi and other known communication chipsets operating at various frequency bands to provide advantageously tracking and locating functions in simple and effective manner, anywhere in the world.

Distance Measuring Unit

In this embodiment, an indirect measurement is used in generating and processing the ranging signal to determine the distance between the master unit and a slave unit. In some embodiments, the indirect measurement is obtained by determining the phase shift between successive ranging signals. To this end, the distance measuring unit 48 includes a phase detector (PD) 110, an analog inverter amplifier 111, a reference signal generator 112, and analog switches 114, 115 and 116. The phase shift-between successive ranging signals can be determined using a voltage controlled oscillator (VCO) 113 and analog switches 114, 115 and 116. The ranging signal received from the slave unit is applied to one input of the PD 110 and compared with a reference signal applied to the other input of PD 110 by reference signal generator 112. The difference (error) signal is applied via A/D converter 80 to the DSP 74, which stores the difference, obtained from processing the successive ranging signals.

The distance measuring unit 48 is configured to measure the propagation time of the ranging signal as a function of the phase shift of the signal generated by the VCO 113 which, with other above mentioned components, forms a phase locked loop (PPL) to produce a test or calibration signal for use in determining the internal delay time attributable to circuits of the master unit 21. The analog switches 114, 115 and 116 are configured to operate under the control of the DSP 74 so as to alter the configuration of the distance measuring unit 48 during calibration either (i) to initially synchronize the output of the VCO 113 with the reference signal produced by the reference signal generator 112 or (ii) to measure the parameters of the PLL including the PLL gain. When calibration has been achieved, the output of the VCO 113 is connected to an input of the summing amplifier 96 for application to the FM modulator 92. At the same time, the input to the PD 110 is switched to the output of the filter 107. In operation, ranging signals are transmitted between a master unit and a slave unit or, alternatively, ranging signals are transmitted between a monitoring unit and a master unit, a command and control unit and a master unit, or simply signals transmitted and received between units configured as transceivers.

The master unit 21 advantageously can be configured to utilize standard commodity hardware components for the antenna 47, the battery, the LCD display, the keypad, the On/Off switches, the LED and the like. Other components of the master unit 21 such as elements shown as functional blocks in FIG. 5 are implemented in hardware and/or processor real-time firmware. The processor 40 can be configured as a digital signal processor (DSP) or other integrated circuit programmable architectures such as, for example, an application specific integrated circuit (ASIC), some other type of processor or a combination of a processor and an ASIC, or a processor and standard parts, or a combination of the above.

Slave Unit

Figure 6A:
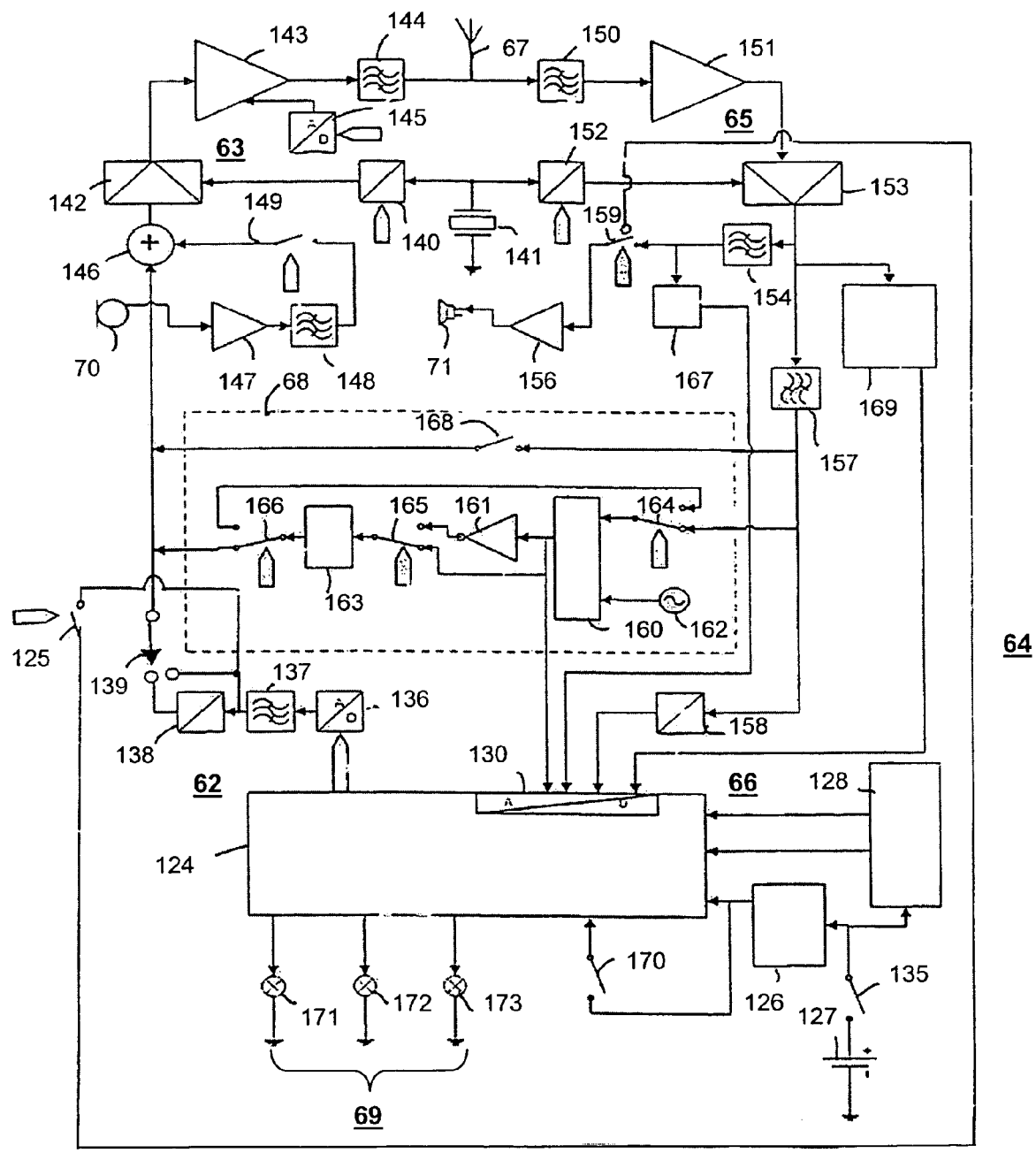
FIGS. 6A and 6B illustrate an exemplary embodiment of the present invention, whereby

Referring to FIG. 6A, the slave unit 31 transponder circuit architecture is generally similar to the master unit 31 and can have functionality added to the base transponder features as is described in embodiments of the present invention. When applicable for ease of clarity and understanding the present invention, similar electronic circuitry of the master unit 21 and the slave unit 31 throughout this detailed description will use the same reference numerals but with "50" added to the reference number for components of the slave unit corresponding to similar components of the master unit 21, for example, the input filter 150 of receiver 65 corresponds to the input filter 100 of the receiver 45, as shown in FIG. 5. As above, the slave unit 31 can be configured, for example, to transmit signals in the 460 MHz band and to receive signals in the 150 MHz band for determining position information. Moreover, the slave unit 31 is configured to respond to homing operations but not to initiate such homing operations. The slave unit 31 is configured as a transponder, as described in the methods and system of the present invention, in part, to improve the cost profile of the unit.

Some of the differences between the slave unit 31 and the master unit 21 are outlined to further illustrate the features of the present invention. In certain embodiments, the slave unit operates as a simple transponder to receive and reply to ranging signals. The master unit 31 is configured to have complete control over slave units 31, whereby the slave unit 31 does not have an input, voice communication, or display function such as, for example, a speaker, microphone, keypad, a display or the like including a controller or other circuitry to oversee the input functionality. In other exemplary embodiments a slave unit 31 is configured to include an interface for input, voice communications or display such as, for example, a voice communication request button 170 and light emitting diodes 171, 172 and 173. The light emitting diodes 171, 172 and 173 can be configured to indicate the state or other status of the unit. Moreover, the slave unit is not initially configured with a microphone, however, under certain applications it may be desirable and a headset and or microphone can be incorporated by a jack or the like. However, in some applications, it can be desirable for the slave unit 31 to include a display unit and or a keypad similar to those of the master unit 21.

In addition, a switch 125 is connected between a terminal of the analog switch 159 at the input of low frequency power amplifier 156 and an output of the bandpass filter 137, which bandpass filter 137 in turn is connected to an output of the digital-to-analog converter (DAC) 136. In operation, the processor 60 can operate and toggle the switch 125 on or off, thereby allowing the user to hear synthesized commands generated by the DSP and routed to the speaker 71 (or a headset).

Examples of Operating Modes of the Transceiver Unit

Figure 6B:
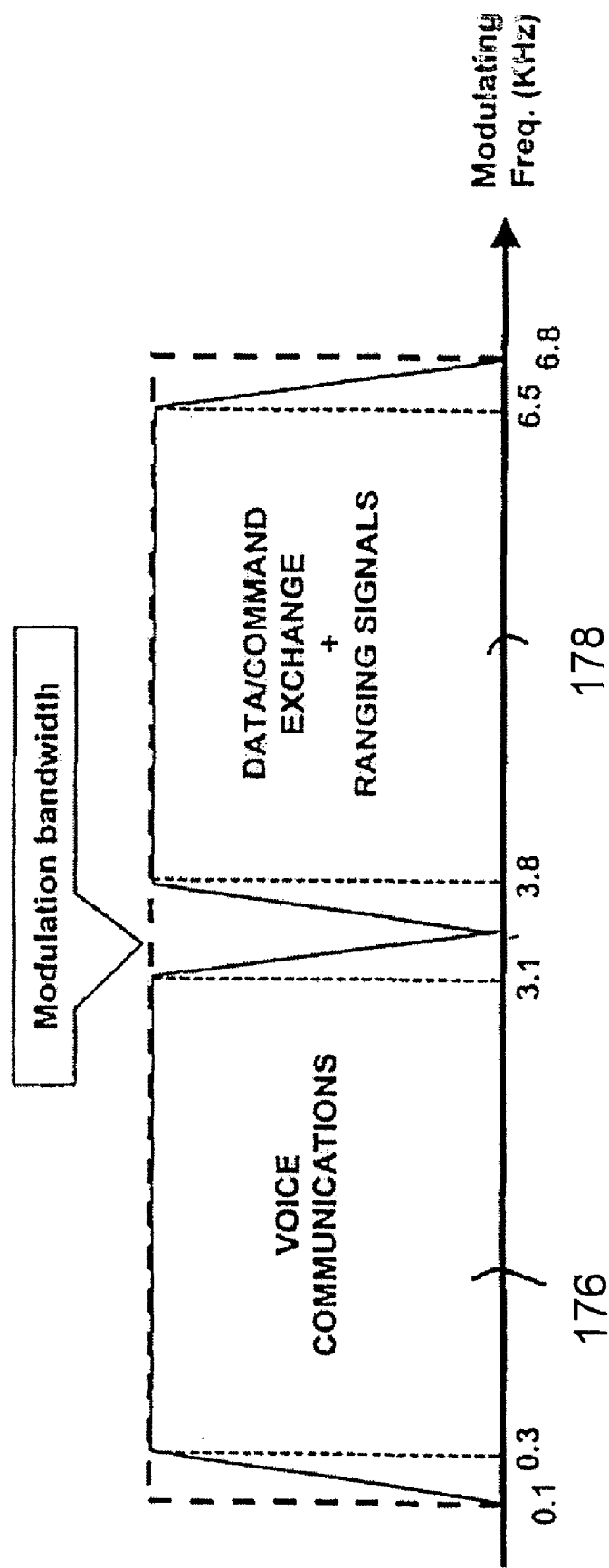

According to the exemplary embodiments of the present invention, a command and control unit, a searching monitor unit $M_s$ or master unit 21 can be configured to have four modes of operation, namely: (1) voice communications; (2) data and or command exchange; (3) distance measurement; and or (4) internal delay measurement and or calibration. Referring to FIGS. 2 and 5, the transceiver operating of the system can by configured to utilize modulation bandwidth multiplexing, thereby allowing, for example, simultaneous distance measurement and communication operations as in certain applications it is advantageous to have distance measurement and communication operations performed in parallel rather than separately. Such applications include separate voice communications, data, command exchange, and or distance measurement operations for economical and effective use of the bandwidth occupied by transceiver or combination transceiver/transponder, in a particular band. If a unit is configured to have voice communications, data, command exchange, and or distance measurement operations carried out simultaneously using frequency division multiplexing increased capacity and economy of scale can be realized. Referring to FIG. 6B, as an example, voice communications can be carried out in a first portion 176 of the modulation bandwidth at modulating frequencies from about 0.3 KHz to 3.1 KHz and data and or command exchange or ranging signal transmission can be carried out in a second portion 178 of the modulation bandwidth at modulating frequencies from about 3.8 KHz to 6.5 KHz. The DSP 74 reconfigures the signal paths in the circuits of the master and slave units during the calibration procedure and, as a result, calibration in the embodiments of the present invention is configured to be determined as an off-line condition.

(1) Voice Communication

Referring now to FIG. 5, the analog switches 99 and 109 are initially configured in a closed position. The output signal produced by the microphone 50 is applied to the modulator 92 through the amplifier 97, the filter 98, the switch 99 (now closed), and the analog summing amplifier 96. The modulator 92 forms an RF signal in the 150 MHz band, which is amplified by the power stage 93 of the transmitter 43. The amplified modulated RF signal is passed through the transmitter output filter 94 to the antenna 47 for transmission to the slave unit 31, or as is described in other exemplary embodiments, transmitted to other master or slave units within the predetermined range.

In antenna 47, in addition to the transmitted signal in the 150 MHz band, the master unit 21 can receive a reply ranging or other signal in the 460 MHz band from the slave unit 31 or another master or slave unit. The received signal passes through the filter 100, front-end circuitry 101 to the demodulator 103. After demodulation, the demodulated signal passes through the filter 104 and the switch 102 to the amplifier 106. The amplified signal is sent to the speaker 52.

The DSP 74 also can be configured advantageously to synthesize voice signals and send the synthesized voice signals to the modulator 92 via the DAC 86 and the filter 87, bypassing the frequency converter 88 in order to reduce the input to the unit workload of the user or to operate in a hand-free condition. The DSP 74 can send synthesized voice signals to the speaker 52 via the switch 75 and the amplifier 106, or in case of slave unit 31, the DSP 124 sends the synthesized voice signals to the loudspeaker 102 via the switch 125 and the amplifier 156 advantageously utilizing digitized synthesized voice signals to achieve low power and complex signal processing techniques.

(2) Data Command Exchange

The DSP 74 is configured to generate command and or data signals in a digital format so as to advantageously utilize low power and complex signal processing techniques. When necessary, the digital signals are sent to the DAC 86, which converts the digital signals to analog signals for such operations as, for example, transmitting through RF modulator to RF transmitter and to the antenna or through the speaker. Analog signals are sent through the filter 87, frequency converter 88 and the summing amplifier 96 to modulator 92 to form an RF signal in the 150 MHz band, which is amplified by the transmitter power stage 93 for transmission. In operation, the amplified modulated RF signal is passed through the transmitter output filter 94 to the antenna 47.

In addition to transmitting signals in the 150 MHz band, the antenna 47 can be configured to receive data and or command signals, for example, in the 460 MHz band, from a slave unit 31 or from another monitoring or master unit as is described in alternative embodiments herein. The received signal passes through the receiver input filter 100, the front-end circuitry 101 to the demodulator 103, whereby the demodulated signal passes through the filter 107, the frequency converter 108. The signal output from the frequency converter 108 is applied to the input of the ADC 80, which can be integrated with the DSP 74 for processing the received signal. In operation, the configuration using frequency converters 88 and 108 as well as the filters 87, 98, 104 and 107 so as to allow for simultaneous exchange of voice as well as data and or command signal operations as illustrated in FIG. 6B.

(3) Distance Measurement

At initiation of a distance measurement operation, the DSP 74 sets the analog switches 114 and 116 in the upper position, and the analog switch 115 into the lower position. In this configuration, the PD 110, the amplifier 111 and the VCO 113 form a phase locked loop (PLL) circuit and, as a result, the VCO 113 synchronizes with the reference generator 112. The target slave unit (or another master unit being used as a position reference) closes the analog switch 166 (or switch 116 in another master unit). The VCO 113 is synchronized when the output of the PD 110, reflecting a 90° phase difference between the signals input to the PD 110, whereby the derivative of the PD 110 output over time will equal zero.

Upon synchronization, the master unit 21 initiates sending data and or command signals having command instructions to the slave unit 31. In response, a particular slave unit 31 closes the switch 168 so as to route the distance measurement signal from the receiver demodulator output through filter 157 to the input of the transmitter modulator 142 as well as through the summing amplifier 146. In this manner the data and or command signal is looped back immediately and a particular master unit 21 measures the phase shift. Similarly, another master unit 22 may be utilized to close the switch 118 in its distance measuring unit for distance measurement between two master units.

After confirmation that the switch 168 is closed in the slave unit being addressed (or switch 118 in another master unit), the DSP 74 operates the analog switches 114 and 116 into the lower position and the analog switch 115 into the upper position, whereby such configuration allows the output signal from the VCO 113 to reach the modulator 92 via the summing amplifier 96. The output signal frequency of the VCO 113 is outside of the pass-band of the filter 98. As a result, combinations of the functions of voice communications, data and or command signals, or distance measurements can be carried out simultaneously, as described above with reference to FIG. 6B. The action of the analog switch 115 will be explained in the following description of the distance measurement method.

The amplified, modulated RF signal is supplied to the filter 94 and subsequently to the antenna 47. The antenna 47 advantageously can be configured to transmit and receive on different bands or utilizing one band and/or accommodate spread spectrum signals throughout the bandwidth such as, for example, in addition to transmitted signal in the 150 MHz band, there can be a distance measurement received signal in the 460 MHz band from a slave unit 31 (or another master unit). The distance measurement received signal is supplied to the filter 100 with such output signal being supplied to the front-end circuitry 101 and with such output signal being supplied to the demodulator 103 for demodulating the signal.

The signal output of the demodulator 103 is supplied to the input of the filter 107 which supplies its output to the input of the PD 110. The output of the PD 110, the phase error signal, is proportional to the phase difference between the measurement received signal and the reference signal being produced by the reference generator 112. The phase error signal or output signal (error signal) is then applied to the input of the ADC 80 and its output is applied to the DSP 74 as well as to the input of the VCO 113.

The output signal of the VCO 113 is transmitted to a slave unit 31 or to another master or monitoring unit and such phase error signal is used to determine accurately distance measurement. In monitoring, master or slaver units, the signal is demodulated and, without any transformation, is applied to the modulator input because the switch 168 in the slave unit 31 (or the switch 118 in another master unit) is closed. As a result, the signal is transmitted back to the particular master unit 21 that originally transmitted the signal. In such originating master unit 21, such received signal is demodulated and applied to the input of the PD 110.

During this "round trip", the output signal of the VCO 113 is delayed. To the PD 110, this delay appears as a phase shift relative to the phase of the output signal of the reference oscillator 112. The output of the PD 110, that is proportional to this shift, is applied to the input of the amplifier 111, and the output signal provided by amplifier 111 is applied to the VCO 113. The VCO 113 starts changing its frequency proportionally to the output of the PD 110. This new frequency signal makes another round trip and is applied again to the input of the PD 110.

The amplifier 111 inverts the signal, thereby configuring a 180 degree phase shift from the signal provided by the PD 110, so that the VCO frequency is changing in the direction that adds to the phase difference between the PD 110 inputs, instead of reducing it, as is normal in PLL operation. By allowing the signal to go through successive, multiple round trips, the delay of RF signals is accumulated to allow advantageously for a high precision delay measurement configured for an accuracy that exceeds the actual resolution of the PD 110. Also during this time, the DSP 74 reads-in, at a periodic time intervals, the values of the output signals or other error signals produced by the PD 110 such as, for example, the phase difference error signal, and stores such values in memory. In addition, a technique implemented in the DSP 74 determines the round trip delay value from the output of the VCO 113 to the input of the PD 110 as another error signal useful to determine accurately distance measurement. In the distance measurement mode, the measurement of the round trip delay includes measuring values for delays in internal slave unit 31 and master unit 21 delays such as, for example, master, slave or monitor transmitter or receiver delays; antenna delays; RF signal propagation time between the signal origination monitoring unit and slave unit or another monitoring unit disposed on the target; and the RF signal propagation time between the signal origination monitoring unit and slave unit or another monitoring unit disposed on the target during the second leg of the round trip.

Distance Measurement Technique Example

Referring now to FIG. 5, in the initial configuration absent the inverting amplifier 111 and absent any round-trip delay, the PLL error signal or original output signal of PD 110, the $E_{PLL}$ response to a phase step function with an amplitude A can be calculated as follows:

$$E_{PLL} = A^* \exp(-k^* t) \quad (6)$$

where "k" is the phase lock loop (PLL) gain, and "t" is the elapsed time from the applying the phase step. From equation (6), after a certain amount of time, the error signal approaches a zero value, $E_{PLL} \rightarrow 0$, and so the error signal $E_{PLL}$ derivative over time will become very or infinitely small. As the DSP 74 reads-in, at a periodic time intervals, the values of the error signals $E_{PLL}$ produced by the PD 110 and stores these values in memory, it also calculates the $E_{PLL}$ derivative over time. When the value of the error signal $E_{PLL}$ and its derivative fall below a certain threshold(s), the PLL is synchronized.

The presence of the round-trip delay D and the inverting amplifier 111 change the PD 110 output error signal ($E_{dmeas}$)

dynamics. With delay D, the error voltage $E_{dmeas}$ cannot be described mathematically in a closed form without certain assumptions: D has to be small (which is the case) and k*D product less than 0.25. With these assumptions the $E_{dmeas}$ values can be calculated as follows:

$$E_{dmeas}=(A/2)*[((B+1)/B)*\exp((B-1)/2*D)*t)+((B-1)/B)*\exp(-((B+1)/2*D)*t))] \quad (7)$$

where:

$$B=sqrt(1+4*k*D) \quad (8)$$

More precise behavior can be obtained by conducting a simulation as is evident to one skilled in the art.

After the DSP 74 operates the analog switches 114 and 116 into the lower position and the analog switch 115 into upper position, the roundtrip delay changes the phase of the VCO output signal, whereby the change can be represented by the step function with an amplitude $$A=2*pi*D/T \quad (9)$$

where: D/T is the period of VCO oscillations and 2*pi=6.28.

After combining equations (7) and (9), the output error signal ($E_{dmeas}$) of the PD 110 will be as follows:

$$E_{dmeas}=(2*pi*D/T)*[((B+1)/B)*\exp((B-1)/2*D)*t)+((B-1)/B)*\exp(-(B+1)/2*D)*t))] \quad (10)$$

Because B>1, the signal $E_{dmeas}$ will grow exponentially over time. For a fixed value of k, the signal growth will depend on D value. The $E_{dmeas}$ values over time t for various D values can be tabulated and stored in the DSP 74 memory in the form of a look-up table.

The DSP 74 reads-in, at periodic time intervals, the values of signal $E_{dmeas}$ and compares these values with the values stored in the look-up table. The DSP 74 finds the closest match by calculating correlation values between measured and tabulated $E_{dmeas}$ vs. time t values for different D. The D value that yields the highest correlation between the signal $E_{dmeas}$ readings, and or samples, and the tabulated $E_{dmeas}$ vs. values of t is the round-trip delay value.

In addition to finding the closest match between the values of signal $E_{dmeas}$ and t, the DSP 74 can also calculate the $E_{dmeas}$ derivative vs. time values and compare (correlate) these with $E_{dmeas}$ derivative table.

For accurate results, according to an exemplary embodiment of the present invention, the PD 110, the amplifier 111 and the VCO 113 should be configured to operate in the linear region under the control of the DSP 74, and PD 110 can be configured to set the resolution point at its highest value. The DSP 74 also checks the $E_{dmeas}$ signal samples against a "saturation threshold". Once the signal $E_{dmeas}$ exceeds a predetermined value established for the threshold level, the DSP 74 reconfigures the circuitry of the distance measurement unit into the PLL in order to re-synchronize the VCO 113 and brings the PD 110 output error signal to its initial value.

The value of k can be calibrated or otherwise measured in the PLL configuration that is used for synchronization with the reference 112. Under the control of the DSP 74, the reference 112 can be programmed to produce a phase step function with amplitude a. The DSP 74 can than obtain the $E_{PLL}$ samples and compare or otherwise correlate the obtained samples with the tabulated values of the $E_{PLL}$ vs. t for different values of k. The values for the $E_{PLL}$ and $E_{dmeas}$ tables can be configured advantageously during manufacture thereby loading and storing such the $E_{PLL}$ and $E_{dmeas}$ tables and or other useful tables in the DSP memory. The DSP 74 also calibrates phase detector PD 110 to find the best operating point at which PD 110 has the highest resolution.

The values for error correction and other internal signal delay factors of the slave unit 31 and or the master or monitoring unit 21 as well as any transceiver delays such as, for example, the transmitting and receiving of signals of a respective master unit sending the signal, are determined in the internal delay measurement and or calibration mode. Antenna delays can be determined during initial device calibration and a factor, representing the delay attributable to the antenna 47, can be stored in a table in the DSP for use in subsequent calculations. Alternatively, a delay factor can be configured into each unit during calibration when dual antennas are used.

(4) Internal Delay Measurement and or Calibration Mode

Similarly to distance measurement mode, the DSP 74 is configured in the internal delay measurement and or calibration mode to operate the analog switches 114 and 116 from the lower position illustrated in FIG. 5 to an upper position (not shown) in order to synchronize the output signal of the VCO 113 with the output signal of the reference generator 112.

Initially during synchronization, the DSP 74 changes the carrier frequency generated by frequency synthesizer 90 from the 150 MHz band to the 460 MHz band. In addition, the DSP 74 lowers the power of the transmitter output stages 93 by controlling the A/D converter 95. As the pass-band of the filter 94 is configured to operate at around 150 MHz, signals in the 460 MHz band from the transmitter output stages are greatly attenuated already, thereby avoiding saturation of the receiver front-end 101 and advantageously synchronizing without any additional components. In other modes, the frequency of the signals produced by the synthesizer 90 is configured to be set to be within the 460 MHz band. In an alternative embodiment, the frequency synthesizer 90 is configured to have the carrier frequency remain unchanged as well as the power of the transmitter output stages 93. In other embodiments, however, the frequency synthesizer 109 is configured, by the DSP 74, for the FM demodulator 103 to receive signals from the transmitter output stages 93, i.e., around 150 MHz frequency, whereby such 150 MHz frequency signals are greatly attenuated by the receiver front-end filters 100 tuned to the 460 MHz band or frequency, thus avoiding saturation of the receiver front-end 101.

After synchronization is complete, as is discussed herein, the DSP is configured to operate the analog switches 114 and 116 to the lower position and the analog switch 115 to upper position. Based on this condition, the output signal from VCO 113 reaches the modulator 92 through the summing amplifier 96. Advantageously the synchronization technique is useful in the distance measurement mode, whereby signals are used to determine the value of an internal round-trip delay time. However, it is important that in this case, the round-trip delay time includes the sum of the values of a delay for each device internal transmitter and receiver delay.

Examples of Slave Unit Operating Modes

The modes of operation for the slave unit 31 can be configured to be substantially the same as those for the master unit 21 or alternatively reduced to a simple transponder depending on the application and other factors such as cost, efficiency and environmental considerations. One distinction between the mode of operation of the master or monitoring unit and a slave unit is in relation to the distance measurement mode, whereby the switch 168 is configured to route the distance measurement signal from the output of the receiver demodulator 153, through the filter 157, to the input of the transmitter modulator 142 through the summing amplifier 146. Similarly, when a distance is desired to be measured between two monitoring or master units, or otherwise transceivers in the system of the present invention, one of the two master units also uses switch 118 to route the distance measurement signal from the output of the receiver demodulator 103, through the filter 107, to the input of the transmitter modulator 92 through the summing amplifier 96.

Position Determination

Figure 7:
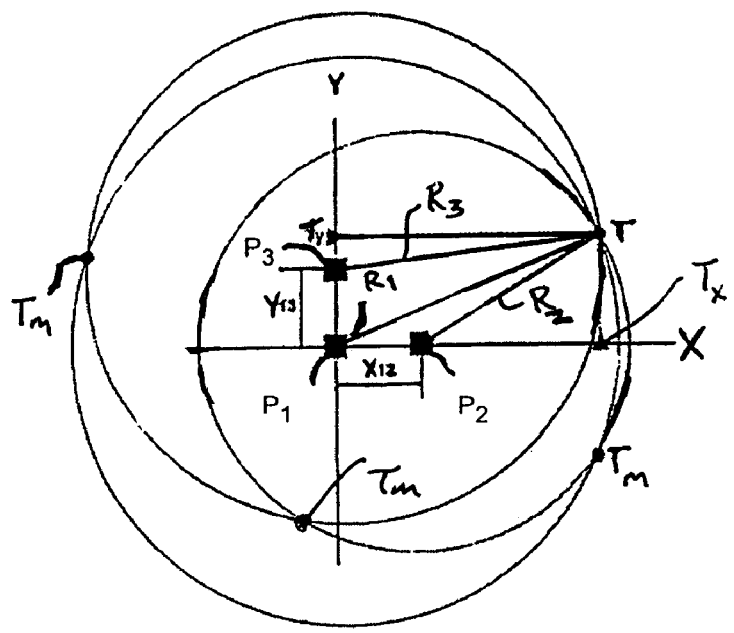
FIG. 7 is a graph showing position determination in accordance with an embodiment of the present invention.

Referring now to FIG. 7, one way of determining the position of a target T without using a directional antenna is illustrated according to the virtual triangulation technique of one of the exemplary embodiments of the methods of finding of the present invention. Virtual triangulation determines the distance to the target T, measured at any three points that do not lie in a straight line, by creating in real time the points for the determination. For example, in FIG. 7, three points $P_1$, $P_2$ and $P_3$ are located along coordinates X and Y such as, for this example at 90 degrees, however, coordinates with angles different than 90° also can be used. Similarly, for determining virtual triangulation in three dimensions, the target T is measured at any four points that do not lie in a straight line, or in one plane, by creating in real time the points for the determination. Simply, the method for finding the position determination of a target T in three dimensional space differ from two dimensional space merely by determining position information values for such fourth point.

Figure 8:
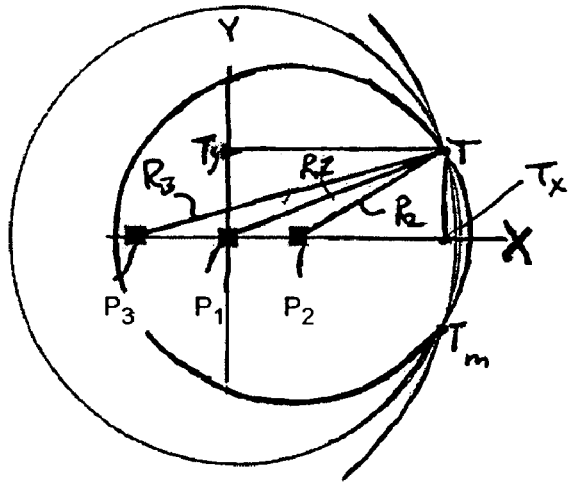
FIG. 8 is a graph showing ambiguity error in the position determination according to FIG. 7.

The value for distance measurement respective of a measured distance between the master unit and the target T can be represented as points $P_1$, $P_2$ and $P_3$. Similarly, values for measured distances between a respective master unit and the target T can be represented as circles configured with radii $R_1$, $R_2$ and $R_3$, respectively, from points $P_1$, $P_2$ and $P_3$. Simply, the target T can be illustrated as located at the point of intersection of three imaginary circles with centers at points $P_1$, $P_2$ and $P_3$ and having radii $R_1$, $R_2$ and $R_3$ corresponding to the distance measurements. Measurements at any two points also will produce a target image $T_M$, as is shown in FIG. 7. The three point measurement technique can be used to resolve position ambiguity. Referring to FIG. 8, where the measured values of such three points $P_1$, $P_2$ and $P_3$ are projected as lying along a straight line, resolution of the position ambiguity requires creating an additional value. For example, the position ambiguity cannot be resolved directly as no variation in location is present to distinguish between the position of points and the target so as to resolve the ambiguity, whereby another value for the position is desired. According, as to yet another embodiment of the present invention, the monitoring, master or slave units can be configured to prompt, upon detecting the position ambiguity condition, such unit to move so as to create a variation or other value to resolve the ambiguity of the straight line condition.

For any two circles, such as the circles that have radii $R_1$ and $R_2$, the centers of which lie along the X coordinate, the target coordinate $T_x$ (relative to these three points of measurements) can be calculated as follows:

$$T_x = ((R_1)^2 - (R_2)^2 + (X_{12})^2)/(2*X_{12}) \quad (11)$$

where $X_{12}$ is a value of the difference between the points ($P_1$ and $P_2$) at which the radii $R_1$ and $R_2$ intersect the X coordinate.

The value of the target coordinate $T_y$ (relative to these three points of measurements) can be found by substituting the value of X with the value of $T_x$ and the value of Y with $T_y$ in $R_y$ or $R_2$ circles equations (see below) and solving equation for $T_y$, where:

$$(X)^2 + (Y)^2 = (R_1)^2, \text{ (for circle } R_1\text{)} \quad (12)$$

$$(X - X_{12})^2 + (Y)^2 = (R_2)^2, \text{ (for circle } R_2\text{)}. \quad (13)$$

As is illustrated in FIG. 7, each pair of circles has two values of $T_y$, one for T and the other for its image $T_m$, thereby creating a total of four points T and three target image points $T_m$. This can be represented, for example, from equations (12) and (13) which involve circles $R_1$ and $R_2$.

$$T_{y1,2} = \pm sqrt((R_1)^2 - (T_x)^2). \quad (14)$$

Similarly, values for $T_{y3,4}$ and $T_{y5,6}$ for the two other T and or $T_m$ pairs of points can be found from the rest of combinations as is shown in FIG. 7. Additionally, some of the $T_{y(i,j)}$ pairs can have the same value for $T_y(k)$ and, similarly, some of the $T_{x(i,j)}$ pairs can have the same value for $T_{x(n)}$. In this condition, identical values for $T_{y(k)}$ and $T_{x(n)}$ represent the real target T coordinates, i.e. $T_{y(k)} = T_y$ and $T_{x(n)} = T_x$. In operation, by comparing all six Ty(i,j) values, the values for $T_x$ and $T_y$ can be found by the relationship $T_{y(k)} = T_y$ and $T_{x(n)} = T_x$. In the example illustrated in FIG. 7, it is assumed that there is no error in distance measurement. However, in the operation, there is an error that is associated with every measurement and such error is considered advantageously by the methods and system of the present invention in the determination to achieve improved accuracy.

Figure 9:
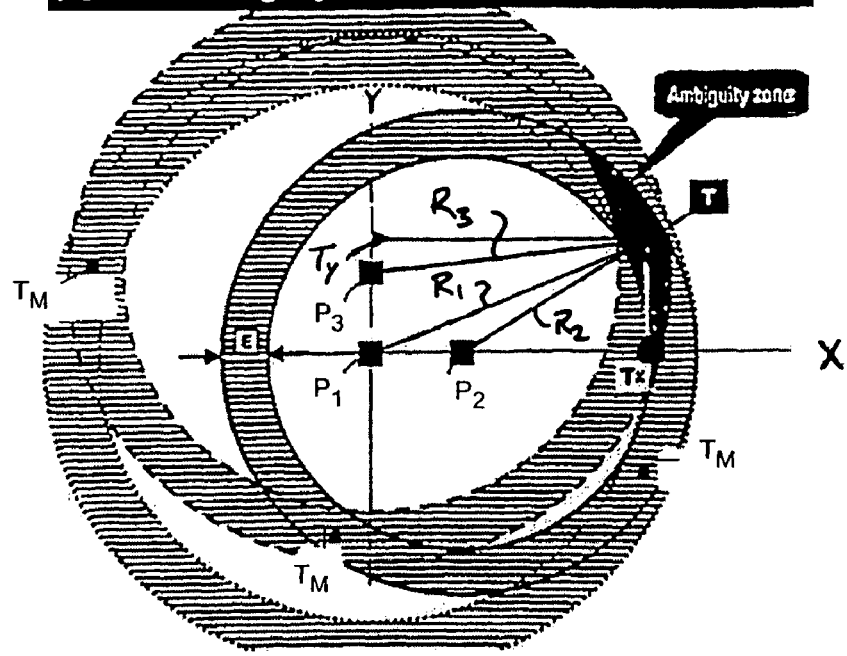
FIG. 9 is a graph showing position ambiguity error as a function of distance measurement error for the position determination method of FIG. 7.

Referring to FIG. 9, a case for resolving error in the determining technique is illustrated according to an exemplary embodiment of the present invention, whereby it can be seen that such error creates an ambiguity error zone shaded in black as illustrated in FIG. 9. Initially, the value or size of the ambiguity error zone appears to be relatively large; however, the size of the ambiguity error zone can be reduced if the relative distance between points $P_1$, $P_2$ and $P_3$ is increased according the technique illustrated in FIG. 10.

Figure 10:
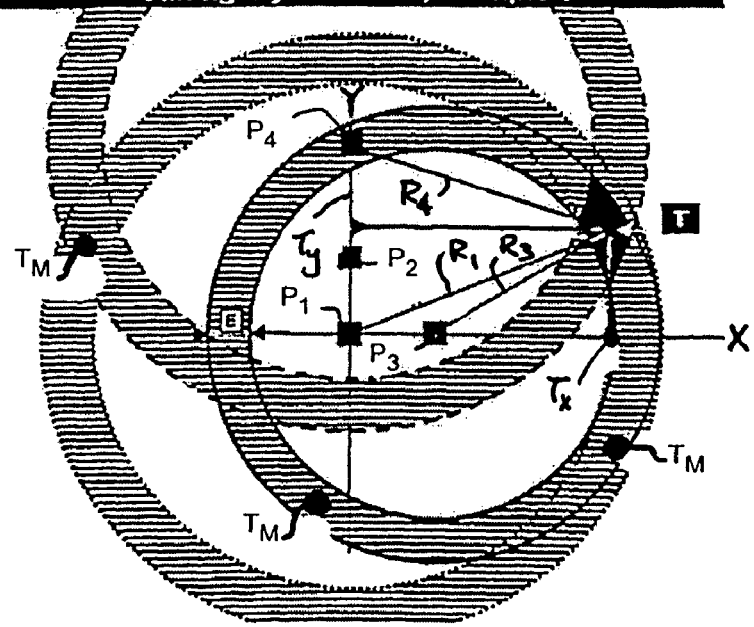
FIG. 10 is a graph showing an example of ambiguity error reduction in accordance with an embodiment of the invention.

Referring to FIG. 10, the technique of the present invention to reduce the value or size of the ambiguity error zone increases the distance between points. Initially, when the distance between points $P_1$ and $P_3$ is increased from 1.75*E to 4*E (point $P_4$), the ambiguity error zone can be reduced substantially, whereby the value of the width of the ambiguity error zone is equal to E and the value of the length of the ambiguity error zone is less than 2*E. According to the technique to reduce the ambiguity error zone by increasing the distance between points: (i) E is the worst case error value, (ii) E is constant such as, for example, E does not depends upon distance; and (iii) a typical value for E is about two to three meters.

Figure 11:
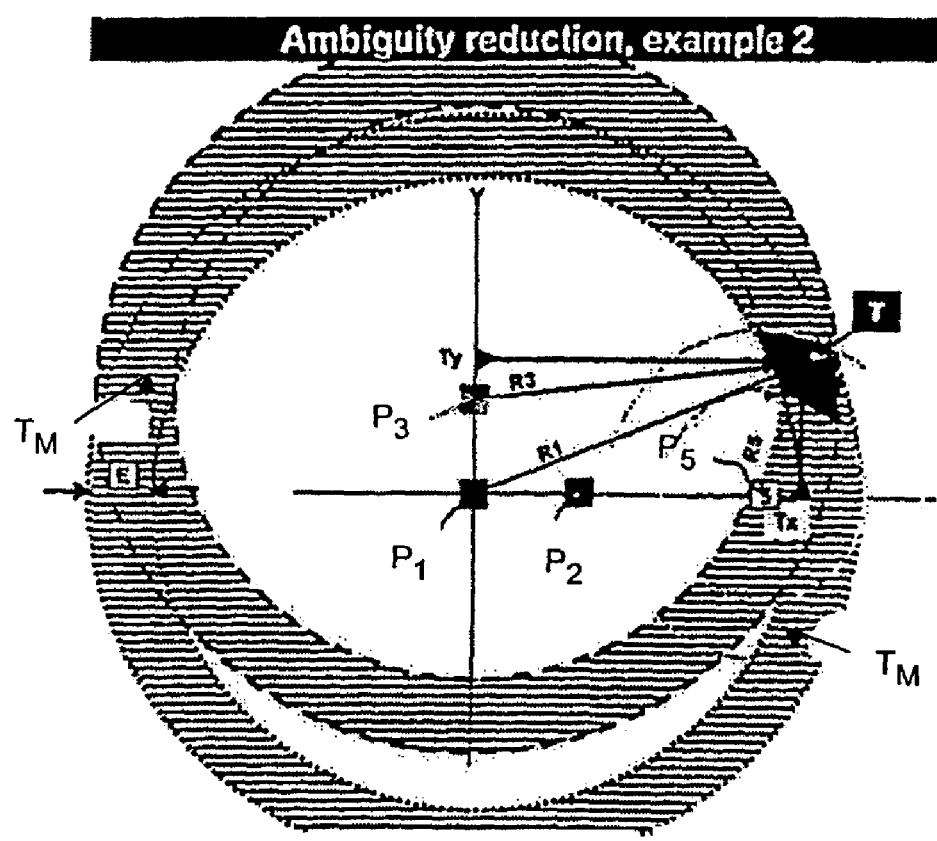
FIG. 11 is a graph showing another example of ambiguity error reduction in accordance with an embodiment of the invention.

Referring to FIG. 11, the technique to reduce the value or size of the ambiguity error zone further is illustrated. Similarly, when the distance between points $P_1$ and $P_2$ is increased from 1.9*E to 5*E (point $P_5$), the ambiguity error zone is further reduced, where the value of the width of the ambiguity error zone equals E and the value of the length of the ambiguity zone is less than 2*E.

Where the distance between points is infinite, such as points $P_1$ and $P_2$, the ambiguity error zone will be reduced to a square having each side equal to E. However, in operation, an infinite distance between points is a remote possibility.

Accordingly, for the system transceiver or monitoring unit, the processor is configured to recognize position ambiguity, ambiguity error zone, and to reduce such position and ambiguity zone errors utilizing the above-described techniques. Other techniques and steps in the various methods of the present invention are advantageously implemented to reduce complexities, increase accuracy, and automate the finding, coordinated search and movement and tracking process of a target. The methods and system of present invention is configured to reduce the overall task load on the user operating the monitoring or master unit 21, for example, during a homing operation by requiring the user to perform limited, simple repetitive tasks such as directing the user to move along straight lines, to make 90° or 180° turns. Such limited, simple repetitive tasks are conveyed to the user through the interface of the monitoring or master unit 21 either audibly or through a display of detailed execution instructions.

In operation, when utilizing the ambiguity reduction techniques of the present invention, the monitoring and or other master units are configured to bring the operator into a close proximity of a target T, within a value of a circle of [sqrt(2)*E] radius. At all times, the user can monitor other animate and inanimate things associated to a particular master or slave unit such as, for example, other children or persons, to track other targets and or inanimate objects, which is a disadvantage of the monitoring capabilities in the prior art when, for example various types of directional antenna are employed for homing. For example, in known devices when a directional antennas are employed for homing, not only will the operator not be able to monitor other targets T while homing in on one target T, but the operator also is required to have special skills in performing the search because of significant directional errors that are associated with these antennas. Moreover, prior art devices have not appeared to automate the searching process. As a result, the improved operation of the present invention as set forth in the exemplary embodiments offers advantages over the prior art by automating homing and reducing the tasks on the person monitoring the subjects. In addition, unlike the prior art that employs an omni-directional antenna(s), the various techniques utilized by present invention reduce workload on the user, the operation complexity, increases the flexibility and capabilities of the user, for example, the techniques where the user is capable of finding, locating and or tracking the target without fixed and or mobile references.

Examples of Methods for Finding

Virtual Triangulation Finding Techniques

The following search techniques for finding the target T ("finder" techniques) are based on one or more of the position determination principles described above, for example, the method according to the consine theorem. An exemplary technique according to the present invention is to determine the position of the target using virtual triangulation between the master or monitoring unit and at least one target T, whereby the monitoring device $M_s$ measures the distance between it and the slave unit and, alternatively, in addition to measuring the distance between itself and the slave unit (or another monitoring unit), the monitoring device $M_s$ measures the distance between its own successive locations. There are several technique for finding with virtual triangulation relates that are described herein, which are generally: (1) finding with virtual triangulation by generating position information in real-time, in the case of (i) stationary and moving target, and or (ii) in the case of the presence of obstacles; (2) finding with virtual triangulation relating to the average speed of the motion of operator; and or (3) finding with simplified virtual triangulation, whereby the user-device interaction is minimized—eliminating the need for monitoring device $M_s$ to measure the distance between its own successive locations as well as the user's signaling to the monitoring or master unit when in motion or during stops. The monitor and slave units may support one or more of these techniques. In some embodiments, preferably all of the search routines are stored in memory of the digital signal processor (DSP) of the master control units, such as (DSP) 74 of master unit 21. The routines can be selected by the user by making appropriate entries using the keypad 49 and the display unit 51 of the master unit 21. Alternatively, the master and slave units can be configured advantageously for operation in applications that require and use only a subset of the virtual triangulation techniques described herein.

A. Transceiver and Transponder Virtual Triangulation

Point Search Technique

Figure 12A:
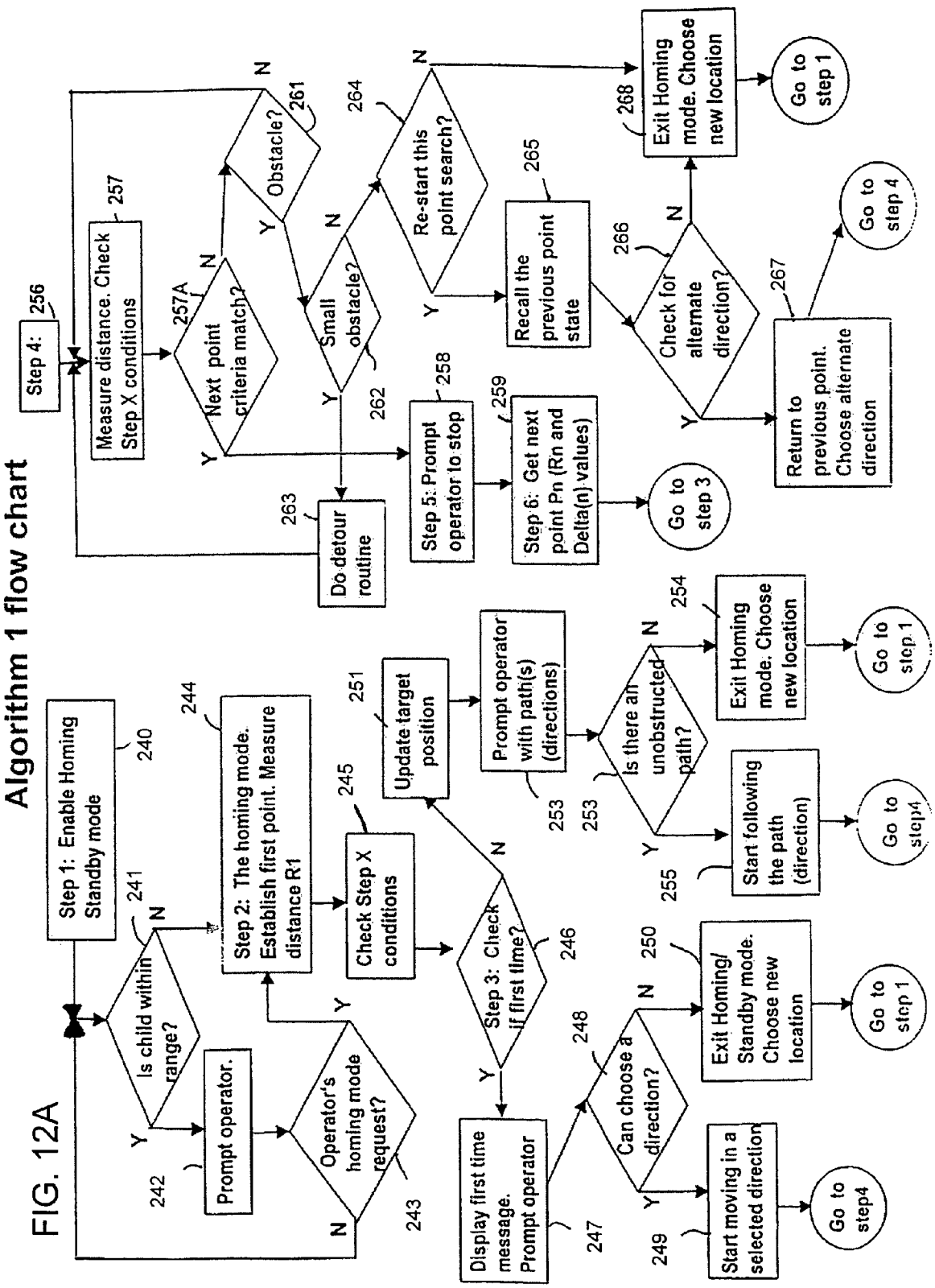
FIGS. 12A and 12B are process flow charts illustrating a technique (Technique 1) for determining the location of a target.
Figure 12B:
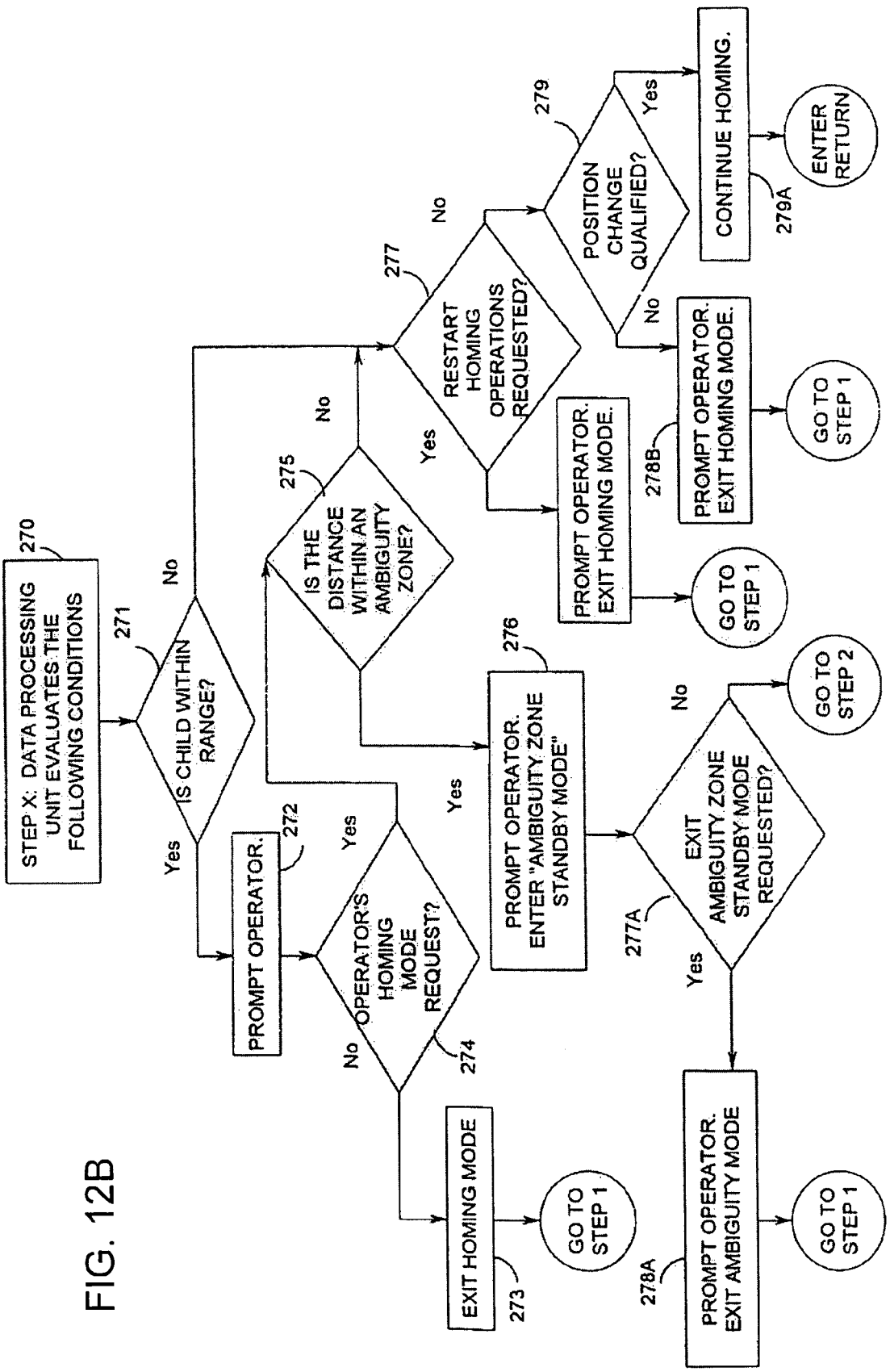

An exemplary method may be used in a situation when a target T moves out of an area and continues to move around. Reference is made to FIGS. 12A and 12B, which illustrate a process flow chart for the Point Search Technique and FIG. 15, which illustrates an exemplary application.

Figure 15:
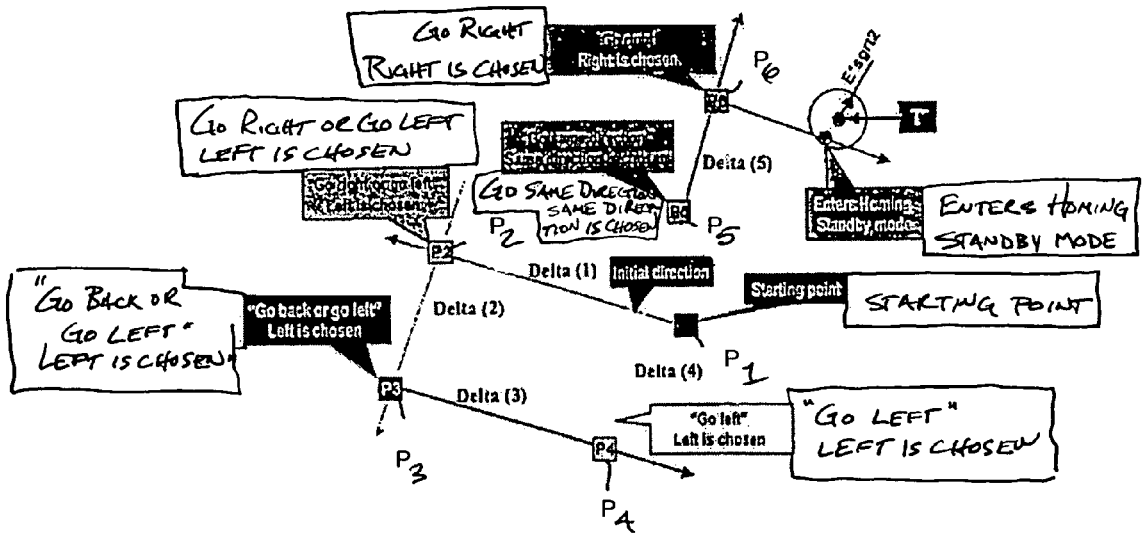
FIG. 15 illustrates the homing process for determining location of a unit associated with an animate or inanimate object otherwise known as a target in accordance with an embodiment of the invention using Technique 1, where no reference units are needed.

Referring first to FIG. 15, in the example, it is assumed that a slave unit is disposed on an animate subject such as, for example, a child, person, animal or an object in motion (keys in a purse) for that matter, to form a target. The target T is represented to be located at a point T in FIG. 15 which is out of the predetermined range of a master or monitoring unit located at a point $P_1$. In response to a monitoring operation, the user is prompted that the slave unit is out of range, and the monitoring unit automatically enters the homing mode. The user selects a direction and for example, begins moving along a path "Delta (1)" which happens to be in a direction towards a point $P_2$. As the user walks along this path, the user depresses the Step button 53 (FIG. 2A) on the master unit once for each step taken. After the user has walked a distance, such as to point $P_2$, that the value Delta (1) (the distance that the user has walked) is sufficiently large as to minimize the ambiguity error zone, the user is prompted to stop. The processor of the monitoring unit determines if the value Delta (1) is sufficiently large by determining that the distance between subsequent points Delta (n) is equal or greater than (4–5)*E, for example. A desirable Delta (n), which is equal to the difference ($P_{(n-1)}$—current position), can be also pre-programmed into the processor of the monitoring unit 21. The monitoring unit is storing the current "step count" which is indicative of the distance that the user has walked along path "Delta (1)". The monitoring unit prompts the user to go right or left from point $P_2$. In the example, it is assumed that the user chooses to turn left, which in the example is in a direction away from the location of the target T. The user begins walking along a path "Delta (2)" towards a further point $P_3$, operating the Step button 53 (FIG. 2A) to register the number of steps taken by the user along path "Delta (2)". After the user has walked a sufficient distance along the path "Delta (2)", the user is prompted to stop and wait for a prompt as to in what direction to head. Assuming that the user has reached a point $P_3$, the user is prompted to "Go Back" or to "Go Left", which directs the user towards the target T. In the example, the user selects to go left and upon reaching a point $P_4$, the user is prompted to "Go Left" and so the user will now be moving in the direction of the target at point T. When the user reaches a point $P_5$, the user is prompted to stop and is then prompted to "Go in the Same Direction". When the user reaches a further point $P_6$, the user is again prompted to stop and is then prompted to "Go Right", which direction is toward the target point T. As the user approaches the target point T, the monitoring unit will determine that the target point T, and thus the subject being located, is again within range. Moreover, the user typically will come within sight or hearing distance of the subject. The monitoring unit will revert to the homing standby mode. However, if for any reason the user wants to continue the homing operation, the user can override the monitoring unit. Other features, options and functions of Search Technique 1 are set forth in the following description of Search Technique 1. It will be appreciated that the prompts to the user from the monitor can be adapted to be simple and easy to use such as, for example, audible or text prompts could follow the metaphor and gradations between "hot" and "cold", and present a human aspect to a homing function—"getting hotter" or show direction by the use of arrows displayed on the master unit's LCD.

Referring to FIG. 12A, after initialization and programming, the monitoring unit may enter a homing standby mode, exemplary flow that A, block 240, wherein the monitoring unit periodically measures the distance to the subject. The monitoring unit may continuously display "Homing Standby On". The user can disable the standby mode by entering an appropriate sequence. When the standby mode is disabled, the monitoring unit may continuously display "Homing Standby Off".

Block 241 determines if the measured distance between the monitoring unit and the subject is within a pre-programmed value such as, for example, within the predetermined range of the master unit, and if so, the user is prompted to this effect, block 242, and the flow loops back, through block 243, to block 241 and the monitoring unit stays in the homing standby mode and continues periodic distance measurements. The homing mode can be also entered unconditionally by the user request or independent action. The monitoring unit is set into the homing mode by depressing a button or entering a sequence using the keypad. Block 243 enables the user to override the automatic mode and to request entry into the homing mode even when the subject or target is within range. This also applies to a case when an operator wants to continue homing search even if the target is within the range. The user enters an appropriate sequence and the monitoring unit 21 continuously displays "Range OFF".

If block 241 determines that the target is not within range, the monitoring unit prompts the user and automatically enters the homing mode, block 244, if programmed to do so. After entering the homing mode, the message "Homing On" is displayed on the message display 51 (FIG. 2A). A reset button or reset code entered using the keypad, can be used to reset (unconditionally exit) the homing mode, if desired by the user. In that case, the message "Homing Off" will be displayed on the message display. With regard to the monitoring range value, it should be noted that the monitoring unit can not conduct the search within the ambiguity error zone—within a circle of $(sqrt(2))*E$. As a result, the monitoring range distance value should not be smaller than the $(sqrt(2))*E$.

Exemplary flow path B includes a homing mode starting at block 244, the R1 distance (FIG. 7) between the starting point P1 and the target T is measured and the message "Homing ON" is displayed on the display along with the R1 value. This is the first point $P_1$ of distance measurement.

In block 245, the $R_1$ measurement is qualified in exemplary flow path X (FIG. 12B), as will be described. Exemplary flow path X qualifies the following events: (1) has the user moved within the range of the target; (2) has the user reached the ambiguity error zone; and (3) is there an unexpected significant change in the target's position or a change using statistical approach. Depending upon this qualification outcome, the exemplary flow path X may or may not continue the flow. In case the flow is continued, the monitoring unit enters exemplary flow path C3 at decision block 246.

In exemplary flow path C, the user of the monitoring unit may enter the "Find next point" mode. The monitoring unit keeps track of number of passes through path C at block 246.

If decision block 246 determines that it is the first time through the path C, flow proceeds to block 247 and the monitoring unit prompts the user with an appropriate message, including "Choose Initial Direction" prompt. The initial direction of walking is not important, the user can select any direction, block 248. The monitoring unit prompts the user to start walking and the user starts moving in the selected direction, block 249. Alternatively, from block 248, the user can exit the homing mode, block 250, and the flow returns to the standby mode, path A, at block 240. Otherwise, from block 246, flow proceeds to block 251 and the monitoring unit updates the target position and block 252 prompts the user with movement directions to make one or more of the following choices:

(1) the user can continue without changing the direction—"same direction";
(2) the user can make a 90° turn to the right—"right";
(3) the user can make a 90° turn to the left—"left"; or
(4) the user can make a 180° turn, for example, "go back".

The latter choice usually is displayed for points $P_n$ where n>3. The position of the target is determined in path C (block 251) when distance measurement values for three points $P_n$ become available (n=3). Subsequently, when more then three distance measurement values are available (n>3), normally the most current three measurements are used to update the target position (provided that these last three measurements do not lie along a straight line, FIG. 8).

Decision block 253 determines whether there is an unobstructed path. Because of physical obstacles, there can be cases where it can be difficult or impractical to choose a direction. In such cases, block 254, the user may:

(1) exit the homing and homing standby mode;
(2) move to a new, more open location; and
(3) re-start the search, e.g. path A at block 240.

Otherwise, the user selects the "same direction" or "right" or "left" or "go back" and positions his or her self accordingly, block 255 and starts following the selected path.

The user walks in a straight line, marking every step by pressing and releasing the "Step" button (FIG. 2A) on the monitoring unit. The monitoring unit 21 automatically counts the number of steps.

Alternatively, an external pedometer device automatically counts the steps taken by an operator in searching for a target, thus eliminating the need for the user to continuously depress the "Step" button while walking, or completely eliminating the need for a Step button 53 (FIG. 2A). In response to a request by the controller of the monitoring unit, the pedometer electronically transfers the step count to the monitoring unit. The pedometer's step count can be reset automatically upon the monitor unit request.

At all times that exemplary flow path C is executed, it is important that the user continue walking close to a straight line. Step length can be programmed into the monitoring unit 21. The monitoring unit 21 can hold step lengths of several operators. In addition, it is important that the user continue moving in the direction chosen. The monitoring unit 21 can prompt the user with an appropriate message in this regard.

Flow proceeds from block 256, exemplary flow path D, to block 257, which measures the distance the user has walked thus far. In this regard, the monitoring unit 21 periodically measures the distance between the monitoring unit and the target unit. Each measurement is qualified in path X, block 270 (FIG. 12B), which qualifies the measurement. Path X may or may not continue the flow. In the cases when path X continues the flow, in path 4, the processor of the monitoring unit checks for the next point criteria match—block 257A. If both or one of the following two events occurs:
(1) the difference between the current measurement and the previous distance measurement point $R_{(n-1)}$ value is statistically greater than a certain value, which depends upon E and $R_{(n-1)}$, and is calculated by the processor of the monitoring unit;
(2) the distance between the previous position $P_{(n-1)}$ and the current position is greater than a certain distance, which amongst other things also depends upon E and $R_{(n-1)}$, and is calculated by the processor of the monitoring unit.

A desirable difference ($P_{(n-1)}$–current position) can be also pre-programmed into the processor of the monitoring unit 21.

While executing path D at block 257A, the user may encounter some obstacles, as represented by block 261. If the user encounters an obstacle, the user has the following options to deal with these obstacles:
(1) To bypass small obstacles, as represented by block 262, the user executes a detour routine—block 263 and continues moving in the original direction. While bypassing the obstacle, the user can stop incrementing the step count until the user is back on track (direction) after which the user can estimate the straight line distance and adjust the count such as by pressing the Step button 53 (FIG. 2A) without making steps, or enter the estimated step count via keypad, which also includes the case of external pedometer;
(2) if it is difficult or impractical for the user to continue in the same direction, the user can cancel the measurement point search (restart this point search—block 264), recall the previous point state, block 265, and check for an alternative available direction, block 266. If an alternative direction is available, the user can return back to the previous measurement point and choose an alternate direction, block 267, and continue the next measurement point search, returning to block 256 (path D); or, if an alternative direction is not available, from block 266, exit the homing mode, choose and move to a new location, block 268, re-start the search (by re-entering path A, at block 240).

After the "next point criteria match" event has occurred, block 257A, the monitoring unit flow enters exemplary flow path E, block 258.

In path E at block 258, the monitoring unit prompts the user to stop walking. The user stops walking and acknowledges this event of stopping by pressing a button or, for example, holding the "Step" button depressed for a long period of time. This is the next point of distance measurement $P_n$. Flow proceeds to exemplary flow path F, block 259.

At this time, block 259 causes the monitoring unit to display the $R_n$ value, and the processor of the monitoring unit saves the $R_n$ value and the distance between $P_{(n-1)}$ and $P_n$, which is equal to:

$$|P_{(n-1)} - P_n| = (\text{step\_count} * \text{step\_length}) = \text{Delta}(n) \quad (15)$$

Thereafter, flow returns to block 246 and repeats path C to find the next Pn point and the value $R_n$ associated with that point Pn.

Referring to FIG. 12B, a description of path X is now provided. In block 270, the processor of the monitoring unit evaluates the following possibilities or cases.

Decision block 271 determines if the distance between the monitoring unit and the target T is within a pre-programmed value or communication range, the monitoring unit prompts the user, block 272, and if so, exits the homing mode, block 273, unless the user wants to continue the homing operation, block 274. This can be done even if the subject is within the range. The user enters an appropriate sequence and the monitoring unit responsively displays "RANGE OFF".

In the "RANGE OFF" mode, block 275, if the processor of the monitoring unit has determined that the user is within the target's ambiguity error zone, the monitoring unit displays "Ambiguity Zone Standby", block 276, and the processor checks for the user request to exit the "Ambiguity Zone Standby" mode, block 277A. If there is no such request the flow returns to the Step 2 (FIG. 12, block 244).

If the master unit 21 has moved into the ambiguity error zone, in this mode the user can move freely and can use other means and or sensory means, visual, voice, etc., for detecting the subject. The monitoring unit processor erases the prior distance measurement point's values, but continues the distance measurements to the target (path B). When the user has moved outside of the ambiguity error zone, the monitoring unit will enter path C, where operator will be prompted with the "First time message" and the search will be automatically re-started. If, while in the ambiguity mode, the user wants to exit the "Ambiguity Zone Standby" mode, the user must enter such request. The processor will check for this request in block 277A. The user is prompted and the "Ambiguity Zone Standby" mode is exited, block 278A and the flow is returned to path A. Note that upon exiting the "Ambiguity Zone Standby" mode, the processor automatically clears any pending homing mode request (unconditionally exits the homing mode).

If the distance is outside of the range or outside of the ambiguity error zone, the processor of the monitoring unit checks to see if the user decided to re-start the homing process, block 277. In this case the user is prompted, the homing mode is exited, block 278, and the flow is returned to path A.

If there is no request to re-start the homing process, the processor evaluates the target's position change, block 279. If the position change is qualified, the processor continues the homing operation, block 279A, the monitoring unit continues the flow (return), enters the next step. If after calculations have been carried out, the processor of the monitoring unit can not qualify the distance measurement data, the monitoring unit prompts the user, the homing mode is exited, block 278B, and flow is returned to path A. This can occur when the target's position has abruptly shifted and the previously obtained distance measurement data cannot be relied upon.

B. Virtual Triangulation–Successive Pattern Movement Technique

Figure 23:
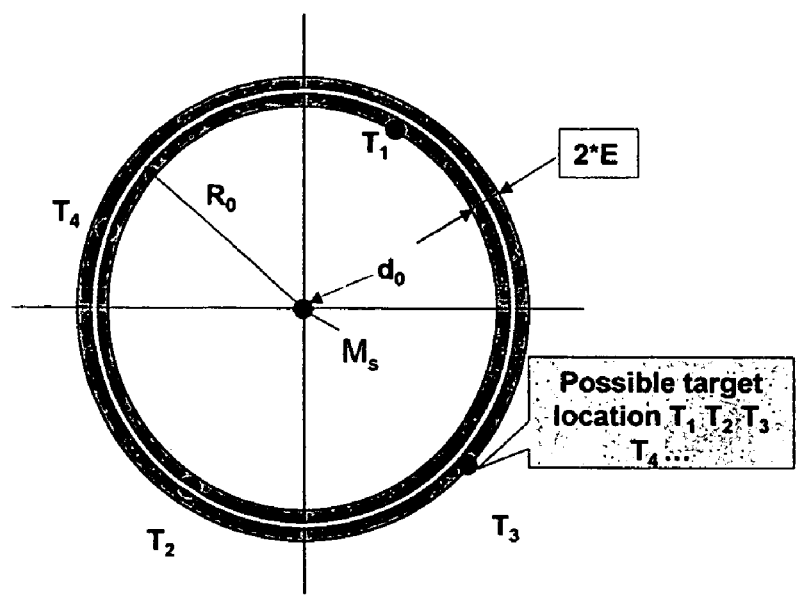
FIG. 23 is a diagram illustrating an exemplary embodiment of the method for resolving the position ambiguity between units; where no reference units are needed.

Referring to FIGS. 23-36, another exemplary embodiment of the methods of the present invention relating to virtual triangulation technique is described for determining the actual location of the target. Referring to FIG. 23, when a slave unit 31 is located within range of the monitoring unit 21, the monitoring unit 21 can measure the distance to a slave unit 31, but cannot determine the direction to the slave unit 31. Thus, conceptually, the slave unit 31 can be anywhere within the two concentric circles. The monitoring unit 21 utilizes "Successive Pattern Movement Technique" to find the precise location or position of a target or other unit. The Successive Pattern Movement Technique utilizes the Cosine Theorem to obtain and correct the direction to the location of the target T or slave unit after each additional measurement.

The Successive Pattern Movement Technique for finding, tracking and or locating operates in real-time both in the case of stationary and moving target as well as in the case of the presence of obstacles. For example, if an obstacle is present, the user can move around the obstacle while determining the location of the target. In operation, the user is instructed to move in relatively straight lines under the Successive Pattern Movement Technique. For any unplanned change in direction of movement, the user simply requests a distance measurement and calculation for the next successive movement such as, for example, the user inputs through the interface a request to the monitoring unit 21 to perform a distance measurement and the unit calculates a value for the distance for any of the slave unites 31, 32, 33 and 34, as is shown in FIG. 1. At the point of such request, the monitoring unit 21 stores the distance the user moved between direction changes either from a pedometer connected thereto or by the user entering a step count as is described herein.

Figure 24:
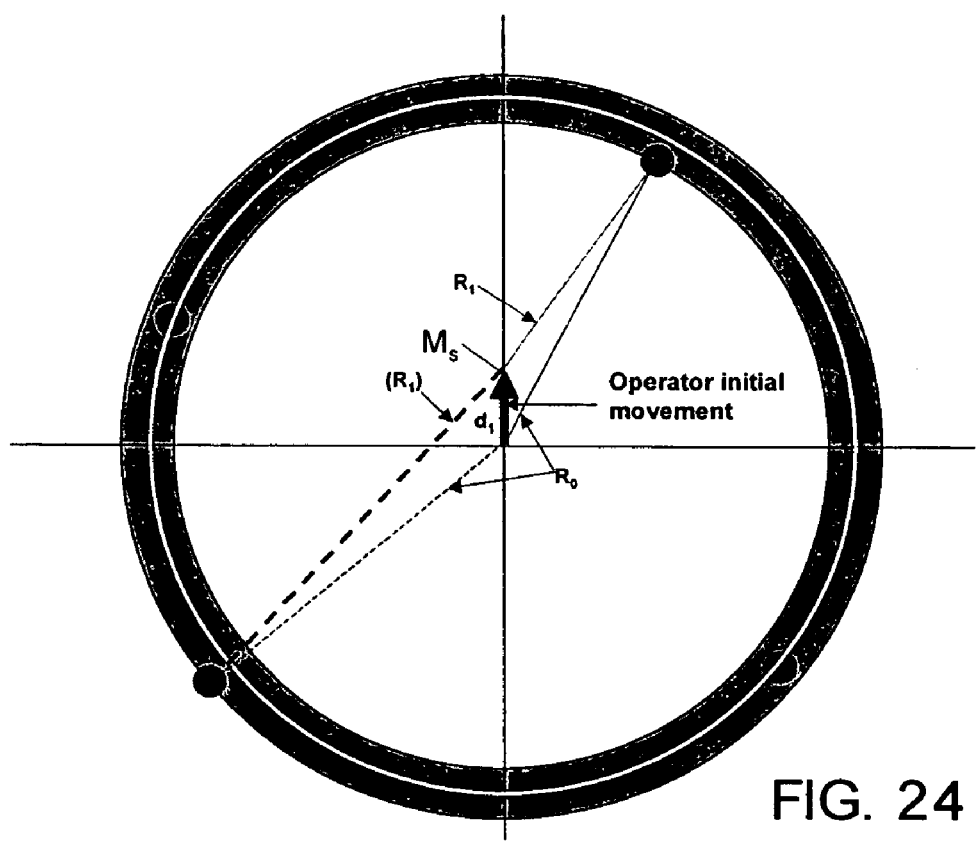
FIG. 24 is a diagram illustrating the technique for determining location of a target by resolving the position ambiguity between units, where no reference units are needed.

Referring to FIG. 24, a method to perform distance measurement $R_0$ at the initial point-$d_0$ is illustrated with respect to the monitoring unit 21. As above, the monitoring unit 21 can have a measurement error represented by E. At the location of a point for a particular monitoring, the error of the monitoring unit and or slave unit (represented as the Target T) is between $R_0-E$ and $R_0+E$ in the range represented by or on the circle with radius $R_0$ as is shown in FIG. 23. It should be appreciated that the measurement error E is determined reliably by a difference in the two measurement readings $R_i$ and $R_{i+1}$ when the following criteria is matched:

$$|R_i - R_{i+1}| > 2*E \tag{16}$$

The condition $d_1 > 2*E$ exists when the user initially moves in any direction for a predetermined distance $d_1$, as is illustrated in FIG. 24. In measuring the traveled distance, the user can use a pedometer associated with the monitoring unit 21 such as, for example, to measure the distance traveled ($d_i$). Otherwise the monitoring unit 21 counts steps as input by the user to provide a signal to device, for example, pressing a button for every step. Also, the user can count and input a total number of steps into the monitoring unit 21 and or input a value in the monitoring unit 21 that the distance $d_i$ has been covered after walking the distance $d_i$.

Once the user covers distance $d_i$ the monitoring unit 21 prompts the user to stop, whereby the unit generates a distance measurement by processing the position information. The monitoring unit 21 instructs the user audibly or through the display to proceed in another direction according to distance $d_{i+1}$. The monitoring unit 21 generates a $R_{i+1}$ distance measurement, and as in the first instance of computing the value is $R_1$, The processor 40 of the monitoring unit 21 determines sectors where the target may be located from the associations and relationships generated by the following equations:

$$\alpha_1 = \arccos\left(\frac{(R_{i+1}+E)^2 + d_i^2 - (R_i-E)^2}{2*d_i*(R_{i+1}+E)}\right) \tag{17}$$

$$\alpha_2 = \arccos\left(\frac{(R_{i+1}-E)^2 + d_i^2 - (R_i+E)^2}{2*d_i*(R_{i+1}-E)}\right) \tag{18}$$

Here, it is possible that because of the distance measurement error (E), the absolute value of the arccos function argument may exceed 1 and, in such case, the processor can be directed to assume that angle α is equal to 0 or 180 degrees depending upon the sign of the arccos function argument.

Figure 25:
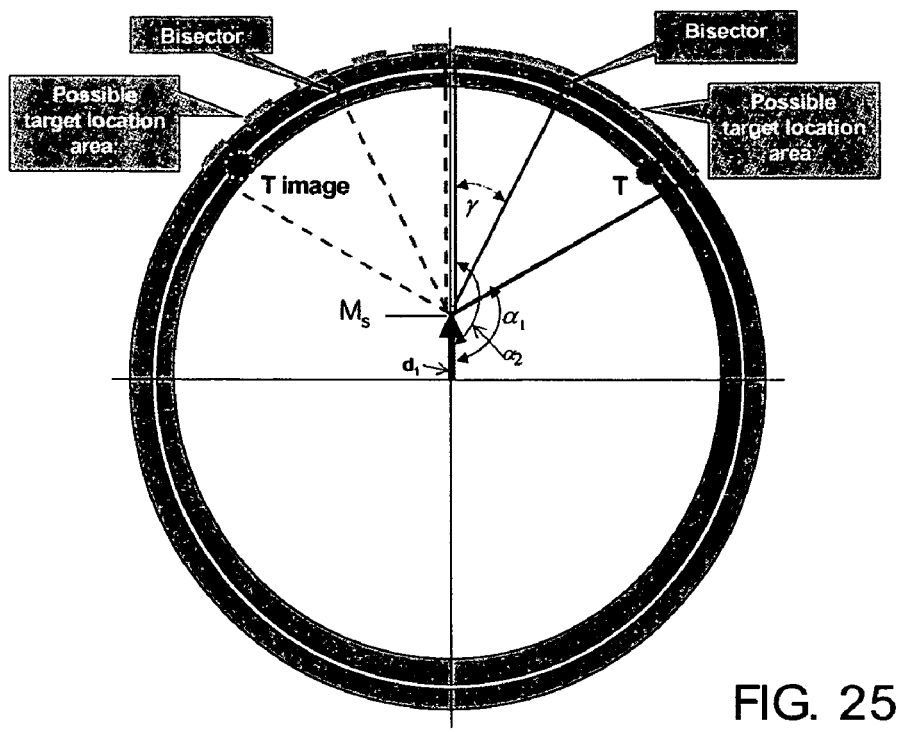
FIG. 25 is a diagram illustrating the technique for resolving the ambiguity zone created between units.

Referring to FIG. 25, this condition is illustrated where the target may be located from the associations and relationships generated from solutions of the above equations, where:

$$\alpha_2 = 0°$$

Since cosine is a symmetrical function, a value for a mirror image sector exists where the target may be located logically. Here, the arccos function determines and generates two symmetrical possible target location sectors and, where one of angles alpha is 0 or 180 degrees, two such sectors will have a common point. Here, the monitoring unit 21 prompts and or otherwise directs the user, audibly or visually, in a motion toward one of the two possible locations such as, for example, advantageously along the corresponding bisector lines for quick resolution of the association and relationship of the location of the target as is shown in FIG. 25. At this time, the monitoring unit 21 determines the next $d_{i+1}$ value, which in the first instance is $d_2$. Alternatively, the monitoring unit 21 can be use fixed value, i.e.:

$$d_1 = d_2 = d_3 = \tag{19}$$

whereby, the values of $d_i$ can be calculated by:

$$d_{i+1} = R_i * \cos(\alpha_0) - \sqrt{R_i^2 * \cos^2(\alpha_0) - R_i^2 + (R_i - 2*E)^2} \tag{20}$$

Where $\alpha_0$ is the difference between the largest of ($\alpha_1$ or $\alpha_2$) and γ.

$$\alpha_0 = (\max<\alpha_1\alpha_1>) - \gamma \tag{21}$$

Figure 26:
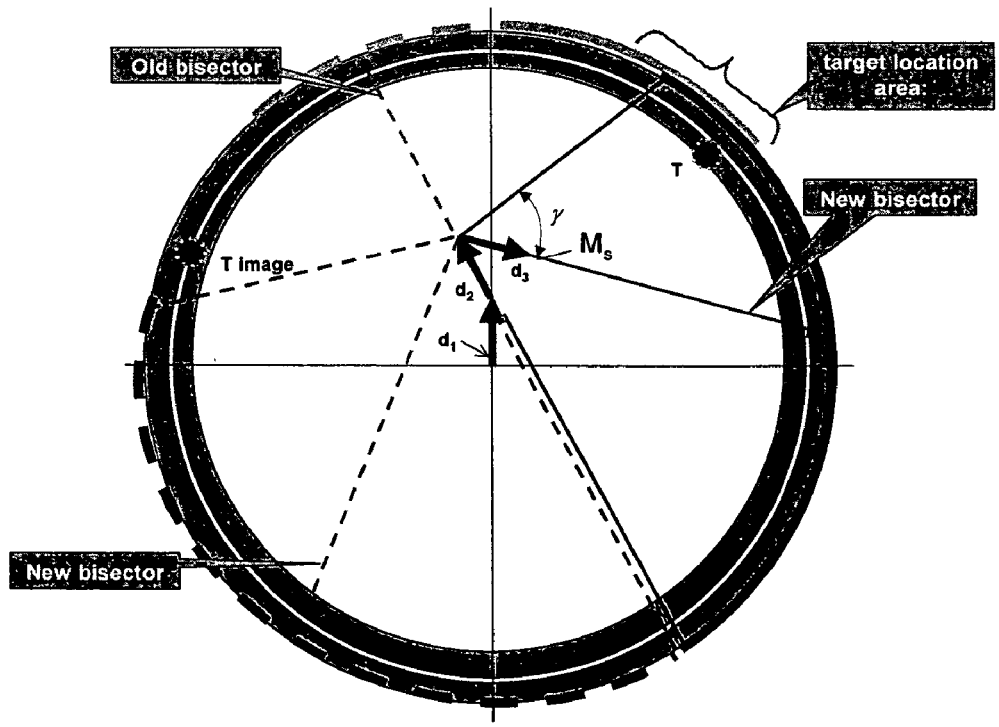
FIG. 26 is a diagram illustrating the technique for determining location of a target by resolving the position ambiguity between units; where no reference units are needed.
Figure 27:
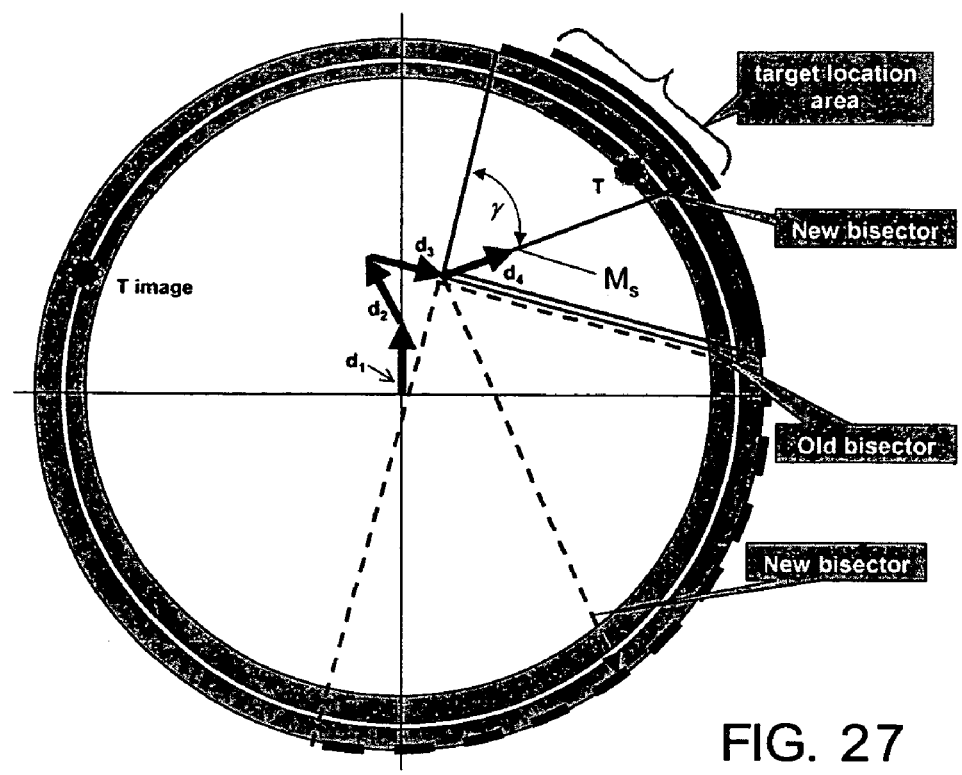
FIG. 27 is a diagram illustrating the technique determining location of a target by resolving the position ambiguity between units; where no reference units are needed.
Figure 28:
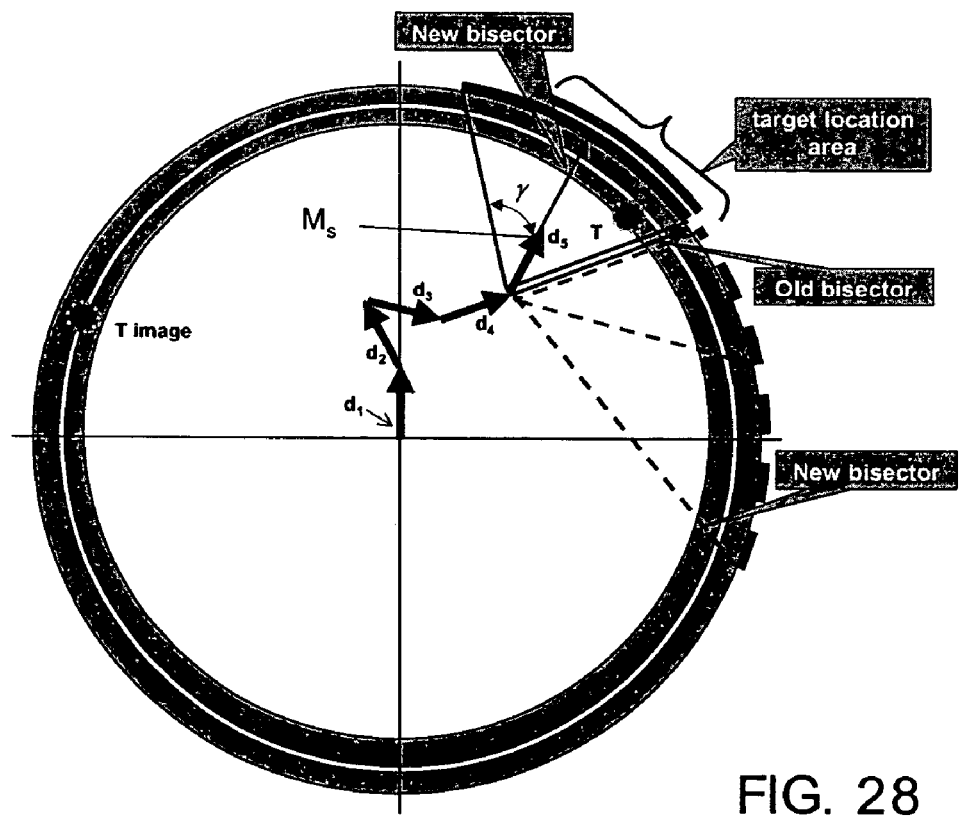
FIG. 28 is a diagram illustrating the technique for determining location of a target by resolving the position ambiguity between units; where no reference units are needed.
Figure 29:
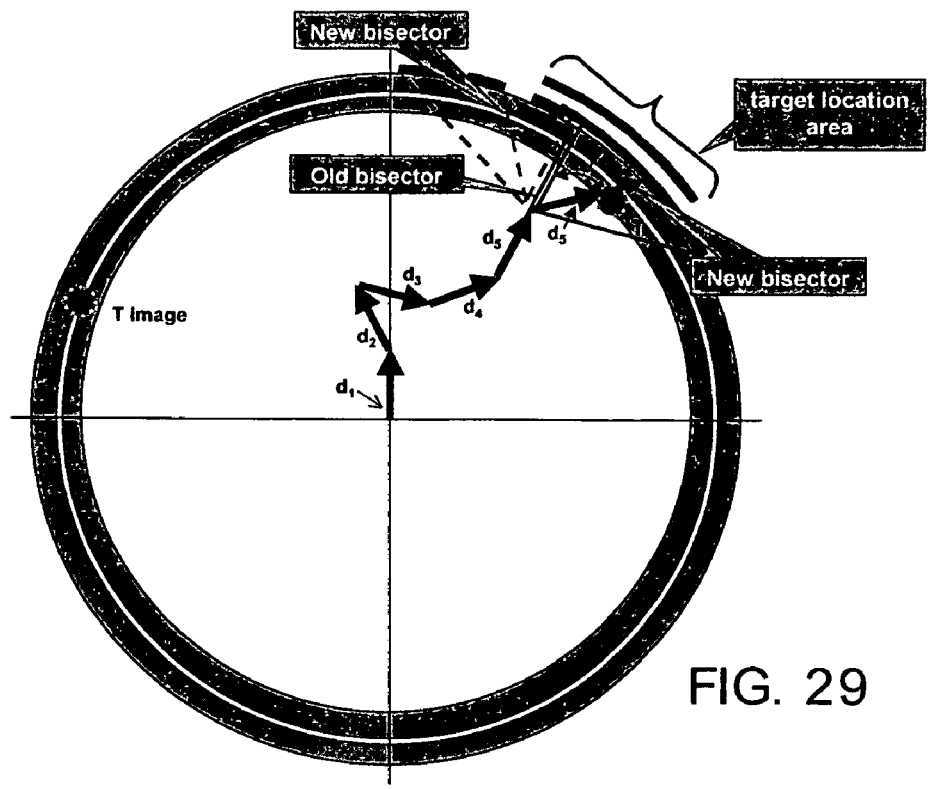
FIG. 29 is a diagram illustrating the technique for determining location of a target by resolving the position ambiguity between units; where no reference units are needed.

Ultimately, under such conditions the sequence of events may be identical for motion along each of the bisectors, whereby the user can select one of the bisectors and walk along the selected bisector for distance $d_2$ such as, for example, a bisector that leads away from the target T. Furthermore, the correction of angle in erroneously chosen path occurs normally relative to the direction of motion as is shown in FIGS. 26 and 27. The monitoring unit 21 determines at the end of $d_2$ a new direction or bisector(s) for the next $d_i$ value, under this example ($d_3$), if programmed to do so as is shown in FIG. 26. The monitoring unit 21 again will prompt and communicate the new bisector direction to the user and optionally its value ($d_3$). The target T is located in bisector when the target T location is in the intersection region of sectors from the previous and current determination, as is shown by the sector arc lines in FIG. 26. Each time the monitoring unit determines, or alternatively the user selects, the bisector of the newly formed sector to arrive on the target location such as, for example, the new bisector for distance $d_3$. At the end of $d_3$ the monitoring unit determines the new direction and or bisector and the next $d_i$ value ($d_4$), as is shown in FIG. 27. Again, the target T location can be determined to be located in the intersection region of sectors from the previous determinations and the current sector lines as is shown in FIG. 27. The technique is repeated as is shown in FIGS. 28 and 29 until the target is reached.

Figure 30:
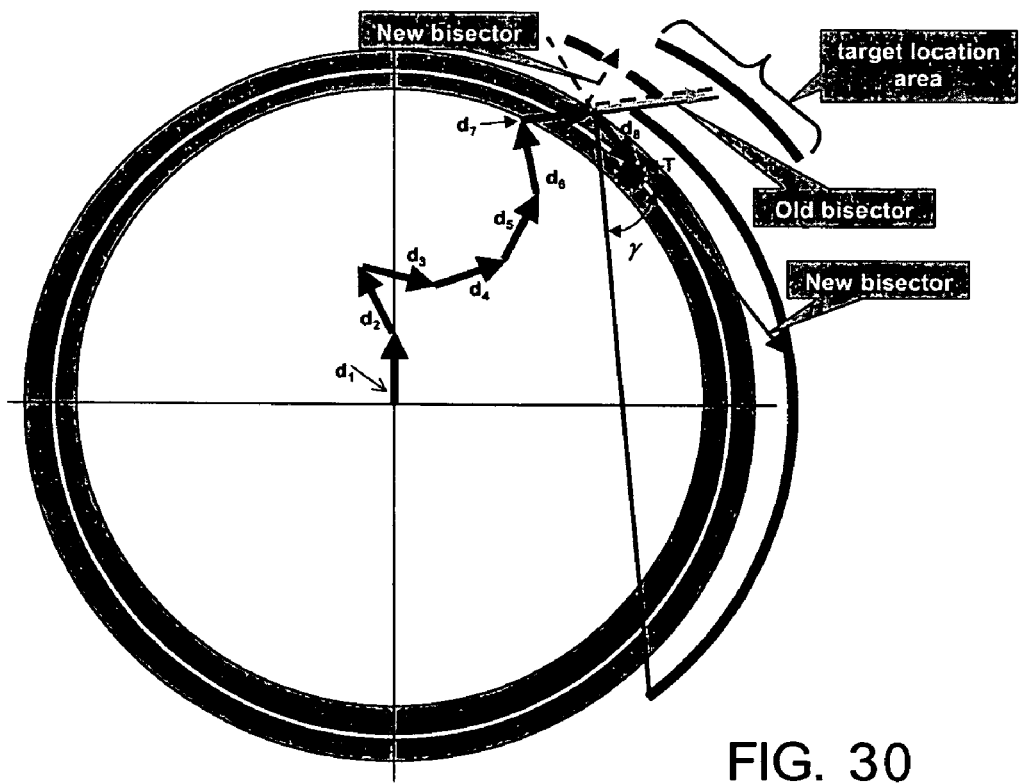
FIG. 30 is a diagram illustrating the technique determining location of a target by resolving the position ambiguity between units; where no reference units are needed.

As is shown in FIG. 30, the monitoring unit can propose an alternative angle and or direction of motion leading away from the target T, which when selected by the user, alternate bearings for each bisector, for example, after a subsequent determination on a predetermined bisector an opposite bearing is selected by the user, e.g. first left then right. Alternating bearings advantageously simplifies the position locating-tracking technique by determining the bearing to the position quickly without needing to calculate the intersection of sectors, which improves performance when tracking a moving target T and reduces the workload of the processor section of the monitoring unit as well as reducing the number of measurements taken and the time of search. In addition, according to the technique described above, the monitoring unit 21 can be configured to propose or otherwise automatically select for the user the bisector and or direction of movement to achieve optimal performance.

C. Virtual Triangulation~Successive Pattern Movement Technique Using the Speed of a User's Movement Under certain circumstances, the Successive Pattern Movement Technique using virtual triangulation is optimized when a user or the monitoring unit has no pedometer for inputting steps, or the user does not want to count steps such as, for example, after the initial movement and or position determination such task of inputting can become repetitive. The monitoring unit 21 nonetheless can perform the finding, tracking and locating operations by using the average speed of the motion of the user. The value of the average speed of the motion is determined by calculating a value for the time a user was in motion for a particular or selected direction. For example, an average speed of $V_{avg}$ can be calculated from the user's initial movement ($d_1$) during the determination using a step count. Subsequently, this virtual triangulation determination follows the sequence of:

a) Initially, the user moves in any direction for a predetermined distance $d_1$ b) The monitoring unit 21 determines a value for $V_{avg}$, the average speed of the user according to formula $$V_{avg} = (d_1)/(t_1) \tag{22}$$

where $t_1$ is the time the user spent traveling distance $d_1$.

c) The monitoring unit 21, of course, likewise repeatedly determines another direction of the subsequent motion and the next value of $d_i$.

The substitution of value of $t(i)*V_{avg}$ into Equation 22 can be made instead of distance $d_i$ in order to generate consistent data when traveling along bisectors, whereby:

a) A user moves along the selected bisector. The monitoring unit 21 counts the time of the motion of the user along the selected bisector and prompts the user to stop when the value meets the condition:

$$t(i)*V_{avg} \geq = d_i \tag{23}$$

b) The monitoring unit 21 carries out the measurement of distance to the target T and performs the calculation of the new sector and associated bisector as well as $d_{i+1}$, if desired.

c) The monitoring unit 21 continues determining such measurements by repeating steps a) and b) until the value of and or the location of the target T is reached.

By this method, the user is not inputting counted, or is not otherwise counting steps; instead the monitoring unit 21 determines a value of the time of the motion. For accuracy, the monitoring unit is configured to determine when the user has stopped (i) by the user inputting a stop, (ii) by a predetermined timing-out condition, or (iii) where the monitoring unit signals the user to turn off the timer after a predetermined time. Furthermore, the monitoring unit 21 can be configured to remain in a suspended state until motion is detected—thereby starting timing—as there is no need to perform continuous or periodic measurements of distance to the target T. The monitoring unit 21 can be configured to be based on a value of the measurement error (E) so as to determine a value when the user moves for a certain minimum distance ensuring that a reliable change in the distance measurement occurs.

Figure 31:
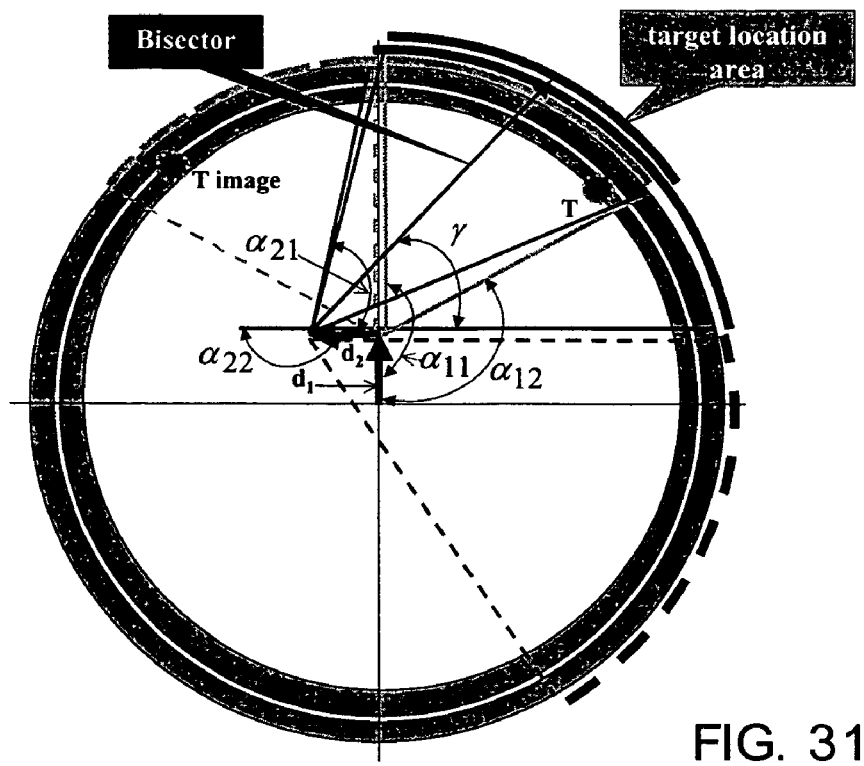
FIG. 31 is a diagram illustrating the technique determining location of a target by resolving the position ambiguity between units; where no reference units are needed.

D. Virtual Triangulation~Successive Pattern Movement Technique Minimal User-Unit Interaction Under certain circumstances, according to yet another exemplary embodiment of the present invention, the Successive Pattern Movement Technique using virtual triangulation is optimized to reduce the workload on the user, or to reduce the interaction between a user and the monitoring unit, whereby further simplification of the technique eliminates the step count effort and the user's input or otherwise signaling to the monitoring unit for motion or during stops. Normally, a user input signals, continuously or on periodic basis, indicate to the monitoring unit position or distance between successive movements. However, under a simplified, minimal user-unit interaction technique, the user inputting or otherwise providing such input information can be reduced in scope for determining position information while monitoring stationary or quasi-stationary targets. It is appreciated that while the minimal user-unit interaction technique is less efficient in comparison with other techniques such as, in particular for moving targets, nonetheless the minimal user-unit interaction technique is advantageous for determining and monitoring stationary or quasi-stationary targets that innately do not generate numerous values of position information. As a result, minimal user-unit interaction technique can be expressed as follows:

1. The user initial movement is:

a) Start moving in any direction for a predetermined distance $d_1 > 2*E$, as is illustrated in FIG. 24. The unit or user counts steps and, after determining a covered distance $d_1$, the unit prompts the user to stop;

b) The unit determines a distance measurement and sectors where the target T can be located, as is illustrated in FIG. 25 and Equations (17) and (18);

c) The unit prompts the user to change direction, e.g., to make a left or right turn and the user input or signals to the unit and starts moving in chosen direction for a predetermined distance $d_2 = d_1$ as is shown in FIG. 31;

d) At the end of the leg having a value of $d_2$, the user stops and the unit determines a distance measurement, finds sectors where the target T can be located based on such distance measurement and $d_2$ as is shown in FIG. 31 (purple lines);

In addition, the monitoring unit determines a sector for the logical location of the target T such as, for example, the sector is determined from the intersection region (blue lines) of sectors from the previous and current calculations—orange and purple sector arc lines—as well as its bisector represented by a magenta line, as is illustrated in FIG. 31. The bisector angle gamma is calculated from the values of $d_1$ and $d_2$ and the values of the angles generated and referenced as alpha, as is illustrated in FIG. 31.

2. The monitoring or master unit 21 prompts the operator or user to walk along this bisector and no distance $d_3$ will be specified at this time. The user walks in the direction of bisector (see FIG. 32). At the same time the monitoring or master unit starts periodically measure the distance to target T a) Device keeps record of periodical distance measurements. After every measurement the monitoring or master unit performs the following calculations:

If $R_{MIN} \leq R_{CUR}$, than $R_{MIN}$ is unchanged; or

Otherwise, the $R_{MIN}$ value is changed to the $R_{CUR}$ value

At the beginning $R_{MIN}=R_{CUR}=R_2$. However, the monitoring or master unit still keeps the $R_2$ value and keeps it as for further calculations $R_{MIN}$ cannot be larger than $R_{CUR}$, otherwise $R_{MIN}=R_{CUR}$.

b) Thereafter, the monitoring or master unit compares the current distance measurement ($R_{CUR}$) against the following criteria:

$$|R_2-R_{CUR}|>2*E \quad (24)$$

and $$R_{CUR}-R_{MIN}>2*E \quad (25)$$

Figure 32:
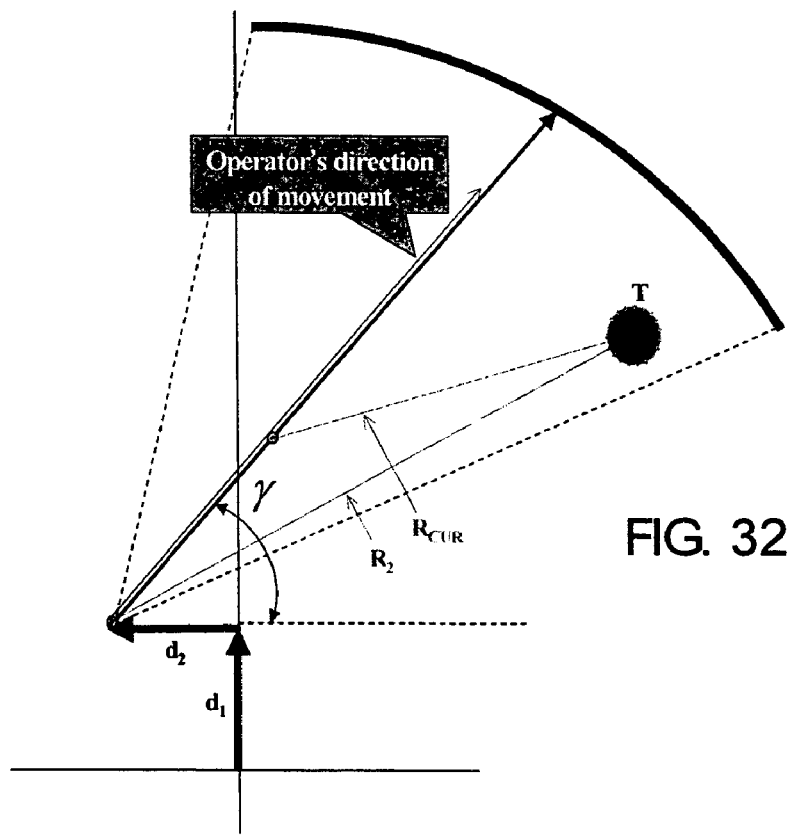
FIG. 32 is a diagram illustrating the technique determining location of a target by resolving the position ambiguity between units; where no reference units are needed.
Figure 33:
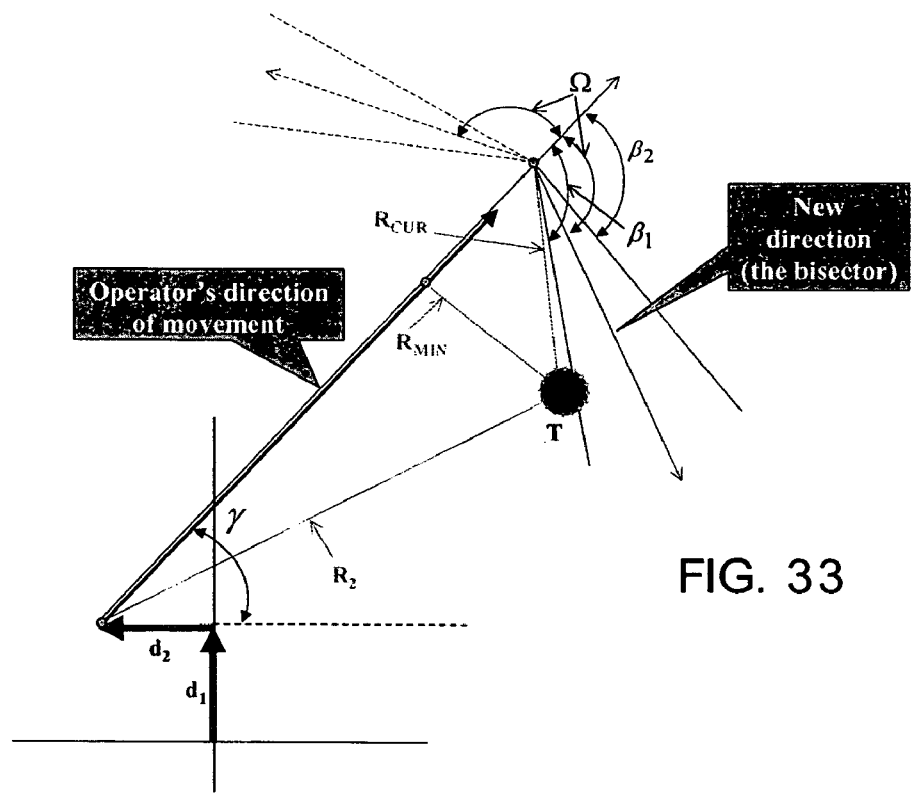
FIG. 33 is a diagram illustrating the technique for determining location of a target by resolving the position ambiguity between units; where no reference units are needed.
Figure 34:
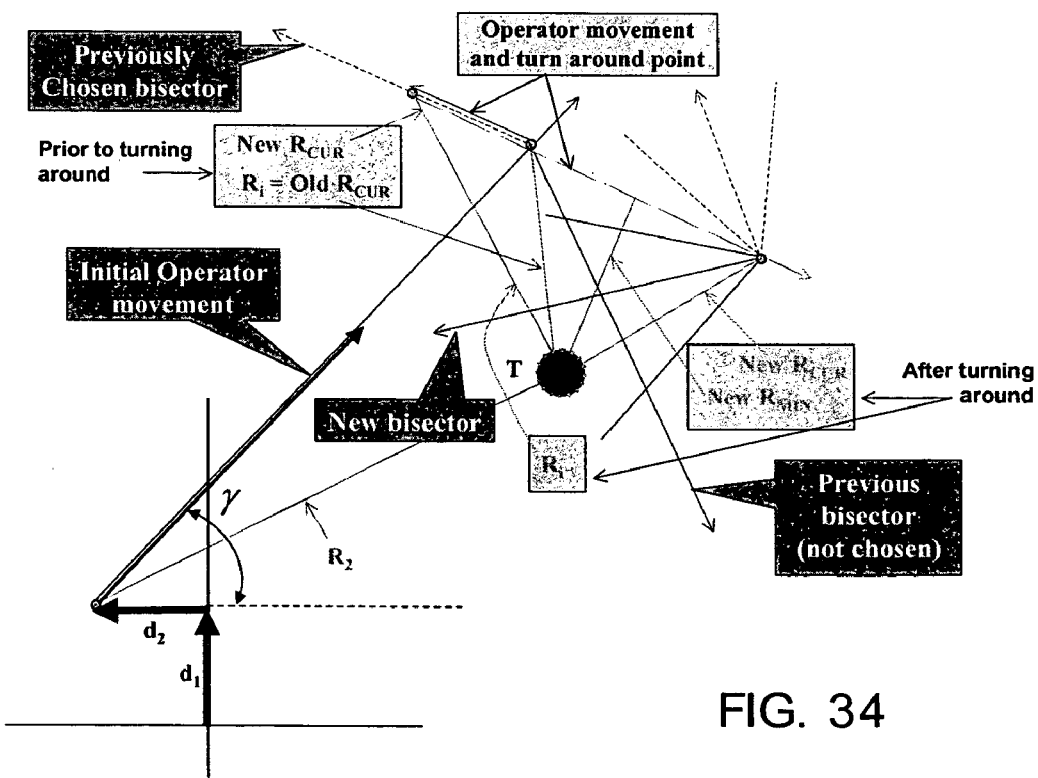
FIG. 34 is a diagram illustrating the technique for determining location of a target by resolving the position ambiguity between units; where no reference units are needed.
Figure 35:
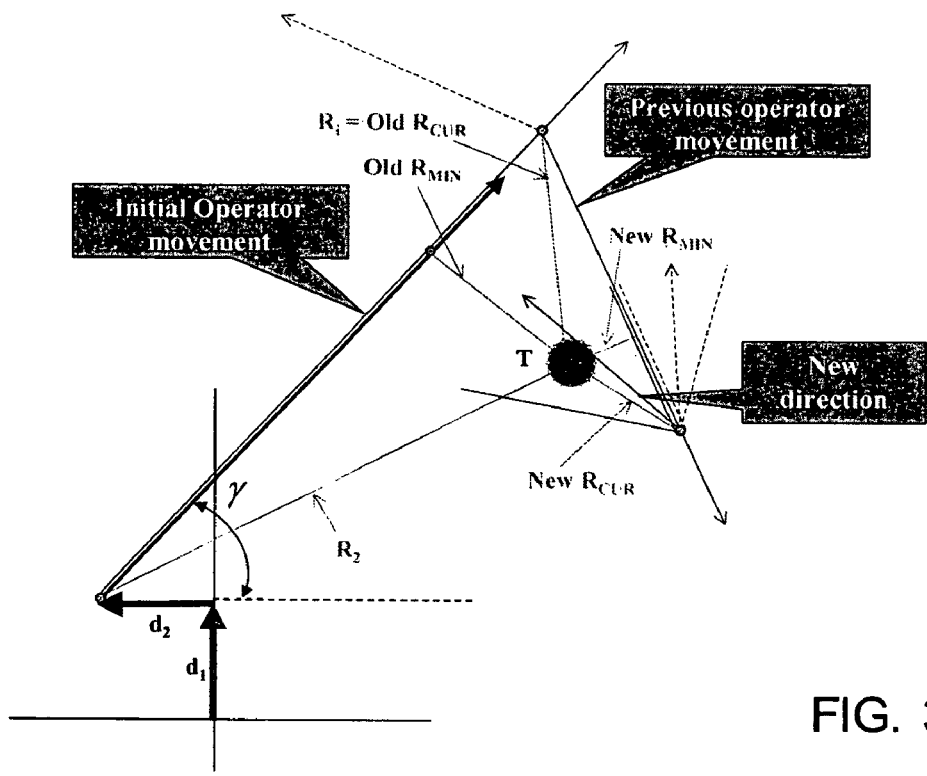
FIG. 35 is a diagram illustrating the technique for determining location of a target by resolving the position ambiguity between units; where no reference units are needed.
Figure 36:
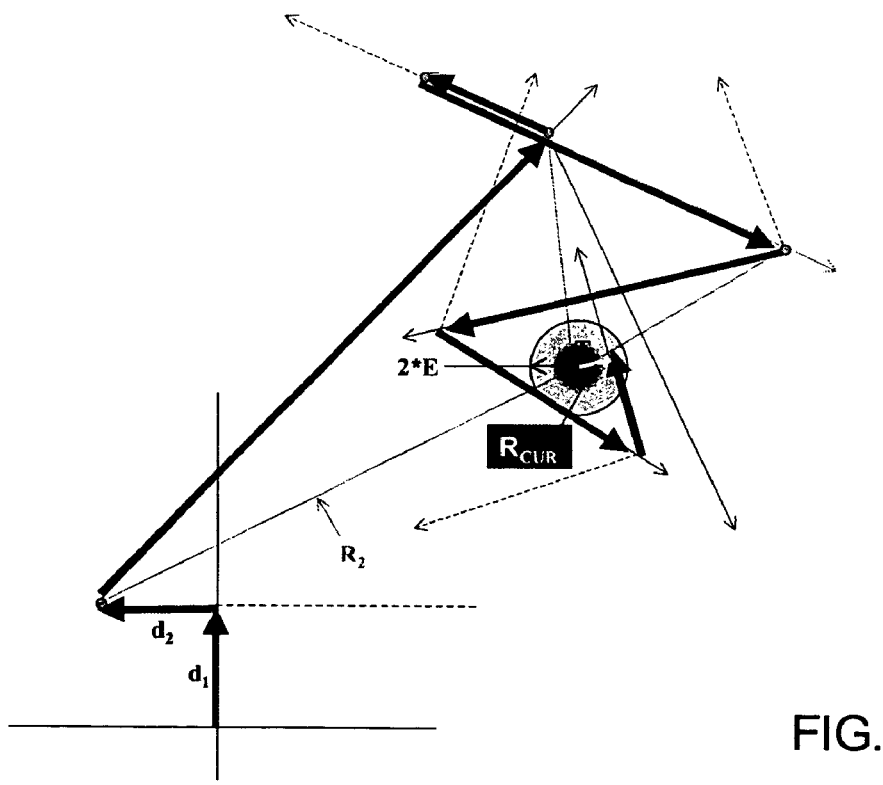
FIG. 36 is a diagram illustrating the technique for determining location of a target by resolving the position ambiguity between units, where no reference units are needed.

Where:
$R_2$—is the measurement value that was obtained after completion of movement along $d_2$ and before the user began walking along the bisector; $R_{MIN}$—is the minimum distance measurement value from all previous periodic measurements c) If criterion of Equation (24) is true and $R_2-R_{MIN} \leq =2*E$ and $R_2<R_{CUR}$, then the monitoring or master unit prompts the operator or user to stop, whereby the user is moving away from target. This should not normally happen at this stage, as the target image ambiguity has been resolved by calculating the intersection region of sectors from the $d_1$ and $d_2$ operator movements. It is an indication of target movement. In this case the user may switch to the main technique 1 or stop and wait for target movement to stop and then start from paths a and b.

d) If criterion of Equation (24) is true and criterion of Equation (25) is false and $R_2>R_{CUR}$ then: the user is closing in and the monitoring or master unit prompts operator to continue his movement. Alternatively, the monitoring or master unit may not provide any feedback to operator as long as he is getting closer to the target, for example, as is shown in FIG. 32.

e) If criterion (25) is true, and $R_2-R_{MIN}>2*E$, then:
the monitoring or master unit prompts operator to stop and to change the direction. The monitoring or master unit calculates the angle $\Omega$ for the new two directions options. These new directions are represented by the bisectors of the two newly formed sectors, which the target may belong to (blue lines in FIG. 33). These sectors can be found from the following equations:

$$\beta_1 = 90° + \arccos\left(\frac{(R_{MIN}-E)}{(R_{CUR}+E)}\right) \quad (26)$$

$$\beta_2 = 90° + \arccos\left(\frac{(R_{MIN}+E)}{(R_{CUR}-E)}\right) \quad (27)$$

It is notable, similarly to the previous technique, that when the module of the arccos function argument in Equation 27 exceeds 1 it can be assumed that angle beta is equal to 90 or 270 degrees depending upon the sign of the arccos function argument.

The user can choose from two bisectors. Operator picks up a bisector and walks along it.

f) During this time the monitoring or master unit keeps record of periodical distance measurements as well as calculating the $R_{MIN}$. It also compares the current distance measurement ($R_{CUR}$) against the following criteria:

$$|R_i-R_{CUR}|>2*E \quad (28)$$

and in Equation (25). Where $R_i$—is the $R_{CUR}$ measurement value that was used to calculate the angle omega, i.e. obtained before the user has changed the direction of movement. Note: At the beginning $R_{MIN}=R_{CUR}=R_i$. However, the monitoring or master unit will keep the $R_i$ value (see also step 2). Similarly to step 2, sub step b).

g) If criterion of Equation (28) is true and $R_i-R_{MIN} \leq =2*E$ and $R_i<R_{CUR}$, then: The monitoring or master unit prompts operator to stop because either operator has chosen a bisector that leads away from the target T or the target is moving. While stopped, the user can check if target is moving. If target is moving, may switch to the main technique 1 or wait for target movement to stop and then start from paths A and B. Otherwise, operator has chosen a bisector that leads away from the target. The monitoring or master unit will ask operator to walk along the chosen bisector in an opposite direction (see FIG. 34) and will restart from step 2 above. However, the monitoring or master unit will keep record about the turn around event.

h) If criterion of Equation (28) is true and If criterion of Equation (25) is false and $R_i>R_{CUR}$ then:
the user is closing in and the monitoring or master unit prompts operator to continue his movement. Alternatively, the monitoring or master unit may not provide any feedback to operator as long as he is getting closer to t: he target i) If criterion of Equation (25) is true, and $R_i-R_{MIN}>2*E$, then The monitoring or master unit prompts operator to stop. The user has chosen bisector that leads toward the target T, but passed the point of shortest distance to the target T and it is time to change the direction as described below 1. The monitoring or master unit calculates a new direction, using formula Equations (26) and (27) in the same manner as in step 2, sub step e), (see FIG. 35). However, if there was a turn around event, then the ambiguity of selecting from two available bisectors is eliminated, as the target is assumed to be in the vicinity of the previous bisector that was not chosen by the user; i.e. the bisector of choice and the previous (old) bisector that was not followed (chosen) must be intersecting (see FIG. 34)

2. Otherwise, the user must choose between two available bisectors. Here the user may follow several strategies. For example, the user may alternate bisector direction in a manner that is described in technique 1; or always choose bisectors in only one direction, for example, bisector to the left; or randomly (with the help of device) choose the bisector. Note: the monitoring or master unit can be preprogrammed to automatically provide bisector selection in all of the above strategies 3. The process continues by repeating the step 2 subsections f) through i) until the user reaches the target, see FIG. 36. Here, red and purple arrows indicate the user movements.

In this example the bisector to the left is always selected. For both techniques 1 and 1' it should be noted, that once the user arrived into ambiguity error zone where:

$$0 \leq R_{CUR} \leq =2*E \quad (29)$$

the monitoring or master unit will not be able to deliver a better accuracy and operator has to rely on other means of locating the target, for example, by enabling audio signals to the user such as a buzzer in the target device.

II. Technique 2, Method for Finding

A. At Least One Slave Unit Used as a Reference Point

A process flow diagram illustrating a search that uses three slave units as position references, which speeds up the target position determination and homing process as is shown in FIG. 12A. Alternatively, stationary reference points may be determined from monitoring or master units within range, however, the distinction in this method stationary slave units are less expensive, smaller in size and consume less power. Also a single stationary transponder reference points can be utilized as "bread crumbs" so monitoring unit(s) will be able to determine their own location relative to a single stationary unit using a virtual triangulation technique or any other technique described in the later sections. In the case of the three stationary slaves at any given point, the monitoring unit 21 can determine its location in the virtual coordinates that are formed by these three stationary slave units. As a result, the user does not need to mark steps by pressing the "Step" button or use the pedometer, or employ timer. Although the user is prompted to change the direction, the direction change does not need to be close to 90°, 180°, etc. This makes it easier for the user to bypass obstacles, because the user does not need to cancel the previous (next step) measurements and does not need to return to the previous point or perform distance estimation. In the end, the homing-in process is simplified and allows for the user's faster movement. Also, the homing-in process becomes obstacle resilient.

Figure 20:
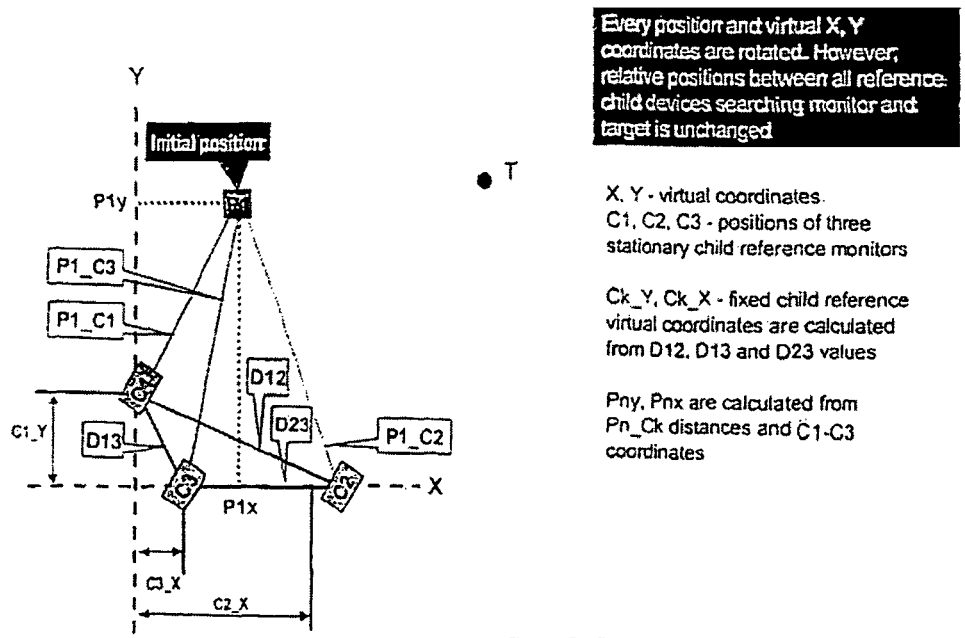
FIG. 20 is a diagram showing use of Technique 2 for homing with three stationary child units, with virtual coordinates rotated.
Figure 21:
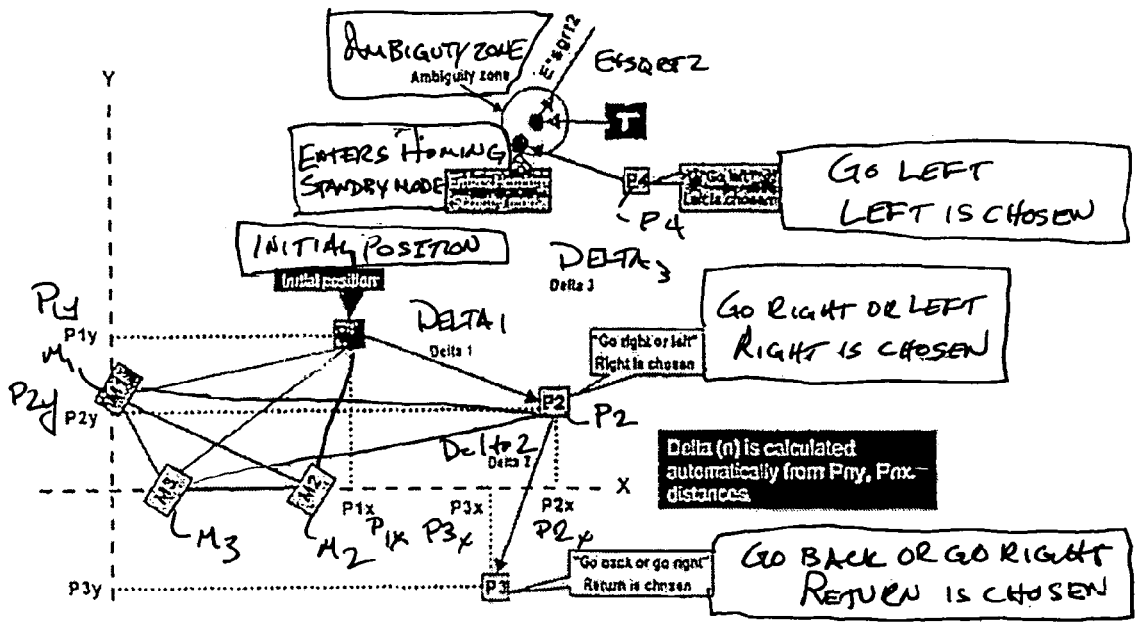
FIG. 21 is a graph illustrating the use of Technique 2 for homing with three stationary child devices in accordance with an embodiment of the invention.
Figure 22:
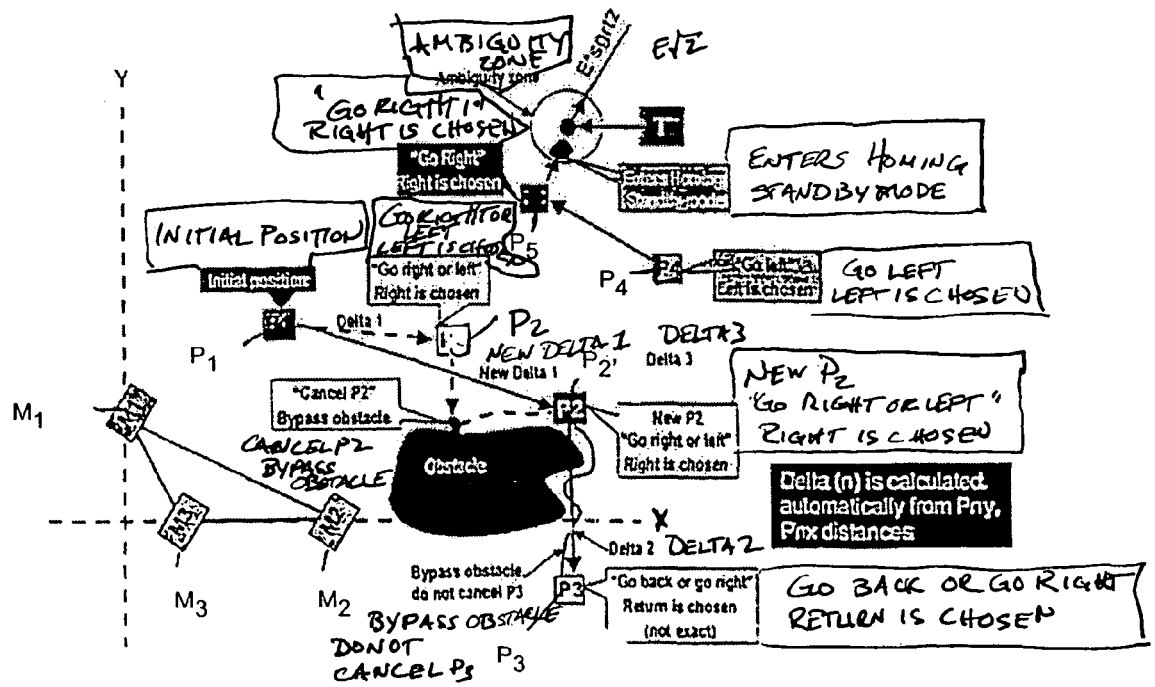
FIG. 22 is a graph similar to that of FIG. 21 and illustrating obstacle avoidance or bypassing operation.

An example of a distance determination process using Technique 2 with three stationary slave units is illustrated in FIGS. 20-22. Referring first to FIG. 20, the relative positions of a target T, which here is a slave unit or other transponder disposed on a child target (C), and a monitoring unit or searching monitor Ms are shown with respect to virtual coordinates X and Y. The positions of the target T, the searching monitor Ms and the three reference slave units $C_1$, $C_2$ and $C_3$ have been rotated for mapping into a display grid. Every position and virtual X, Y coordinate is rotated. However, the relative positions between all of the monitoring units Ms, $C_1$, $C_2$ and $C_3$ and the target T are unchanged. The searching monitor Ms at point $P_1$ is separated from target reference units $C_1$, $C_2$ and $C_3$ by distances $P_1\_C_1$, $P_1\_C_2$ and $P_1\_C_3$, respectively. Target reference unit $C_1$ is separated from target reference unit $C_2$ by a distance $D_{1,2}$. Target reference unit $C_1$ is separated from target reference unit $C_3$ by a distance $D_{1,3}$. Target reference unit $C_2$ is separated from target reference unit $C_3$ by a distance $D_{2,3}$. The distances between the target reference units $C_1$, $C_2$ and $C_3$ can be measured (by the searching monitor unit Ms) or have fixed values that are entered into a "searching monitor unit Ms" during the initialization phase. Also shown are $C_k\_Y$ and $C\_X$—target reference units $C_1$-$C_3$ X,Y coordinates. The distances, along the X coordinate between the target reference units $C_1$ and $C_2$ is $C_2\_X$ and the distance between reference units $C_1$ and $C_3$ is $C_3\_X$. The distance along the Y coordinate between $C_1$ and $C_2$ and $C_3$ is $C_1\_Y$. The $P_{ny}$, $P_{nx}$ (where n=1, 2, 3, . . . n+1) are the X,Y coordinates of the Ms points $P_{ny}$ (for simplicity only first point $P_n$ coordinates are shown). These can be calculated from the distances $Pn\_C_k$ and the X,Y coordinates for the positions of the target reference units $C_1$-$C_3$. To avoid position determination ambiguity, the three stationary target units $C_1$, $C_2$ and $C_3$ which are used as reference units preferably should not be located along a straight line as discussed above with reference to FIGS. 7-10, for example. Moreover, the distances $D_{1,2}$, $D_{1,3}$ and $D_{2,3}$ should be large enough to minimize ambiguity error as discussed above with reference to FIGS. 9-11, for example. In some embodiments, the preferable separation distances can be stored in the memory of the master unit and displayed automatically by the searching monitor when entering into Technique 2 mode.

FIG. 21 shows the relative locations between the searching monitor Ms, the target reference monitors $C_1$, $C_2$ and $C_3$ after the searching monitor Ms has moved a distance Delta 1, from its initial position at point $P_1$ to a point $P_2$ and then a distance Delta 2 from point $P_2$ to a position $P_3$. When the searcher with searching monitor Ms reaches point $P_2$, the monitoring unit calculates the position of the searching monitor relative to the virtual coordinates X, Y using distance information provided by the target reference units $C_1$, $C_2$ and $C_3$. As a result, the X,Y coordinates for points $P_n$ ($P_{ny}$ and $P_{nx}$) become known. The distance Delta is calculated automatically from the values for $P_{ny}$ and $P_{nx}$. The searching monitor provides a prompt "Go right or left". In the example, the searcher has chosen to go right and proceeded to point $P_3$ and the process is repeated. The searching monitor Ms provides a prompt "Go back or go right". In the example, the searcher has chosen return and proceeds to point $P_4$ where the searcher is prompted to proceed. This takes the searcher into the proximity of the target T such that the target is within range and the searching monitor returns to the homing standby mode.

FIG. 22 illustrates a variation of the example shown in FIG. 21 wherein the searcher with the searching monitor Ms encounters an obstacle upon selecting to go right from point $P_2$. Upon encountering the obstacle, the searcher cancels the original point $P_2$ and continues moving to a new point $P_{2'}$ (also referred to as "New $P_2$" in FIG. 22). In response to the prompt, the searcher again has chosen to go right, and the searcher has bypassed the obstacle without need to move close to a straight line. The example continues as described above with the searcher continuing to points $P_3$ and $P_4$ and then to the proximity of the target.

Figure 13:
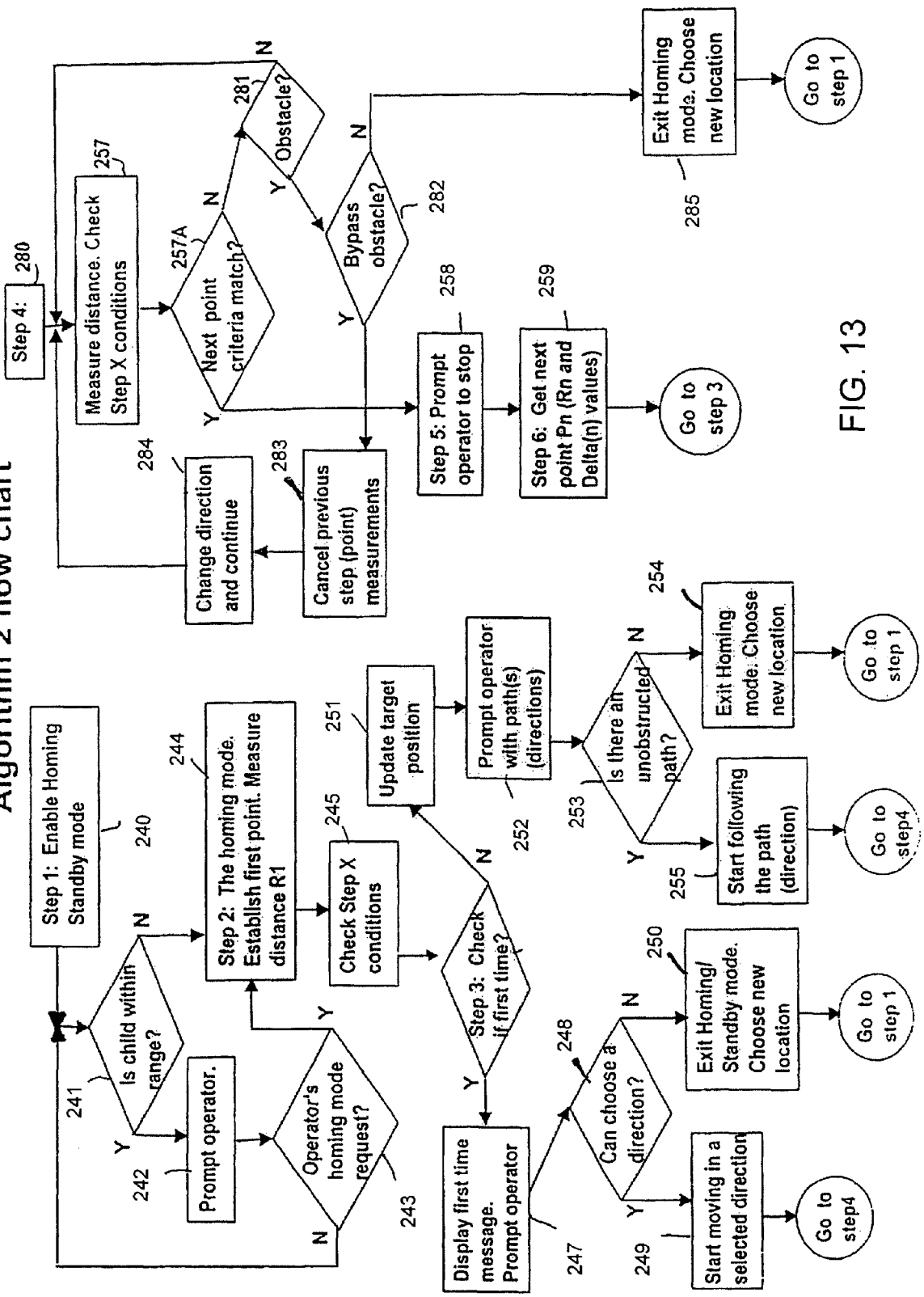
FIG. 13 is a process flow chart illustrating another method (Technique 2) for determining location of a target.

Referring to FIG. 13, the process flow chart for this method is similar to that for a virtual triangulation point search, as shown in FIGS. 12A and 12B, and accordingly for clarity, similar or like blocks of the process flow diagram for this method are referenced using the same reference numbers as corresponding blocks, for example, Paths A-C, of blocks 240-255 and Path D is entered via block 280. Block 257 provides distance measurement and checking for path X conditions as in virtual triangulation point search technique, thereafter flow proceeds to block 257A which provides "next point criteria match" similar to finding by virtual triangulation. After the "next point criteria match" event has occurred, block 257A, the monitoring unit flow enters path E, block 258 and continues to path F, at block 259, and returns to path C similar to finding by virtual triangulation. Alternatively, if block 257A determines that a next point criteria match event has not occurred, flow proceeds to decision block 281 which checks for an obstacle. Block 282 determines if an obstacle can be bypassed—if so, flow proceeds to block 283 which cancels the previous point measurements and, at block 284, allows direction to be changed and the flow is returned to block 257—if not, block 282 determines that the obstacle cannot be bypassed, flow proceeds to block 285 which exits the homing mode and the user must chose a new location and restart the homing process. Flow is ultimately is returned to path A, block 240.

B. Multiple Monitoring or Master Units as Reference Points

Figure 38A:
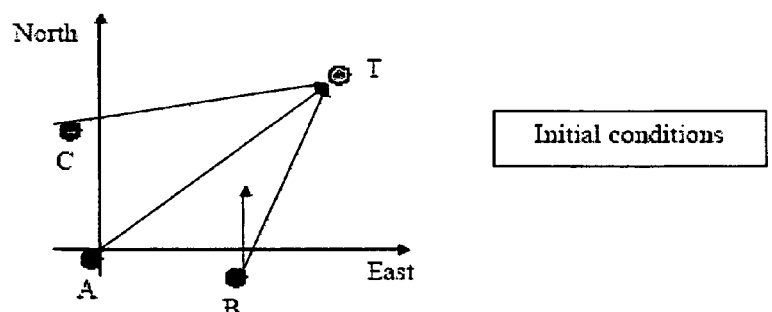
FIG. 38A and 38B is a diagram illustrating the mobile network created by the monitoring and slave units to track a target T.
Figure 38B:
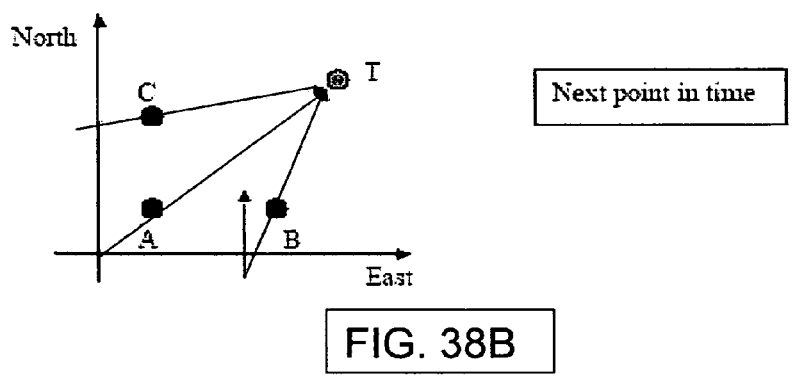
Figure 39:
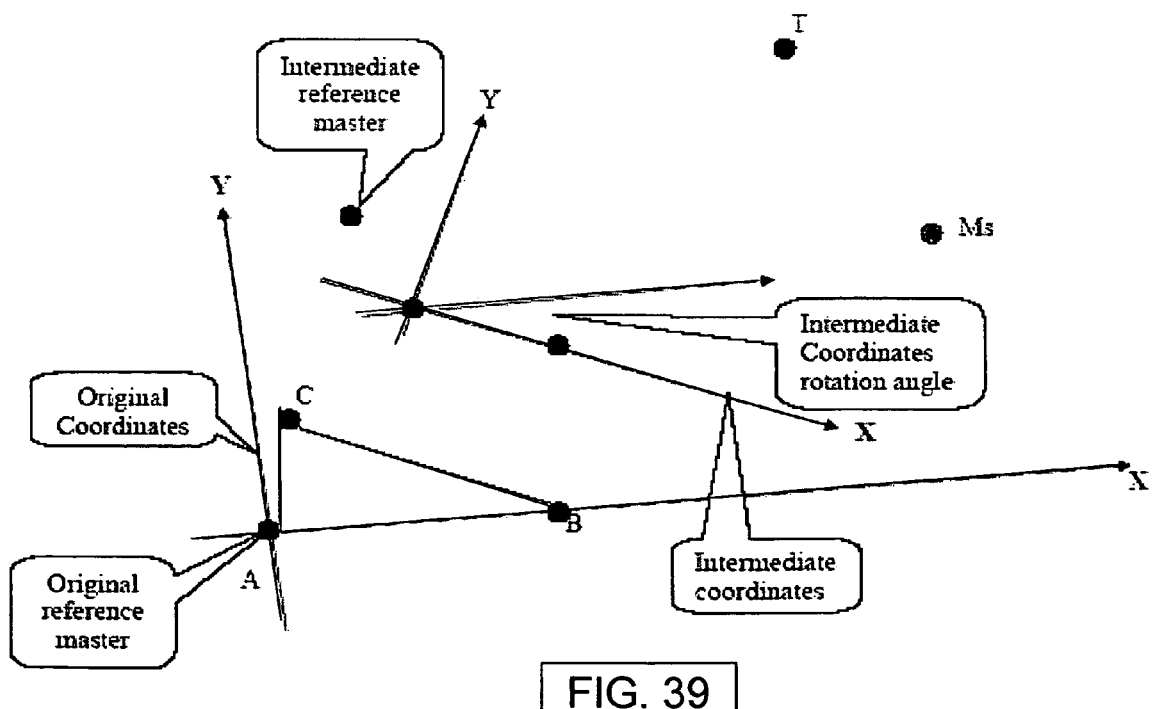
FIG. 39 is a diagram illustrating the mobile network created by the monitoring and slave units to track a target T.

Referring now to FIG. 38A and 38B another technique for finding the target is illustrated which uses three stationary monitoring or master units as reference points in an adaptive interactive mode. According to the method, a monotoring unit is configured to operate as a searching monitoring unit $M_s$ and to generate values for points $P_1$, $P_2$ and $P_3$ by obtaining such points $P_1$, $P_2$ and $P_3$ from at least three stationary master references $M_{ref}$. The designation of a monitoring or master unit in the operable range as the searching monitoring unit is advantageously adaptive for optimal performance such as, for example, when a particular monitoring unit can hand-off its searching monitoring unit $M_s$ functions under predetermined conditions including the target moving out of its range into the range of another monitoring unit. Furthermore, the method allows for tracking of multiple searching monitoring or master units $M_s$ and targets T by using stationary references and advantageously increases the location or otherwise speeds up the search process. The method also shares generated data, generates data between multiple searching monitoring or master units $M_s$ concerning the position of multiple targets T, thereby making an interactive network of monitoring or master units $M_s$. The monitoring or master units $M_s$ can communicate with each audibly, visually, transmit data concerning identity, distance measurement, multiple error factors—attenuation, propagation, calibration, clock synchronization or the like as well as data lists of targets within the predetermined range of a predetermined monitoring or master units $M_s$. The monitoring or master units, irrespective of being designated as the searching monitoring unit $M_s$, can be configured to measure repeatedly the distance between each monitoring or master unit within the predetermined communication range.

In operation, an interactive search is configured advantageously to have the monitoring or master units $M_s$ to not rely on the distance measurements between successive moves of the units $M_s$, which eliminates the repetitive method of inputting reference points such as, for example, the steps of a user counting steps, entering one or successive inputs, stopping and waiting for a new direction, and so on as has been described herein at least with respect to the virtual triangulation determination. Each monitoring or master units $M_s$ can display the position of target T and each monitoring or master units $M_s$ in range on a grid or polar LCD display having scaled coordinates. Under certain circumstance it is desirable and advantageous to display the traces of movement between successive values of the position of the target T and each monitoring or master units $M_s$ or optionally, to display the stationary references in relationship to the target T and each monitoring or master units $M_s$. It should be appreciated that the interactive search forms a virtual system of coordinates utilizing values of reference points from a combination of any three stationary monitoring or master units $M_s$.

Figure 37A:
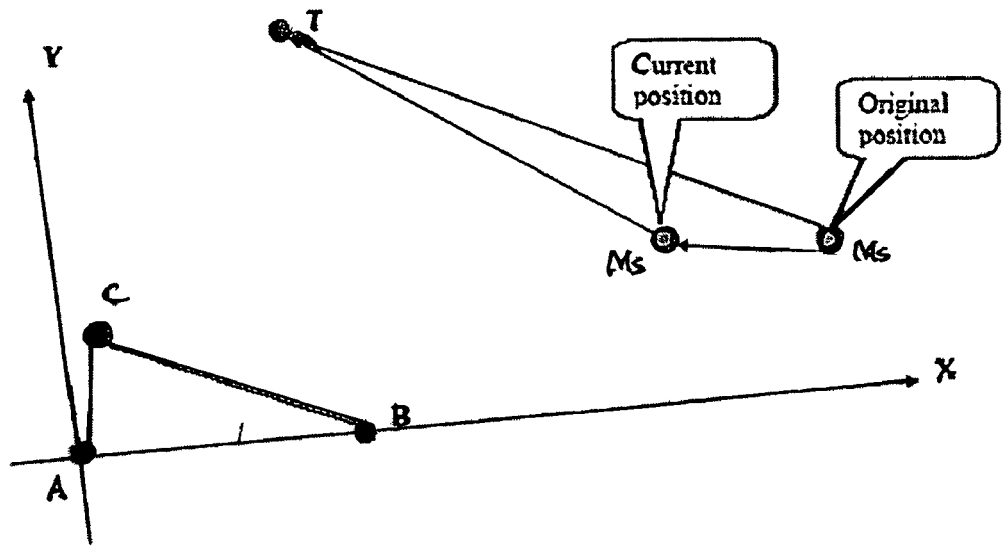
FIGS. 37A and 37B is a diagram illustrating the method of a mobile network to find and or track a target T.
Figure 37B:
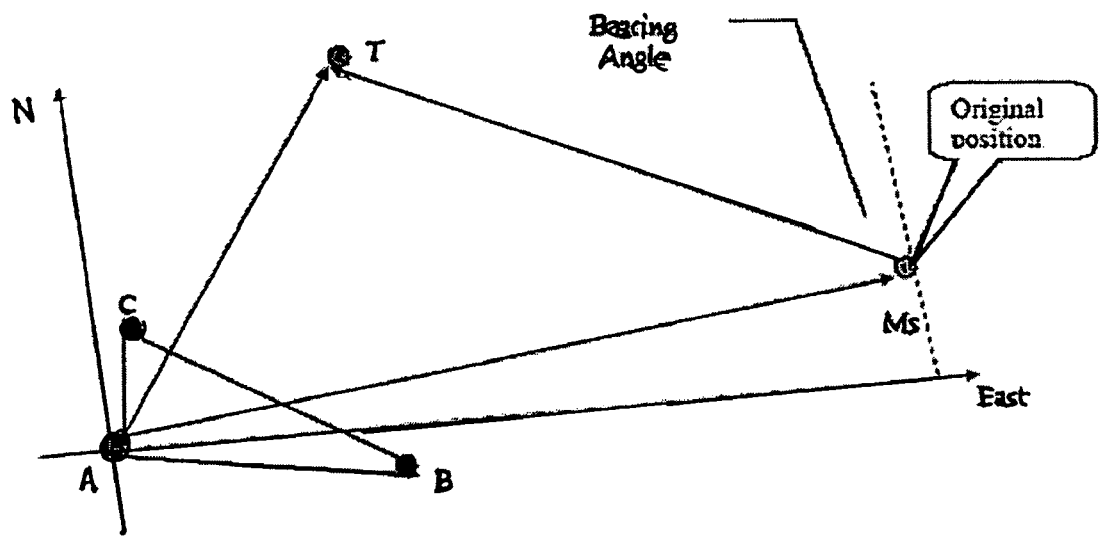

Referring now to FIGS. 37A and 37B, an embodiment of the present invention describes the interactive search utilizes a virtual coordinates system and the search algorithm description. Three stationary monitoring or master units $M_{ref}$ are shown as (A) $M_{ref-A}$, (B) $M_{ref-B}$, and (C) $M_{ref-C}$, or simply reference points A, B and C, whereby one of A, B or C is designated as the origin. For example, assuming (A) $M_{ref-A}$ is the origin, (B) $M_{ref-B}$ is used to define abscissa X and, more importantly, the third (C) $M_{ref-C}$ does not belong to abscissa Y because the A, B and C coordinates in this virtual system define values, which are as follows—A:(0, 0), B:(AB, 0) and C:((AC*cos(BAC), AC*sin(BAC)), where BAC is the angle between vectors AC and AB. The distances between each of $M_{ref}$ (A, B and C) are known, and from these A, B, and C coordinates can be calculated. Furthermore, the distances between each of $M_{ref}$(A, B and C), $M_s$ and the target T will be known. As a result, the monitoring unit 21 can be configured in this manner to the coordinates of target T and searching monitoring unit $M_s$ in this virtual coordinate system. The searching monitoring unit $M_s$ also can display each of $M_{ref}$ (A, B and C), $M_s$ and the target T on the virtual coordinate grid. However, at the beginning of the search, while in the original position, $M_s$ cannot determine an original bearing of the target T no reference has been determined with respect to the virtual coordinates. In order to determine the original bearing, searching monitoring unit $M_s$ has to move initially in any direction until the stationary masters, each of $M_{ref}$(A, B and C), detect a change in the distance between searching monitoring unit $M_s$ and the target T. After that the searching monitoring unit $M_s$ has moved to new coordinates respective of target T, the searching monitoring unit $M_s$ can display the new coordinates on the virtual grid. In addition, the searching monitoring unit $M_s$ can be configured to display traces of the movement of the searching monitoring unit $M_s$ and the movement of target T, the bearing from the searching monitoring unit $M_s$ to the target T, including the bearing angle, and other information. The steps of this method can be repeated while the searching monitoring unit $M_s$ and or the target T are moving with the searching monitoring unit $M_s$ displaying interactively the relative positions of the searching monitoring unit $M_s$ and the target T relative positions, the bearing of the searching monitoring unit $M_s$ to the target T, and other related information. Finally, other mobile searching monitoring $M_s$ units and targets T may be optionally displayed as well as the stationary masters, each of $M_{ref}$(A, B and C) according to another embodiment of the display mode for the monitoring unit 21.

It is appreciated in this illustration of the exemplary embodiment, that:

1. The monitoring unit is configured to assume the value of the point B coordinate X is positive, and that the value of the point C coordinate Y is also positive, so as to avoid position ambiguity.
2. Three stationary references do not belong to a straight line.
3. The value of the coordinates of each of the target T and the searching monitoring or master unit $M_s$ can be based on the principles of the method of the present invention involving intersecting circles having radii $R_1$, $R_2$, and $R_3$ or on polar coordinate principles.
4. The user of the searching monitoring or master unit $M_s$ does not count steps or time, whereby the user utilizes the unit's display to obtain the relative position to the target or targets, to obtain a bearing on target or targets as well as other information.
5. The value of the coordinates, bearing angles and other information of each of the target T and the searching monitoring or master unit $M_s$, can be calculated by any of $M_{ref}$ units and/or the $M_s$ unit, or in a distributed fashion.
6. The value of the bearing of the searching monitoring or master unit $M_s$ to the target T can be determined based on the triangle formed by the values of the points of two sequential positions (or points of movement) of the any of the values of the points of reference master units $M_{ref}$ and/or the searching monitoring unit $M_s$ and the current target T from the available coordinate values for the target T and searching monitoring unit $M_s$.

7. The accuracy of position determination depends, in part, on accuracy of the value of the measured distances of the reference points generated by at least one of the $M_{ref}$ units and/or the $M_s$ unit, for example, $M_{ref}$ (points A, B and C) disclosed above.

C. Multiple Slave Units as Reference Points

It is appreciated in this illustration of the exemplary embodiment, that the present invention may use any three stationary slave references ($S_{ref}$) are able to serve multiple stationary monitoring or master units because technique utilizes the base transponder aspect of the slave unit. As described above in case of using the values generated by three stationary monitoring or master units as reference points, any three stationary slave references $S_{ref}$ likewise form such a virtual system of coordinates, if each of the $S_{ref}$ units must not be positioned on a straight line. As a result, any monitoring or master units that are within the communication range of these three stationary slave references $S_{ref}$ of this example, each unit can determine its own coordinates relative to this virtual system of coordinates. Slave units are not configured to communicate with each other but communicate as a transponder to a ranging signal from a monitoring or master unit. Therefore, the distance between the three stationary slave references $S_{ref}$ is measured by a monitoring or master unit (or otherwise) and pre-programmed or transmitted and stored in each $S_{ref}$ unit. Similarly, the target T coordinates can be determined by monitoring or master units as the target T is essentially a slave unit disposed on a subject or object. Despite the step of having to pre-load or program distances to the stationary slave references $S_{ref}$ to establish a reference triangle of virtual coordinates such configuration has been shown to be useful under limited circumstances. A user can manually establish a reference virtual coordinate system, a triangle of virtual coordinates, or path of virtual coordinate's extremely obtuse triangle referenced loosely as a "bread crumb" marker for field work, whereby one or more stationary slave units are made a point of reference to mark—an individual bread crumb—a particular path taken. A monitoring or master unit $M_s$ and or user may locate such marker's position relative to a marker using virtual triangulation techniques. Three or more monitoring or master unit $M_s$ operating in a mobile network such as, for example, references points of $M_{ref}$ also can be used to locate a monitoring or master unit's $M_s$ position without need of virtual triangulation. It is appreciated in this example, that the multiple advantages and expanded opportunities for finding by using three stationary slave references $S_{ref}$ include the lower cost of these units due to less electronic functionality as compared to monitoring or master units, as well as the smaller size and lower power consumption obtainable in a slave unit. Further advantages of such a configuration include (i) allowing a monitoring or master unit to determine the traveled distance between successive movements, (ii) relative direction of these movements, and (iii) freeing operations of the monitoring or master unit as well as the user from measuring (directly or indirectly) these distances using the measured distance methods described above and or using electronic compass. Alternatively, if the coordinate calculation functionality is desired to be implemented and or performed by either a monitoring unit, master unit, or even by one or more $S_{ref}$ unit in the virtual coordinate system, such coordinate calculation functionality by firmware or the like. It should be appreciated that:

1) Unlike the example illustrating using three stationary master references, if a single searching monitoring or master unit $M_s$ under certain conditions cannot locate a signal or obtain a bearing angle to a target and, accordingly, such searching monitoring or master unit $M_s$ can be configured to revert to the virtual triangulation techniques to locate, track and or otherwise find the target. In a mobile network as is described herein, such searching monitoring or master unit $M_s$ reverting to the virtual triangulation techniques can be freed from other functionality by the command unit such as, for example, such searching monitoring or master unit $M_s$ from measuring distances between successive movements;

2) Alternatively, three stationary slave references $S_{ref}$ can be effectively use moving monitoring or master units as reference points in a mobile network, whereby such master reference units and the user operating them are now freed from measuring (directly or indirectly) distances between successive movements and freed from using an electronic compass; and 3) Finally, the three stationary slave references $S_{ref}$ can be successfully employed for building hierarchical points of reference for the methods and system of the present invention when establishing mobile networks for finding targets, whereby such systems establish a reference virtual coordinate system, or triangle of virtual coordinates or path of virtual coordinates extremely obtuse triangle referenced loosely as a "bread crumb" marker for field work, whereby one or more stationary slave units are made a reference to act as marker—an individual bread crumb—of a particular path taken. A monitoring or master unit $M_s$ and or user may locate such marker's position relative to a marker using virtual triangulation techniques. Three or more monitoring or master unit $M_s$ operating in a mobile network such as, for example, references points of $M_{ref}$ also can be used to locate a monitoring or master unit's $M_s$ position without need of virtual triangulation as is described in the next example.

D. Interactive, Adaptive Network Using Units as Reference Points

Referring again to FIGS. 38A and 38B, an interactive, adaptive network of units using units as points of reference is described in view of the system of the present invention and its various embodiments. A searching monitoring or master unit $M_s$ can be configured to be based on an adaptive interactive mode or technique for finding the target using three stationary monitoring or master units as reference points, or a preestablished bread crumb virtual coordinate system as points of reference. According to the method, a searching monitoring unit $M_s$ generates values for points $P_1$, $P_2$ and $P_3$ by obtaining such points $P_1$, $P_2$ and $P_3$ from at least three stationary master references $M_{ref}$ or virtual coordinates of three stationary slave references $S_{ref}$, where (i) a searching monitoring unit $M_s$ is equipped with an electronic compass, (ii) a Cartesian coordinate system is established—a North—South and East—West coordinate system—with one of the stationary monitoring or master units $M_{ref}$ at the origin of the Cartesian coordinate system, (iii) coordinates of any two other stationary monitoring or master units $M_{ref}$ are identified in such established Cartesian coordinate system or, alternatively, such searching monitoring unit $M_s$ is capable of measuring and storing the direction of movement relative to one axis of such established Cartesian coordinate system such as, for example, North. Accordingly, such searching monitoring unit $M_s$ can determine a value for a bearing angle relative to the target T from a value relative to one axis of such established Cartesian coordinate system—for example the North axis—when searching monitoring unit $M_s$ is in its original position and, thus, there would be no need for an initial searching monitoring unit $M_s$ movement described above. The determination of the value of the bearing angle, under this example the bearing angle is designated (Alpha) as is shown in FIGS. 38A and 38B, relative to the North axis, is as follows:

Determine the coordinates of target T and searching monitor $M_s$;

Generate a value based on the relationship Alpha=arccos $((x_2-X_2)/R)$;

Determine movement in the direction relative to the North axis, accordingly: If Alpha>90 and $x_1<X_1$ then the bearing value is <<(180-Alpha) degrees South—West>>;
1. If Alpha>90 and $x_1>X_1$ then the bearing value is <<(180-Alpha) degrees South—East>>;
2. If Alpha>90 and $x_1<X_1$ then the bearing value is <<Alpha degrees North—West >>; or
3. If Alpha<90 and $x_1>X_1$ then the bearing value is <<Alpha degrees North—East>>.

Where R is the distance between searching monitoring unit $M_s$ and the target T; $x_1$ is the first ($1^{st}$) value of the coordinate respective of target T; $x_2$ is the second ($2^{nd}$) value of the coordinate respective of target T; $X_1$ is the first ($1^{st}$) value of the coordinate of searching monitoring unit $M_s$; and $X_2$ is the second ($2^{nd}$) value of the coordinate of searching monitoring unit $M_s$. Additionally, the determination of the value of the bearing angle is guided by the principle that the larger the first coordinate, the more to the East is the object and the larger the second coordinate, the more to the North is the object, and so forth.

Each of the units include the transponder function so as to identify a position. Such transponder function is important and is used by the system and methods of the present invention for identifying positions relative to the stationary units and to calculate values of bearing from other units. In a broad sense, monitoring or master units are configured with an interface display or otherwise "see" other reference points, such as other master or slave units, as well as to communicate between other monitoring or master units.

III. Technique 3, Mobile Network Method for Finding

Referring now to FIGS. 38A and 38B, in this example, each of the three mobile master references $M_{ref}$ are configured to serve, separately or concurrently, as a searching monitoring unit $M_s$ for finding a target T in an adaptive, dynamic mobile network. Using multiple mobile master units as points of reference, and the values generated individually by each of the master units, allows for increased speed in determining and finding the target T according to a particular search in progress as well as making such search process interactive utilizing the additional functionality of master units such as, for example, the transceiver functions to transmit and receive data and or values for position information, for full duplex communications, and position ambiguity reduction. Principally, the mobile master units are configured to communicate with each other and are capable of measuring and determining the distance between each other as each is capable of determining the position of a target T and respective mobile master units.

Moreover, any value of three points of reference not in the same line and in communication range of each other from a respective mobile master units (or any stationary master or slave units, marker or source of a virtual coordinate reference) can be utilized to engage in a coordinated search for a desired, predetermined or designated target T as is shown in FIG. 38A. Accordingly, under such system where (i) every mobile monitoring or master units designated as a $M_{ref}$ is equipped with an electronic compass, (ii) a Cartesian coordinate system is established—a North—South and East—West coordinate system—with one of the stationary monitoring or master units $M_{ref}$ at the origin of the Cartesian coordinate system, (iii) coordinates of any two other stationary monitoring or master units $M_{ref}$ are identified in such established Cartesian coordinate system or, alternatively, (iv) such searching monitoring unit $M_s$ is capable of is capable of (a) measuring and storing the distance between successive movements or accepting such distance as an input as well as (b) measuring and storing the direction of movement relative to one axis of such established Cartesian coordinate system such as, for example, North, and (v) every mobile monitoring or master units designated as a $M_{ref}$ can be displayed on the unit interface such as, for example, (a) on a scaled or polar coordinate grid together with target T and the mobile monitoring or master units own positions, (b) traces of movement on a scaled or polar coordinate grid indicating the target T and or the mobile monitoring or master units, (c) bearing angle of current indicating movement of the target T and or the mobile monitoring or master Units $M_{ref}$ relative to the North axis or, alternatively, bearing angle movement of the mobile monitoring or master units $M_{ref}$ relative to the target T (from $M_{ref}$ to T) relative to the North axis and other related information. Multiple bearings also can be displayed such as, for example, a value of the bearing angle of one or more of the other mobile monitoring or master units $M_{ref}$ relative to the target T relative to the North axis. Accordingly, such searching monitoring unit $M_s$ can determine a value for a bearing angle relative to the target T from a value relative to one axis of such established Cartesian coordinate system—for example the North axis—when searching monitoring unit $M_s$ is in its original position and, thus, there would be no need for an initial searching monitoring unit $M_s$ movement described above. Of course, at the same time, respective mobile monitoring or master units can be utilized as being a part of the reference system according to the various techniques described for the present invention, for example, virtual triangulation, virtual coordinate system or the like.

As is shown in to FIGS. 38A and 38B, the adaptive, dynamic mobile network configured for a coordinated search using multiple mobile monitoring or master units for multiple functions such as, for example, as points of reference, making such search process interactive, e.g. utilizing the additional functionality of monitoring or master units such as, for example, the transceiver functions to transmit and receive data and or values for position information, for full duplex communications, and reduction of position ambiguity. The starting point is to determine three values of any such points of reference of any of the mobile monitoring or master units not in a straight line and or in communication range.

Any three values of such points of reference from such mobile monitoring or master units can be used for and or to engage in a coordinated search, movement, tracking, finding or other coordinated activity with respect to the Target T, all the while such mobile monitoring or master units are part of the reference system for another searching monitoring units $M_s$ (not shown in FIG. 38A). The system and methods of the present invention, accordingly, can be used to control numerous mobile master references searching for numerous targets T provided that there is a combination of three or more transceivers and or transponders in the communication range. For example, three mobile points of reference from units (monitoring, master or slave) $M_{ref}$ are shown as A, B and C. Designating one unit $M_{ref}$ at the origin of a Cartesian coordinate system, the positions are known of the two remaining mobile units $M_{ref}$ and, also, the determined value of the distance measured mobile units $M_{ref}$ (A, T); (B, T) and (C, T). From this position information, the coordinates of the desired target T may be determined and, based on such position information, each mobile units designated as a $M_{ref}$ can calculate the bearing angle to the target T relative to a coordinate axis to determine its direction or movement, for example, the North axis. Once a particular mobile unit $M_{ref}$ has moved for some time (or distance) in a particular direction, such mobile unit $M_{ref}$ can (i) generate a value for the distance traveled (actual measurement or accept input from other units or from the user) and (ii) generate a value for the bearing or the measure of the angle of movement (relative to North axis). Consequently, such mobile unit $M_{ref}$ can generate new coordinates and or update the initial system of coordinates used by other units in communication range. Such new coordinates determined by such mobile unit $M_{ref}$ can be used to determine the target T coordinates in the same initial system of coordinates, for example, the next point in time, as is shown in FIG. 38B. This configuration allows for each mobile monitoring or master units $M_{ref}$ to search independently for a predetermined target T. However, all three mobile monitoring or master units $M_{ref}$ can be used to determine the target T coordinates at any given time. Finally, each mobile monitoring or master units $M_{ref}$ can determine and share its own coordinates in the established system of coordinates to other units and its own coordinates respective of the target T coordinates such that each mobile monitoring or master units $M_{ref}$ can determine the bearing angle to the target T relative to the North axis; also in the established coordinate system, the coordinates of other searching monitoring units $M_s$ can be determined by the reference master units $M_{ref}$, searching monitoring units $M_s$ or in a distributed fashion.

Multiple targets T and or units adaptively can be added to the mobile network established already during the search, tracking, finding, while conducting reference operations, or to accomplish other features of the present invention. At the beginning, new unit and or target T coordinates are calculated based on any three already established coordinates for masters units in the mobile network, whereby units serving as values for points of reference should be configured for measuring and storing the distance between successive movements, or accepting such distance as an input, as well as measuring and storing the direction of movement relative to one of the axis, for example, North. It should be appreciated that the already established coordinates system should remain constant during the search, tracking, finding, while conducting reference operations or to accomplish other features of the present invention, or otherwise regenerated based on steps 1-8 below.

In operation, the established coordinates system of a mobile reference master unit configured with input from a compass, the determination of the value of the bearing angle designated (Alpha), relative to the North axis, is as follows, as is shown in FIGS. 38A and 38B:

Generate a value based on the relationship Alpha=arccos$((x_2-X_2)/R)$;

Determine movement in the direction relative to the North axis, accordingly: If Alpha>90 and $x_1<X_1$ then the bearing value is <<(180-Alpha) degrees South—West>>;

1. If Alpha>90 and $x_1>X_1$ then the bearing value is <<(180-Alpha) degrees South—East>>;

2. If Alpha>90 and $x_1<X_1$ then the bearing value is <<Alpha degrees North—West>>; or 3. If Alpha<90 and $x_1>X_1$ then the bearing value is <<Alpha degrees North—East>>.

Where R is the distance between searching monitoring unit $M_s$ and the target T; $x_1$ is the first ($1^{st}$) value of the coordinate respective of target T; $x_2$ is the second ($2^{nd}$) value of the coordinate respective of target T; $X_1$ is the first ($1^{st}$) value of the coordinate of searching monitoring unit $M_s$; and $X_2$ is the second ($2^{nd}$) value of the coordinate of searching monitoring unit $M_s$. Additionally, the determination of the value of the bearing angle is guided by the principle that the larger the first coordinate, the more to the East is the object and the larger the second coordinate, the more to the North is the object, and so forth.

For a mobile reference master that is moving relatively the North axis in an angle Alpha, new coordinates calculation between two points in time are conducted according to conditions 1 through 4. Selecting a new direction, or regenerating the coordinate system, that units are using for selecting direction relative to the North axis, can be determined using steps 5-8, as follows:

5. $X_1$ new=$X_1$-SIN(Alpha)*d, $X_2$ new=$X_2$-COS(Alpha)*d

6. $X_1$ new=$X_1$+SIN(Alpha)*d, $X_2$ new=$X_2$-COS(Alpha)*d

7. $X_1$ new=$X_1$-SIN(Alpha)*d, $X_2$ new=$X_2$+COS(Alpha)*d

8. $X_1$ new=$X_1$+SIN(Alpha)*d, $X_2$ new=$X_2$+COS(Alpha)*d

Where d is the value of the distance that was covered by point of reference of the unit mobile monitoring or master unit between two points in time. It should be appreciated that:

a) Determining any of the Target T, mobile points of reference $M_{ref}$, and searching monitor $M_s$ coordinates can be based on circles intersections or on polar coordinate principles.

b) Other monitoring or master units and or users that do not serve as points of reference:
  i. will not need to measure the distance between their own successive movements or accepting such distance as an input;
  ii. similarly, search monitoring or master unit operations will closely resemble the search operations of stationary master references, for example, such units can choose to participate, to use or not to use compass input or the like for determining the bearing on the target and calculate the bearing angle to the target accordingly;
  iii. as above, searching monitoring or masters units $M_s$ can interface with the user so as to display a scaled grid or polar coordinates with target T and searching monitoring or masters units $M_s$ as well as traces of movement When searching monitoring or masters units $M_s$ and or a target T fall outside of the communication range of the master units $M_{ref}$ (stationary or mobile), other units within the communication range of the reference master units $M_{ref}$, searching monitoring or masters units $M_s$, and or target T can be used as an intermediate position reference to determine coordinates in the system of coordinates that is formed by the above mentioned reference masters that are out of the communication range. Upon request, the searching monitoring or masters unit $M_s$ will communicate with all available units to form at least three intermediate master units to obtain values of points of reference that will be used form an intermediate virtual system of coordinates such as, for example, forming a hierarchical, reference table of values for the system of coordinates of three stationary master units in the range of the searching monitoring unit $M_s$ and designated target T. Thereafter, these formed system of coordinates and the hierarchical, reference table of values for the previous system of coordinates can be used as a transfer function to translate values of points of reference "out of range" reference base on, for example:

1. The coordinates of the "out of range" points of reference for the translated system of coordinates to such the intermediate points of reference for newly located units within range,
2. Selecting one of such units as the origin of the intermediate virtual system of coordinates,
3. Selecting one of the two of the remaining units for the translated system of coordinates to such intermediate points of reference for the abscissa X (or Y) in the intermediate virtual system of coordinates,
4. Determining transfer functions or otherwise matrix translations of points or reference from such system of coordinates to such intermediate system of coordinates having points of reference in order to determine the angle of rotation between the original and the intermediate coordinates.

This hierarchical referencing may be continued further and extrapolated, thus covering a large area and distances. Furthermore, units can be used as points of reference for three monitoring units Ms and a target T in range can be in a mobile network.

Figure 14:
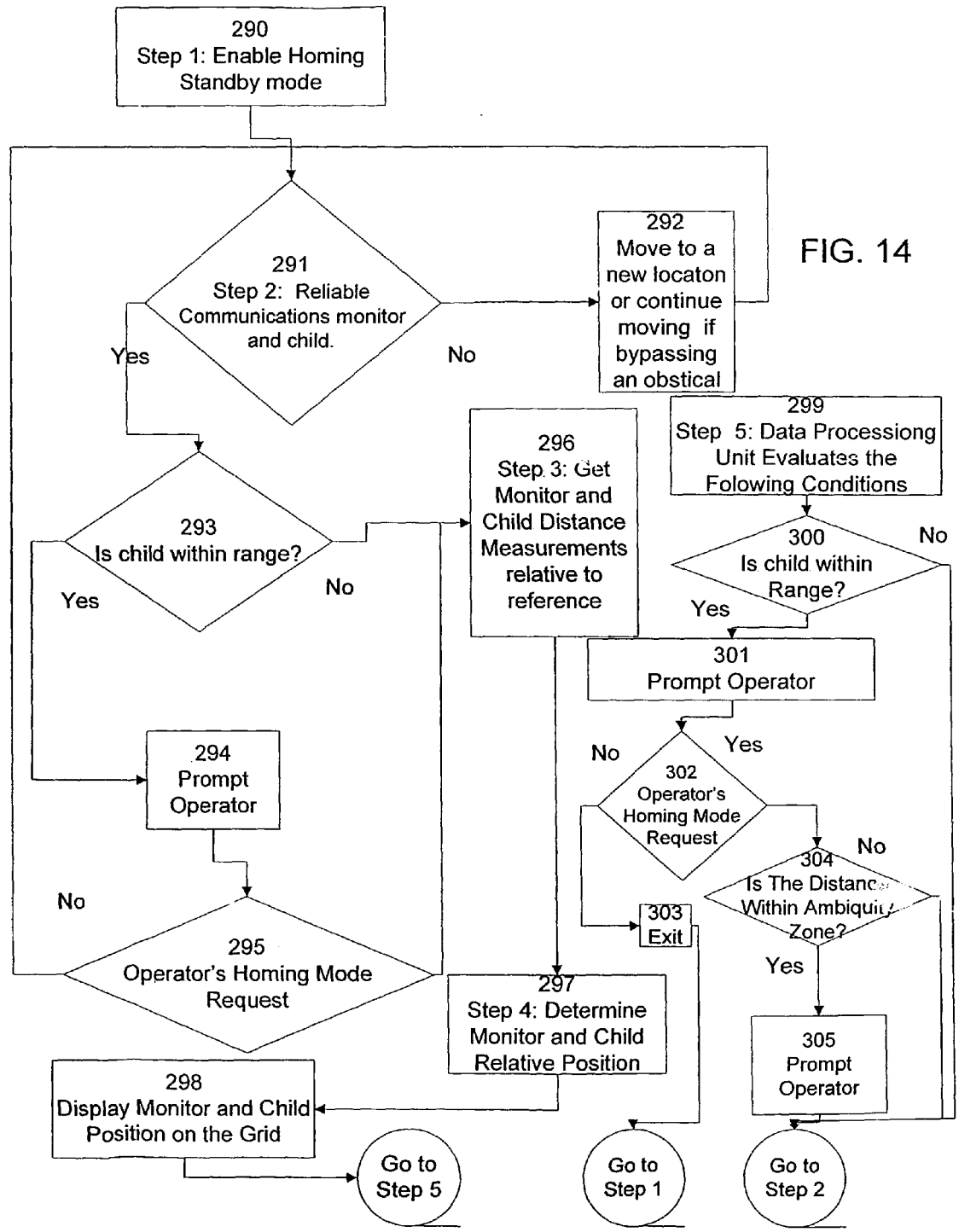
FIG. 14 is a process flow chart illustrating still yet another method (Technique 3) for determining location of a target.
Figure 16:
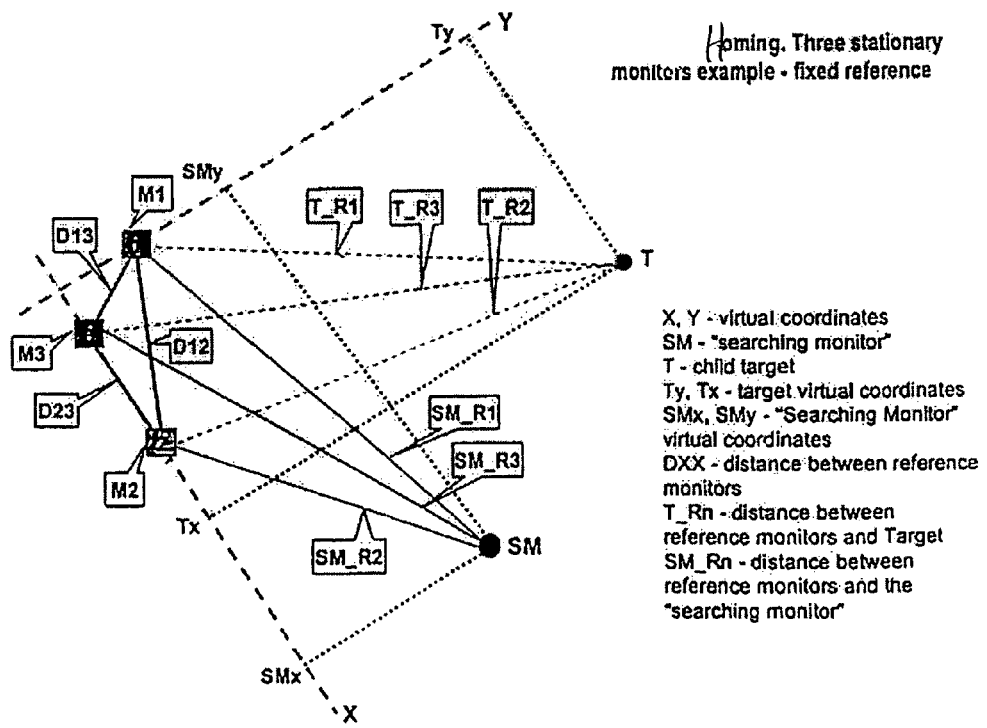
FIG. 16 is a diagram illustrating an example of homing using three stationary monitor reference units, providing a fixed reference for the process of FIG. 14.

Referring to FIG. 14, which is a process flow diagram for Technique 3, Mobile Network For Finding, can be used in high speed search and rescue operations, tracking multiple targets, whether animate subjects or inanimate objects, utilizing a coordinated search by multiple master units, fixed or mobile. An example of a distance determination process using technique 3 is illustrated in FIGS. 16-19. Referring first to FIG. 16, the relative positions of a target T and a monitoring unit or searching monitor Ms are shown with respect to virtual coordinates X and Y. Each target has virtual coordinates are $T_y$ and $T_x$. The virtual coordinates for the searching monitor are $Ms_x$ and $Ms_y$. In this example, technique 3 employs the process of technique 2 utilizing master units $M_1$, $M_2$ and $M_3$ as reference units as shown in FIG. 16, for example. Reference unit $M_1$ is separated from reference unit $M_2$ by a distance $D_{1,2}$. Reference unit $M_1$ is separated from reference unit $M_3$ by a distance $D_{1,3}$. Reference unit $M_2$ is separated from reference unit $M_3$ by a distance $D_{2,3}$. The distances between the searching monitor SM and the reference units $M_1$, $M_2$ and $M_3$ are $Ms\_R_1$, $Ms\_R_2$ and $Ms\_R_3$, respectively. The distances between the target T and the reference units $M_1$, $M_2$ and $M_3$ are $T\_R_1$, $T\_R_2$ and $T\_R_3$, respectively. To avoid position determination ambiguity, the three stationary master units $M_1$, $M_2$ and $M_3$ which are used as reference units preferably should not be located along a straight line as discussed above with reference to FIGS. 7-10, for example. Moreover, the distances $D_{1,2}$, $D_{1,3}$ and $D_{2,3}$ should be large enough to minimize ambiguity error as discussed above with reference to FIGS. 9-11, for example. In some embodiments, the preferable separation distances can be stored in the memory of the master unit and displayed automatically by the searching monitor when entering into technique 3 mode.

With reference to FIG. 14, the process is entered into in path A, block 290, which enables the homing standby mode. As described above for techniques 1 and 2, the monitoring unit or searching monitor periodically checks the monitoring units having responsibility for the target to determine whether all of the targets being monitored are within the prescribed range. Whenever a target moves out the prescribed range, the homing mode is automatically initiated. Path B, block 291, determines if reliable communication can be established between the searching monitor Ms and the reference units $M_1$, $M_2$ and $M_3$, as well as between reference units $M_1$, $M_2$, $M_3$, the searching monitor Ms and the target T. If not, the user moves to a new location, as represented by block 292 and the flow returns to block 291 to determine if reliable communications can now be provided between the searching monitor and the reference monitors.

When reliable communications are established, flow proceeds to decision block 293 which determines whether the targets being monitored are within the prescribed range. If so, the searching monitor Ms provides a suitable prompt to the user, block 294, and flow normally returns through block 295 to block 291. Blocks 293-295 form a wait loop that continuously monitors the target units to detect when a target being monitored moves of range, block 295 enables the user to force entry into the homing mode.

When a target moves out of range, or if forced entry into the homing mode is requested by the user, flow proceeds to Step 3, block 296, which obtains the searching monitor and target unit distances relative to the reference units $M_1$-$M_3$. The distances between the reference units $M_1$, $M_2$ and $M_3$ can be measured (by the monitoring units themselves) or have fixed values that are entered into a "searching monitor unit $M_s$," during the initialization phase. The three position reference units $M_1$, $M_2$ and $M_3$ do not have to be stationary. For example, members of a search team can carry these units, the members of the search team may be moving relative to one another in conducting the search. Whether the units are stationary or not, there may be three or more monitoring units in the field. As result, at any given moment, a combination of any three monitoring units can be used as the position reference. Such arrangement can be used for conducting multiple simultaneous automated high-speed searches. It is also impervious to obstacles and is very precise. One possible application is for locating individuals in a theme park. Other possible applications include a search and rescue operation that has to be conducted in a very short time and or at high speed, or a search operation when only a few master units are monitoring a large number of targets.

Flow proceeds to path E, block 297, which determines the relative distance between the searching monitor Ms and the unit carried by the target T. In response to a request initiated by a user of a master unit 21, the three position reference units provide outputs indicative of the distance between all master units as well as distance between master units $M_1$, $M_2$ and $M_3$ and target children, such as target T. Based upon this information, the positions of all reference units $M_1$, $M_2$ and $M_3$ and targets are calculated relative to "virtual" coordinates that are formed by any three monitoring or reference devices $M_1$, $M_2$ and $M_3$. The virtual coordinates are mapped into a grid so that the relative positions between all monitoring units and the targets relative to each other are displayed on the grid, block 298, as well as the positions of other reference or monitoring units.

Figure 17:
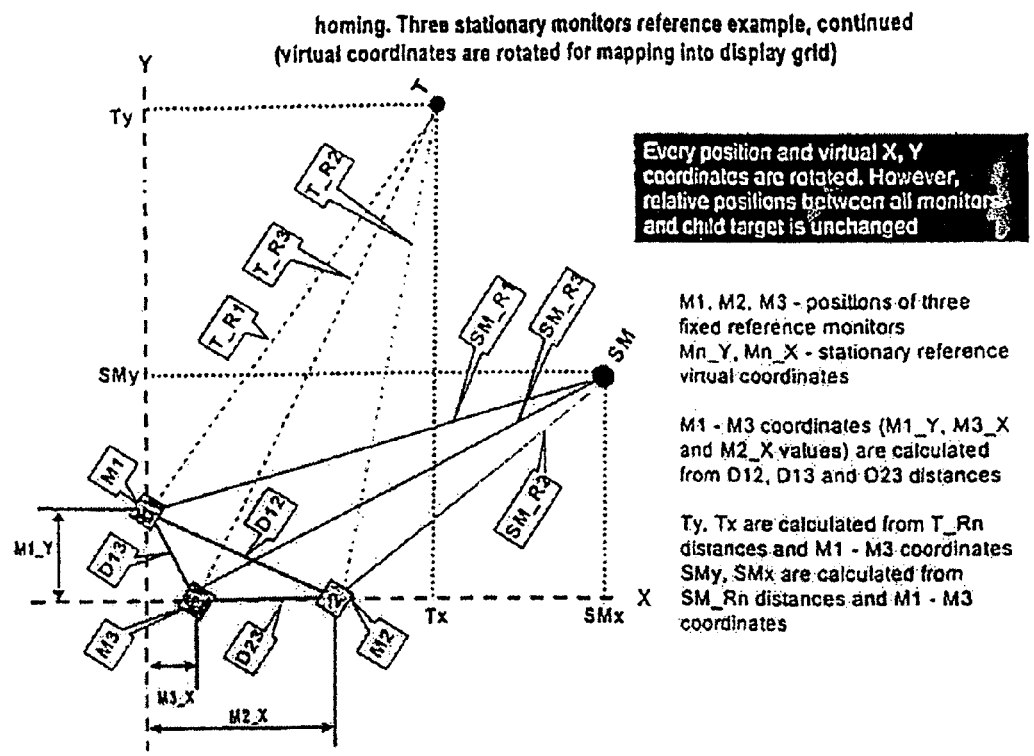
FIG. 17 is a diagram similar to that of FIG. 16 and showing virtual coordinates rotated for mapping into a display grid.

Referring to FIG. 17, the positions of the target T, the searching monitor Ms and the three reference units $M_1$, $M_2$ and $M_3$ have been rotated for mapping into a display grid. Every position and virtual X,Y coordinate is rotated. However, the relative positions between all of the monitoring units Ms, $M_1$, $M_2$ and $M_3$ and the target T are unchanged. $M_n\_Y$ and $M_n\_X$ (where n=1, 2, 3) are stationary reference virtual coordinates. The coordinates of reference units $M_1$, $M_2$ and $M_3$ can be calculated from the distances $D_{1,2}$, $D_{1,3}$ and $D_{2,3}$. The coordinates $T_y$ and $T_x$ for the target T can be calculated from the distances T_Rn and the coordinates $M_n\_Y$ and $M_n\_X$ of the reference units $M_1$, $M_2$ and $M_3$ (where n=1, 2, 3). The coordinates $Ms_y$ and $Ms_x$ for the searching monitor Ms can be calculated from and the coordinates $M_n\_Y$ and $M_n\_X$ of the three reference units $M_1$, $M_2$ and $M_3$ and the distances $Ms\_R_1$, $Ms\_R_2$ and $Ms\_R_3$.

Referring again to FIG. 14, flow proceeds from block 298 of path E to path F, block 299, which evaluates conditions such as whether the target is within range, block 300, and whether the distance between the searching monitor and the target calculated is within an ambiguity error zone, block 304. If block 300 determines that the target is outside of the range, flow returns to Path B. Otherwise, the target is within range, the user is prompted to that effect, block 301, and flow proceeds to decision block 302 which determines whether the user has forced the homing operation. If the user has not forced the homing mode and if the target is now within range, the homing mode is exited, block 303, and flow returns to Path A to await the next time a determination is made that a target has moved out of range. If the user has forced the homing mode, flow proceeds to decision block 304 which determines whether the distance calculated places the searching monitor within the ambiguity error zone. If the searching monitor is not within the ambiguity error zone, flow returns to Path B. If block 304 determines that the searching monitor is within the ambiguity error zone, the user is prompted, block 305, prior to the flow returning to path B.

Figure 18:
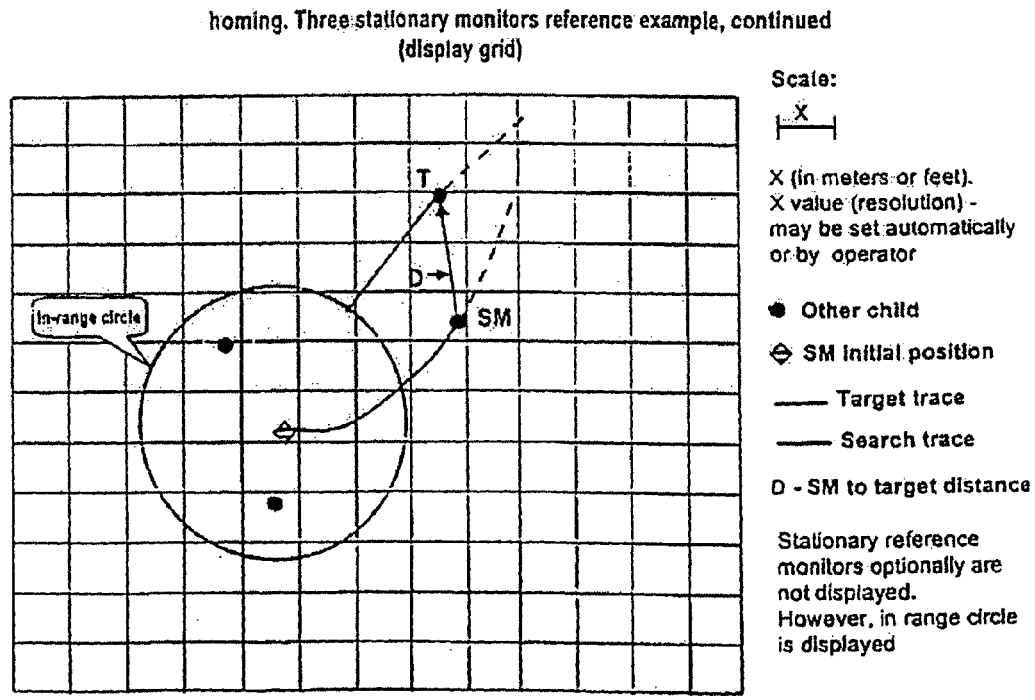
FIG. 18 shows a display grid that can be displayed by a display unit of the master unit for showing results for homing using Technique 3 with three stationary reference units according to FIGS. 16 and 17.

Referring to FIG. 18, the virtual coordinate information allows the searching monitor and target to be mapped onto a display grid of the master unit 21. In some embodiments, illustrated in FIG. 18, only relative positions for the target and the searching monitor Ms, including the initial position for the searching monitor Ms, are displayed. Also, the relative positions of other units $C_1$ and $C_2$ can be shown. In the case of three stationary monitoring or reference units $M_1$, $M_2$ and $M_3$, optionally, these may or may not be displayed on the grid shown in FIG. 18. In addition, the original in-range circle 25 (FIG. 1) and the original position of the searching monitor Ms (which can correspond to master unit 21 in FIG. 1) can be displayed on the grid as shown in FIG. 18. The scale of the display can be set automatically or be set by the user.

The "searching monitor $M_s$" can determine it's own position relative to the reference units $M_1$, $M_2$ and $M_3$ as well as the target's position relative to the reference units $M_1$, $M_2$ and $M_3$. Consequently, the searching monitor Ms can also determine its own position relative to the target without a need for establishing its own three-point coordinates for the example for three stationary master units $M_1$, $M_2$ and $M_3$ shown in FIGS. 16, 17 and 18. As a result, a searching monitor Ms need not move in a pattern.

Although there are many possible ways of defining virtual coordinates, in every instance, the result will be the same. Also, the "virtual" coordinates do not need to be displayed on a grid.

Figure 19:
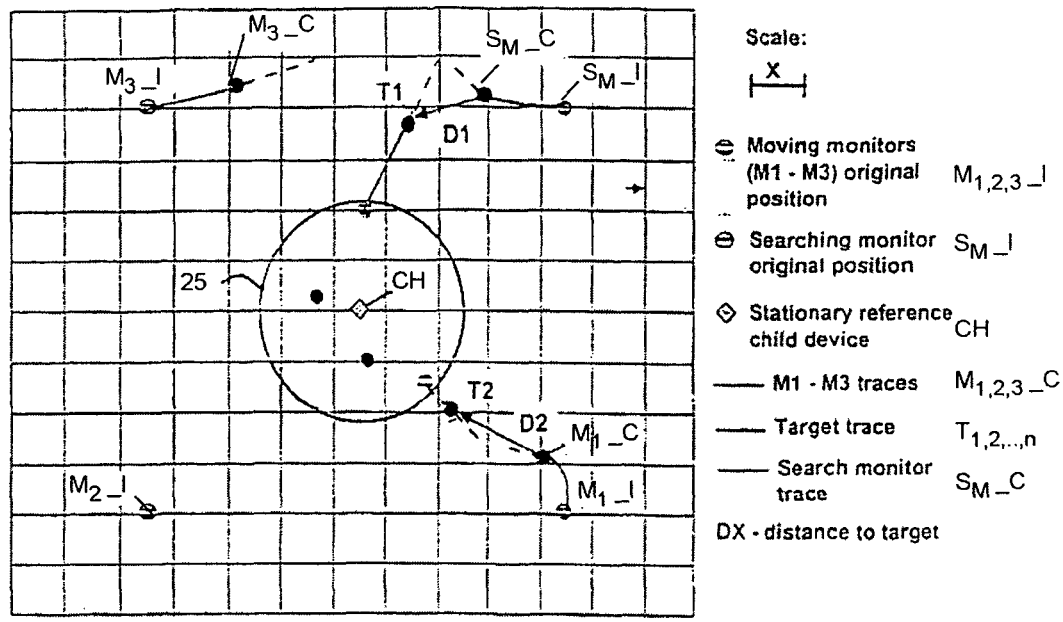
FIG. 19 is a display grid that can be displayed by a display unit of the master unit for showing the results of homing using Technique 3 with three moving reference units.

It should be noted that several search operations are carried out simultaneously real-time (three simultaneous operations are shown in FIG. 19. The accuracy of measurements does not depend upon the speed of the target. Also, displaying on a "grid" the position of the searching monitor Ms and the positions of the other monitoring units relative to the position of the target or targets, gives operator the ability to perform an interactive search, no matter what the speed of the target or targets. This also improves productivity as only few operators can oversee many targets such as, for example, FIG. 19. FIG. 19 shows an example of the use of the homing Method 3 when the reference monitors $M_1$-$M_3$ are moving. However, a stationary reference unit, such as a stationary target unit CU, is located at the center of the "range" circle 25. $M_1\_I$, $M_2\_I$, and $M_3\_I$, represent the initial positions of the reference monitors $M_1$, $M_2$ and $M_3$, and $M_1\_C$, and $M_3\_C$, represent current positions of the reference monitors $M_1$ and $M_3$, respectively (reference monitor $M_2$ not having moved) Ms_I is the original position of the searching monitor Ms and Ms_C is the current position of searching monitor Ms. D1 is the distance from the current position of the searching monitor and the target $T_1$, $D_2$ is the distance from the current position of the monitor $M_1$ and the target $T_2$. The manner in which these are determined is similar to that described above for the example in which the locations of the reference monitors $M_1$, $M_2$ and $M_3$ are fixed. In addition, in case of mobile reference monitors, each reference monitor and the search monitor may have to be equipped with a compass, GPS input or any other device that helps to establish an actual or absolute direction or position reference. Also, the traces (consequent positions) of monitors $M_1$, $M_2$ and $M_3$, searching monitor Ms and target units $T_1$ and $T_2$, as well as anticipated direction(s) of movements of these units are displayed. The master unit 21 can also improve the target position determination accuracy and speed by combining its own measurements with the measurements of the other monitoring units $M_1$, $M_2$ and $M_3$, which can include master units 22, 23 and 24, for example, as is shown in FIG. 1.

Similarly, several operators can organize a coordinated real-time search for a very fast moving target, a target that is moving faster than an operator, as positions of the target and all monitoring units participating in the search can be displayed on the grid as is shown in FIG. 19. Also, a numerous master units 21 can effectively monitor many targets having units disposed on the subject, object, or both.

As is stated above, FIG. 19 illustrates the case where the position reference monitoring units are moving. Here one monitoring unit 21, for example, a team leader, (shown as "searching monitor unit" Ms), is arbitrarily designated the searching monitor Ms that periodically requests distance measurements from other three moving monitoring or reference units 21. The searching monitor Ms processes the ilformation in a similar fashion that is in case of three stationary monitoring units, and broadcasts the display information to the other monitoring or reference units (shown as $M_1$, $M_2$ and $M_3$). This allows providing a coordinated search for a single target or a plurality of targets. When all of the reference monitoring units are moving, there is a chance that at some point, the reference units $M_1$, $M_2$ and $M_3$ (or two of the reference units and the searching monitor Ms) might end located along a straight line. However, as described above, the searching monitor Ms displays the relative positions of the reference units and so the traces will indicate to the searcher that the reference units are moving in directions toward alignment along a straight line. In such case, the searcher can send a voice communication to the reference units to warn the other operators to change the direction in which they are moving.

It should be noted that several groups of monitoring units can conduct a simultaneous independent real-time search for multiple targets. Because all of the monitoring units are moving, the original in-range circle position cannot be preserved unless a stationary slave unit is used as position reference. In such case, the original in-range circle can be displayed in proper relation to the positions of all of the monitoring units and the target units carried by subjects or disposed on objects.

Referring to FIG. 37, in yet another exemplary embodiment of the present invention, a dynamic, mobile network of master and slave units capable of locating objects and or subjects as the mobile network moves. If a target being tracked moves out of the range of a monitoring unit that is principally engaged with tracking such target, such monitoring unit may nonetheless find such target by making a request to other master units, fixed or mobile, to find the target. Such method of finding a target in a network of master units, fixed or mobile, can be accomplished by the monitoring unit requesting a list of targets (-ID's) in the range of each master unit within the range of the monitoring unit. The master unit receives the request from the monitoring unit and determines the targets in the range and their unique identification. Once a list of the targets identified in the area of the particular master unit receiving the request, the master unit sends each identity to the monitoring unit. The monitoring unit can identify the particular target such as, for example, from the ID or from last known position and rate information correlated with the position of the master unit sending the list, thereby locating the target. The method is adaptable such that the monitoring unit can hand off the principal responsibility of monitoring such target to a master unit so as to create a dynamic locating and tracking network.

Global Positioning Systems (GPS) are useful in determining the location of a "receiving device" to within about 50-100 meters; however, in certain environments such as covered or enclosed buildings, dense forest, bad weather, and the like, GPS cannot operate well or at all. In a further application of the present invention, the tracking and locating system 20 can be seamlessly integrated to a GPS chip-set to utilize serial information data of GPS. This is because the present invention search techniques 1-3 can use the control processor to operate on RF distance measurement data obtained by the technology of the present invention as well as data obtained by the GPS-based technology. A GPS receiver antenna can be separate or combined with the master or slave antenna. Thus, providing the user with a unified man-machine interface, as described in the present invention, regardless of technology that is used to collect the position data. Such system is adaptable to operating in adverse environments and, on a very cost effective per person basis, provide tracking and location functionality with an easy to understand the present invention graphical user interface (GUI). In applications which include GPS-based technology, the operation of the tracking and locating system 20 can be similar to that described above using the homing techniques 1-3. In another application, the slave unit can be embedded into an object, for example, a golf ball or a document. In this application, the slave unit is stripped of all man-machine peripherals and interfaces (such as keys, microphone, speaker or headset plug, LEDs, switches, etc.) and its electronics are integrated together with a small rechargeable battery into a golf ball. The battery can be re-charged without contact using an electromagnetic field, for example. A micro-machined switch that is turned on by a certain acceleration forces is used as a power-on switch. This switch can turned off in response to a command signal transmitter by the master or monitoring unit. When the golf ball is hit with a force that exceeds a certain threshold, the power switch is turned on, powering the embedded electronic circuits. In this application, the operation of the golf ball tracking and locating system 20 in locating golf balls can be similar to that described above using to the homing techniques 1-3.

Although exemplary embodiments of the present invention have been shown and described with reference to particular embodiments and applications thereof, it will be apparent to those having ordinary skill in the art that a number of changes, modifications, or alterations to the methods and system of the present invention may be made, none of which depart from the spirit or scope of the present invention that is described herein according the exemplary embodiments. For example, virtual triangulation can be used to find an object or subject using the display and auditory instructions. Other methods of finding broadly described in Techniques 1, 2 and 3 may be combined in various ways to form systems adapted to find the target with reduced feature sets according the requirements of a particular application. In other embodiments, mobile networks can be formed from one or more monitoring units and units disposed on targets T. Advantageously, these configurations can utilize virtual triangulation, however, the functionality of each monitoring unit provides additional values for position information from data resident in each unit. Moreover, the interface between the unit and the user can be adapted and further integrated. For example, the display and auditory commands given to the user can advantageously be configured according to simplified metaphors easily assimilated by the user so as to guide the user to the target using a spectrum of commands ranging from "hot" to "cold", whereby variations of hot, hotter, hottest, and "you're on top of it" or "look around" can be given to the user as the user gets closer to the target or subject. Similarly, the display and auditory commands given to the user can advantageously be configured to guide the user to the target using a spectrum of commands ranging from "cold" "colder", "coldest" and "you're an iceberg" or "start over" can be given to the user as the user gets further away from the target or subject. All such changes, modifications, and alterations should therefore be seen as being within the scope of the present invention.

We claim:

1. A system for finding a target, comprising:
   a transponder disposed on the target;
   a transceiver for monitoring the location of the target;
   a wireless communication system configured to allow communication between said transponder and said transceiver, and a processor configured to find the target by virtual triangulation that does not use a fixed infrastructure and based on values of position information from said transponder and said transceiver.

2. The system of claim 1, wherein said processor is configured to determine virtual triangulation based on successive values of said position information using at least three points $P_1$, $P_2$ and $P_3$ and using a pattern search to determine a direction and a distance to the transponder respective of said transceiver.

3. The system of claim 1, wherein said processor is configured to determine virtual triangulation based on successive values of said position information of said transponder respective of said transceiver using a means for successive pattern movement technique configured to find the target,
   whereby said means for successive pattern movement obtains and corrects the direction and distance to the location of the target T based on said values of said position information.

4. The system of claim 1, wherein said processor is configured to determine virtual triangulation based on successive values of said position information relating to the average speed of the motion of the user of said transponder respective of said transceiver.

5. The system of claim 1, wherein said processor is configured to determine virtual triangulation based on successive values of said position information relating to input of a user of said transceiver,
   whereby said user input corresponds to motion of said transponder respective of said transceiver.

6. The system of claim 1, wherein said processor is configured to determine virtual triangulation based on successive values of the elapsed time of a ranging signal transmitted by said transceiver to said transponder, said transponder transmitting a reply ranging signal to said transceiver, whereby said transceiver transmitting said ranging signal and receiving said reply ranging signals from said transponder a predetermined number of times sufficient to determine an elapsed time based on a time-of-flight of said ranging signal.

7. The system of claim 1, wherein said processor is configured to accumulate a phase shift between said ranging signal and said reply ranging signal.

8. The system of claim 1, wherein said processor is configured with a phase shift detector.

9. The system of claim 8, wherein said processor is configured to determine a value of an optimal operating resolution of said phase shift detector.

10. The system of claim 8, wherein said phase shift detector is configured to measure a value of said phase shift between said ranging signal and said reply ranging signal.

11. The system of claim 8, wherein said processor configured to determine a value of said phase shift based on a value of a transmission interval.

12. The system of claim 8, wherein said processor configured to determine a value of said phase shift based on a value of a calibration interval.

13. The system of claim 12, wherein said value of said calibration interval is periodically determined by each of said transponder and or said transceiver.

14. The system of claim 8, wherein said processor determines said phase shift based on a value of an antenna propagation interval.

15. The system according to claim 1, wherein said transceiver is configured to enter a homing mode for searching for the target, said homing mode being entered when a value of said position information between said transceiver and the target corresponds to a predetermined value.

16. The system according to claim 15, wherein said homing mode is toggled between states of ON and OFF by a value of said position information of the target being equal to a predetermined value of a position ambiguity of the target.

17. The system according to claim 16, wherein said transceiver is configured to exit said homing mode after an elapsed predetermined time period.

18. The system according to claim 16, wherein said transceiver is configured to enter said homing mode to determine a location of the target when requested by input from a user.

19. The system according to claim 1, wherein said processor is configured to reduce position ambiguity of transceiver respective of the target based on generating a value for input information signals on at least one band.

20. The system according to claim 19, wherein said transceiver is configured to generate auditory signals representative of when said position ambiguity of the target is equal to a predetermined value for said position ambiguity.

21. The system according to claim 1, wherein said processor is configured to operate on a band using a spread spectrum to establish position information signals from said transponder and said transceiver.

22. The system according to claim 1, wherein said transceiver is configured with an interface so as to communicate to the user through said interface by one or more of the sensing group of audible, visual or physical signals.

23. The system according to claim 22, wherein said interface includes a display for visually displaying said position information to the user.

24. The system according to claim 23, wherein said display includes is LCD screen for indicating said position information to the user.

25. The system according to claim 22, wherein said interface includes an indicator configured to display said position information to the user on a predetermined pattern.

26. The system according to claim 2, wherein said values from said three points $P_1$, $P_2$ and $P_3$ create a point of intersection of circles based on circles with radii $R_1$, $R_2$ and $R_3$ originating from said points $P_1$, $P_2$ and $P_3$, respectively, whereby said point of intersection finds the target respective of said transceiver.

27. The system according to claim 1, wherein said transceiver is configured to adjust adaptively a power value of a transmitter of said transceiver so as to improve a value of said position information.

28. The system according to claim 1, wherein said transceiver is configured to adjust adaptively a sensitivity value of a receiver of said transceiver so as to improve a value of said position information.

29. The system according to claim 1, wherein said transponder is configured to adjust adaptively a power value of a transmitter of said transponder so as to improve a value of said position information.

30. The system according to claim 1, wherein said transponder is configured to adjust adaptively a sensitivity value of a receiver of said transponder so as to improve a value of said position information.

31. The system according to claim 1, wherein said transceiver includes a processor configured to be in communication with an antenna, said processor being configured to repeatedly determine values for said position information based on one or more of the following values for:

a transmission interval between said transceiver and said transponder, said transmission interval being an elapsed time between transmitting said ranging signal and receiving said reply ranging signal, a calibration interval between each of said transceiver and transponder said calibration interval being a time interval of a period to normalize the circuitry of said transponder and said transceiver, and an antenna propagation interval of either of said transceiver or said transponder, or both, said antenna propagation interval being an elapsed time of a signal measured as it passes through said antenna of said transponder or said transceiver.

32. The system according to claim 1, wherein said transceiver is configured for communication with an antenna to repeatedly determine values for said position information based on a value for a measured distance between said transponder and said transceiver.

33. The system according to claim 1, wherein said transceiver is configured for transmitting a ranging signal to said transponder, said transponder is configured for responding to said ranging signal by transmitting a reply ranging signal to said transceiver, and said transceiver is configured to determine a value of a measured distance between said transponder and said transceiver based on position information from said ranging signal and said reply ranging signal.

34. A method, comprises the steps of:

determining a value of a point $P_1$ from position information received by a transceiver corresponding to a location of a transponder disposed on a target;

prompting a user to move said transceiver to a point $P_2$ relative to a location of the target;

determining a value of a point $P_2$ from position information received by said transceiver corresponding to a location of said transponder;
prompting said user to move said transceiver to a point $P_3$ relative to a location of the target;
determining a value of a point $P_3$ from position information received by said transceiver corresponding to a location of said transponder; and
finding the location of the target by virtual triangulation based on the values for said points $P_1$, $P_2$ and $P_3$.

35. The method of claim 34 wherein said step of determining said position information further comprises repeating as necessary the steps of:
prompting the user to move said transceiver to a point $P_n$ relative to a location of said target having said transponder;
determining a value of a point $P_n$ from position information received by said transceiver corresponding to a location of said transponder; and
finding the location of the target from position information received by said transceiver by repeating said determining by virtual triangulation for two of each of said values for said points $P_1$, $P_2$ or $P_3$ and said point $P_n$.

36. The method of claim 34 wherein said step of determining said position information further comprises the steps of:
determining said values of said position information of said target by:
determining a transmission interval between said transceiver and said transponder;
determining a calibration interval between each of said transceiver and transponder; and
determining an antenna propagation interval of each of said transceiver and transponder.

37. The method of claim 36 wherein said step of determining said position information further comprises the steps of:
determining said transmission interval based on an elapsed time between transmitting said ranging signal and receiving said reply ranging signal.

38. The method of claim 36 wherein said step of determining said position information further comprises the steps of:
determining said calibration interval based on a time interval of a period to normalize the circuitry of said transceiver and said transponder.

39. The method of claim 36 wherein said step of determining said position information further comprises the steps of:
determining said antenna propagation interval based on an elapsed time of a signal measured passing through said antenna of said transceiver and said transponder.

40. The method of claim 36 wherein said step of determining said position information further comprises the steps of:
generating a measured distance between each of said transceiver and said transponder.

41. The method of claim 40 wherein said step of determining said measured distance further comprises the steps of:
determining said position information of the target generated by a virtual triangulation relationship when successive values of said position information have a predetermined logical relationship relative to said previous values between said transceiver and said transponder.

42. The method of claim 36 wherein said step of determining said position information further comprises the steps of:
generating a measured distance between each of said transceiver and said transponder.

43. A portable device for tracking a target, comprising:
processor for determining position information of the target, memory operably connected to said processor, said memory being configured to store a plurality of sequences of instructions, said plurality of sequences of instructions including sequences of instructions which, when executed by said processor, cause said processor to perform the steps of:
determining a value of a point $P_1$ from position information received by a transceiver corresponding to a location of a transponder disposed on a target;
prompting said user to move said transceiver to a point $P_2$ relative to a location of the target;
determining a value of a point $P_2$ from position information received by said transceiver corresponding to a location of said transponder;
prompting said user to move said transceiver to a point $P_3$ relative to a location of the target;
determining a value of a point $P_3$ from position information received by said transceiver corresponding to a location of said transponder; and
finding the location of the target by virtual triangulation in accordance with each of said values for said points $P_1$, $P_2$ and $P_3$ of position information received by said transceiver.

44. The portable device of claim 43 wherein said processor further repeating as necessary the steps of:
prompting a user to move said transceiver to a point $P_n$ relative to a location of said target having said transponder;
determining a value of a point $P_n$ from position information received by said transceiver corresponding to a location of said transponder; and
finding the location of the target from position information received by said transceiver by repeating said determining by virtual triangulation for two of each of said values for said points $P_1$, $P_2$ or $P_3$ and said point $P_n$.

45. The portable device of claim 43 wherein said processor further executing the steps of:
determining said values of said position information of said target by: determining a transmission interval between said transceiver and said transponder;
determining a calibration interval between each of said transceiver and transponder; and
determining an antenna propagation interval of each of said transceiver and transponder.

46. The portable device of claim 45 wherein said processor further executing the steps of:
determining said transmission interval based on an elapsed time between transmitting said ranging signal and receiving said reply ranging signal.

47. The portable device of claim 45 wherein said processor further executing the steps of:
determining said calibration interval based on a time interval of a period to normalize the circuitry of said transceiver and said transponder.

48. The portable device of claim 45 wherein said processor further executing the steps of:
determining said antenna propagation interval based on an elapsed time of a signal measured passing through said antenna of said transceiver and said transponder.

49. The portable device of claim 45 wherein said processor further executing the steps of:
generating a measured distance between each of said transceiver and said transponder.

50. The portable device of claim 49 wherein said processor further executing the steps of:
determining said position information of the target generated by a Virtual triangulation relationship when successive values of said position information have a predetermined logical relationship relative to said previous values between said transceiver and said transponder.

51. A mobile system for tracking a target T, comprising:
a transponder unit disposed on the target T;
a monitoring unit for monitoring the location of the target T;
a wireless communication system operating on at least one Radio Frequency (RF) band, said wireless communication system being configured to allow communication between at least two monitoring units and the target T, and a processor configured to find the target T by virtual triangulation that does not use a fixed infrastructure and based on values of position information from said monitoring unit and said transponder unit disposed on the target T.

52. The mobile system according to claim 51, wherein said processor being configured to be in communication with an antenna, said processor being configured to repeatedly determine values for said position information from: a transmission interval between said monitoring unit and the target T, a calibration interval between each of said monitoring unit and the target T, and an antenna propagation interval of said monitoring unit and the target T.

53. The mobile system according to claim 52, wherein further comprising:
means for generating values of a measured distance between units, said generating means determining said values of said measured distance between said monitoring unit and the target T based on a virtual triangulation relationship using said position information.

54. The mobile system according to claim 53, wherein said processor being configured to be in communication with an antenna, said processor being configured to repeatedly determine values for said position information from:
a transmission interval between said monitoring unit and the target T,
a calibration interval between each of said monitoring unit and the target T, and
an antenna propagation interval of said monitoring unit and the target T.

55. The mobile system according to claim 52, wherein said transmission interval is an elapsed time between transmitting said ranging signal and receiving said reply ranging signal.

56. The mobile system according to claim 52, wherein said calibration interval is a time interval of a period to normalize the circuitry of said monitoring unit and the target T.

57. The mobile system according to claim 52, wherein said antenna propagation interval is an elapsed time of a signal measured as it passes through said antenna of said monitoring unit and the target T.

58. The mobile system according to claim 52, wherein said system is configured to generate said virtual triangulation from said position information from a plurality of monitoring units or transponder units disposed on the target T.

59. The mobile system according to claim 52, further comprising a plurality of monitoring units being configured to generate said virtual triangulation from said position information based on values received from said monitoring unit, or said transponder units disposed on the target T, or transponder units adjacent the target T.

60. The mobile system according to claim 59, whereby said monitoring unit or said transponder units disposed on the target T or units adjacent the target T, are linked dynamically so as to form a mobile network adapted to locate, track and determine the position of each of said plurality of units.

61. The mobile system according to claim 60, wherein said mobile network is configured to enable a coordinated search to intercept the target T.

62. The mobile system according to claim 61, wherein said monitoring unit of said mobile network is configured having an indicator means adapted to illustrate to each of said monitoring units in a predetermined range, and said indicator means is configured to instruct respective monitoring units to move coordinately so as to converge on said target T based on said position information determined by said virtual triangulation relationship.

63. The mobile system according to claim 52, wherein said position information determines values for three points $P_1$, $P_2$ and $P_3$ so as to create a point of intersection of circles with radii $R_1$, $R_2$ and $R_3$ originating from said points $P_1$, $P_2$ and $P_3$, respectively,
whereby said point of intersection finds the target respective of each of said monitoring units.

64. The mobile system according to claim 52, wherein said processor is configured to determine virtual triangulation based on successive values of said position information using at least three points $P_1$, $P_2$ and $P_3$ of said monitoring unit respective of said transponder unit disposed on the target T.

65. The mobile system according to claim 52, wherein said processor is configured to determine virtual triangulation based on successive values of said position information of said transponder respective of said transceiver using a position ambiguity reduction (PAR) configured to find the target,
whereby said PAR obtains and corrects the direction to the location of the target T based on said values of said position information.

66. The mobile system according to claim 52, wherein said processor is configured to determine virtual triangulation based on successive values of said position information relating to the average speed of the motion of the user of said transponder unit respective of said monitoring unit.

67. The mobile system according to claim 52, wherein said processor is configured to determine virtual triangulation based on successive values of said position information relating to input of a user of said transceiver,
whereby said user input corresponds to motion of the slave unit respective of said monitoring unit.

68. The mobile system according to claim 52, wherein said processor is configured to operate on a band using a spread spectrum to establish position information signals from said slave unit respective of said monitoring unit.

69. A system for finding a target, comprising:
a tracked unit, said tracked unit being configured with a transponder and is disposed on the target;
a monitoring unit, said monitoring unit being configured with a transceiver, said monitoring unit configured for monitoring and tracking the location of the target;
a communication system configured to communicate between said transponder and said transceiver on radio frequency band, and whereby said monitoring device has means for generating a measured distance between said monitoring device and said tracked unit, said monitoring device has means for determining the monitoring and tracking of the location of the target by a virtual triangulation relationship without a need for additional points of reference and without a need for a fixed infrastructure.

70. The system for finding the target of claim 69, wherein said monitoring unit moves in a virtual triangulation pattern where successive movements of said monitoring unit are based on logical, algorithmic and mathematical relationships between said measured distance values between said monitoring unit and said tracked unit.

71. The system for finding the target of claim 69, wherein said monitoring unit includes means for generating a measured distance between locations of successive movements of said monitoring unit or between successive locations of said monitoring unit as input by the user.

72. The system for finding the target of claim 71, wherein said monitoring unit moves in a virtual triangulation pattern where successive movements of said monitoring unit are based on logical, algorithmic and mathematical relationships between said measured distance values between said monitoring unit and said tracked unit, and said distance values between said monitoring unit successive locations.

73. The system for finding the target of claim 72, wherein said monitoring unit generates visual and audio information prompts for said monitoring unit successive movement.

74. The system for finding the target of claim 73, wherein said monitoring unit generates visual and audio information that conveys said monitoring unit successive movements and said target movements, and said monitoring unit and said target relative location as well the bearing angle to the target.

75. The system for finding the target of claim 74, wherein said monitoring or tracked units are configured with GPS, compass or other position and/or direction determining devices.

76. The system for finding the target of claim 75, wherein said monitoring unit generates visual and audio information that conveys said monitoring unit and the target successive movements, relative location and or absolute location.

77. The system for finding the target of claim 75, wherein said monitoring unit generates visual and audio information that conveys said monitoring unit and the target successive movements, relative location and or absolute location.

78. The system for finding the target of claim 69, wherein any three said monitoring units are stationary and are not located on the same straight line.

79. The system for finding the target of claim 78, wherein said three stationary monitoring units can form a virtual system of coordinates in which the coordinates of the said three stationary monitoring units and the coordinates can be determined of all of the mobile monitoring units and targets that are within the communication range of said three stationary monitoring units.

80. The system for finding the target of claim 79, wherein said mobile monitoring unit generates visual and audio information prompts for said monitoring unit successive movement.

81. The system for finding the target of claim 80, wherein said mobile monitoring unit generates visual and audio information that conveys said virtual scaled coordinates together with said mobile monitoring unit and the target relative location, and successive movements of said mobile monitoring unit and said target, and said bearing angle from said mobile monitoring unit to the target, and said stationary monitoring units relative location.

82. The system for finding the target of claim 81, wherein the data processing is performed by any said monitoring unit, stationary or mobile, or in a distributed fashion.

83. The system for finding the target of claim 82, wherein said monitoring and tracked units are combined with GPS, compass or other position and/or direction determining devices.

84. The system for finding the target of claim 83, wherein each mobile or stationary monitoring unit is equipped with a compass.

85. The system for finding the target of claim 69 whereby an ambiguity zone is decreased by increasing a distance between each of points $P_1$, $P_2$ and $P_3$, said distance is increased between two of said points $P_1$, $P_2$ or $P_3$ from an approximate value of 1.75*E to 4*E to reduce said ambiguity zone formed between each of said tracked units,
  whereby E is a maximum error in said distance measured between two of said points $P_1$, $P_2$ or $P_3$, a width of said ambiguity zone is equal to E, and a length of said ambiguity zone is less than 2*E.

86. The system for finding the target of claim 69,
  whereby an ambiguity zone is reduced by increasing a distance between each of points $P_1$, $P_2$ and $P_3$, said distance is increased between two of said points $P_1$, $P_2$ or $P_3$ from an approximate value of 1.9*E to 5*E to reduce an ambiguity zone formed between each of said tracked units,
  whereby E is a maximum error said distance measured between two of said points $P_1$, $P_2$ or $P_3$, a width of said ambiguity zone is equal to E, and a length of said ambiguity zone is less than 2*E.

87. The system for finding the target of claim 86, whereby said system increases said distance measured between two of said points $P_1$, $P_2$ or $P_3$ to a large distance reduces said ambiguity zone to a square having sides equal to E.

88. The system for finding the target of claim 69,
  whereby said monitoring unit is configured with a loop back mode, said loop back mode utilizes a value representing a data processing time correction, said value for data processing time correction is determined by sending an output signal to the input of a receiver from an output of the transmitter of said monitoring unit,
  whereby said processor of said monitoring unit sends test data to the input of an encoder and starts a timer, said processor receives said output signal from said input of said receiver and stops said timer, said processor compares said test data and said received signal for a validation, said processor computing a loop back elapsed time from said timer, and said processor further corrects said loop back elapsed time by adding either of said validation or said data processing time correction, or both.

89. The system for finding the target of claim 69, whereby said monitoring unit is configured with a loop back mode, said loop back mode utilizes an output signal sent from an output of a transmitter sent to an attenuator connected directly to the input of a receiver of said monitoring unit.

90. The system for finding the target of claim 69, wherein said monitoring unit includes an interface for audio communications and telemetry information exchange so as to communicate between each of master units in the system simultaneously or independently from the operation of a processor regarding said distance measurement.

91. The system for finding the target of claim 69, wherein an interface provides communications between said monitoring unit and said tracked unit in the system simultaneously or independently from the distance measurement operation.

92. The system for finding the target of claim 91, whereby said interface provides full duplex audio communications and telemetry information exchange between said monitoring unit and said tracked unit, or between a plurality of said monitoring units in the system.

93. An integrated circuit for a wireless system for locating and tracking a subject or object, comprising:
  a receiver;
  a transmitter;
  a microprocessor having a common clock as a source of synchronization;

whereby said receiver and transmitter together define an active transponder and the integrated circuit is preferably a monolithic single die integrated circuit including said receiver, said transmitter, and said microprocessor;

said transponder supplies predetermined ranging signals to a data processor portion of said microprocessor, said transponder includes an encoder for encoding data for transmission by said transmitter, and said a receiver includes a decoder circuit for receiving and decoding signals received from said antennae, and said a data processor for determining interval and position information, said data processor comprising a digital signal processor (DSP), a voltage stabilizer, and a battery supervisor; and an antenna for propagating said ranging said signal.

94. The circuit of claim 93, wherein said data information and ranging signals determined from input signals are coupled through a band pass filter, a distance measurement unit, and said decoder.

95. The circuit of claim 94, further including a microphone coupled to an input of a summing amplifier through a low frequency amplifier, said low frequency amplifier having compression/pre-emphasis, a low pass filter and an analog switch, said analog switch is operated by said DSP to enable a user to send voice communications when a monitoring or master unit is operating in a voice mode.

96. A method of a dynamic, mobile network for tracking and locating a plurality of monitoring units and targets T, comprising:

tracking a primary target T with a primary monitoring unit having a predetermined range;

determining when said primary target T moves out of said predetermined range;

sending a ranging signal to at least one secondary monitoring unit within said predetermined range;

receiving a reply ranging signal from at least one of said secondary monitoring unit;

sending a request for a list of identified targets T to said secondary monitoring unit within a range of said secondary monitoring unit;

receiving said list of identified targets T from said secondary monitoring unit;

comparing said list of identified targets T to said primary target T;

matching said primary target T to one of said list of identified targets T from said secondary monitoring unit; and determining the location of the primary target from position information provided by said secondary monitoring unit.

97. The method of claim 96, further comprising the additional step of:

transferring tracking of said primary target to said secondary monitoring unit having said primary target in range.

98. A method for finding a target, comprising the steps of:

determining a point $P_1$ by having a user make an input to a monitoring unit;

transmitting a ranging signal from said monitoring unit;

receiving a reply ranging signal from a slave unit located on a subject or on an object at a point T, where said point T is located out of a range of said master unit;

entering a homing mode on said monitoring unit;

prompting said user to select a direction and having said user move in said direction along a path "Delta (1)" in a direction towards a point $P_2$;

actuating a step button on said monitoring unit to input once for each step taken by said user to generate reference points for a virtual triangulation calculation;

prompting said user through said master unit to stop data input of said step button when said user reaches said point $P_2$ determining using a processor of said monitoring unit whether the distance between subsequent points Delta (n) is equal or greater than (4-5)*E such that a value of said path Delta (1) is sufficiently large to minimize a position ambiguity of said point T.

99. The method for finding a target of claim 98, further comprising the step of:

prompting said user after reaching point $P_1$ randomly to go either right or left from said Point $P_1$ to a point $P_2$ in a direction away from said point T.

100. The method for finding a target of claim 99, further comprising the step of:

actuating a step button on said monitoring unit to input once for each step taken by said user going to point $P_2$ in a direction away from said point T to generate reference points for a virtual triangulation calculation.

101. The method for finding a target of claim 100, further comprising the step of:

prompting said user after reaching point $P_2$ randomly to go either right or left from said Point $P_2$ along a path "Delta (2)" to a point $P_3$ in a direction away from said point T.

102. The method for finding a target of claim 101, further comprising the step of:

actuating a step button on said monitoring unit to input once for each step taken by said user going to point $P_3$ in a direction away from said point T to generate reference points for a virtual triangulation determination.

103. The method for finding a target of claim 102, further comprising the step of:

determining a Delta (n) using a current reference unit preprogrammed in said processor and calculating said Delta (n), which is equal to the difference (P(n−1)-current position).

104. The method for finding a target of claim 103, further comprising the step of:

prompting said user after determining said Delta (n) to move in a direction toward the point T.

105. The method for finding a target of claim 104, further comprising the step of:

prompting said user repeatedly along successive points $P_{(n)}$ in a direction toward the point T using virtual triangulation, and entering a homing mode upon approaching said target T after determining said Delta (n) to move in a direction toward the target T, wherein said master unit prompts said user.

106. The method for finding a target of claim 105, further comprising the step of: requesting said slave unit to generate an audible signal upon approaching said point T in said homing mode within a predetermined range, and generating an audible signal using said slave unit.

107. The method for finding a target of claim 106, further comprising the step of: requesting said slave unit to generate an audible signal upon approaching said target point T in said homing mode within a predetermined range, and generating an audible signal using said slave unit.

108. A method for finding a target, comprising the steps of:

determining a point $P_1$ by having a user make an input to a monitoring unit;

transmitting a ranging signal from said monitoring unit;

receiving a reply ranging signal from at least three stationary slave units located on subjects or on objects at a points $T_1$, $T_2$ and $T_3$ within a predetermined range of said monitoring unit, whereby each of said points $T_1$, $T_2$ and $T_3$ form a set of virtual coordinates relative to said point $P_1$; and determining a location of said monitoring unit relative to said slave units using triangulation of points $T_1$, $T_2$ and $T_3$ and said virtual coordinates relative to said point $P_1$.

109. The method for finding a target of claim 108, further comprising the step of: transmitting a ranging signal from said monitoring unit to said slave units;
receiving a reply ranging signal from each of said slave units; and
prompting said user when said slave is out of a range of said monitoring unit.

110. The method for finding a target of claim 109, further comprising:
entering a homing mode on said monitoring unit;
prompting said user to select a direction and having said user move in said direction along a path "Delta (1)" in a direction towards a point $P_2$;
determining a Delta (n) using a current reference unit preprogrammed in said processor and calculating said Delta (n), which is equal to the difference (P(n−1)−current position); and
prompting said user after determining said Delta (n) to move in a direction toward the point $P_1$.

111. A method for finding a target, comprising the steps of:
transmitting a ranging signal from a searching monitor unit $M_S$;
receiving a reply ranging signal from at least three stationary slave units located on subjects or on objects at a points $P_1$, $P_2$ and $P_3$ within a predetermined range of said searching monitor unit $M_S$,
whereby each of said points $P_1$, $P_2$ and $P_3$ form a set of virtual coordinates relative to said point $P_1$;
determining said points $P_1$ and $P_2$ relative to said searching monitor unit $M_S$ having virtual coordinates X and Y using a processor of said searching monitor unit $M_S$;
determining a location of a mobile slave unit disposed on a subject forming a tracked target T, said target T having virtual coordinates are $T_y$ and $T_x$;
determining a location of said searching monitor unit $M_S$ relative to said tracked target T using said virtual coordinates formed by said stationary slave units and said virtual coordinates are $M_{Sxy}$ and $S_{my}$ for said searching monitor unit $M_S$.

112. The method for finding a target of claim 111, further comprising the step of:
determining a location of three stationary master units $M_1$, $M_2$ and $M_3$,
whereby said master unit $M_1$ is separated from said master unit $M_2$ by a distance $D_{12}$, said master unit $M_1$ is separated from said master unit $M_3$ by a distance $D_{13}$, said master unit $M_2$ is separated from said master unit $M_3$ by a distance $D_{23}$.

113. The method for finding a target of claim 112, further comprising the step of: determining a distance $Ms\_R_1$, $Ms\_R_2$ and $Ms\_R_3$ between said searching monitor unit Ms and said master units $M_1$, $M_2$ and $M_3$, respectively.

114. The method for finding a target of claim 113, further comprising the step of: determining a distance $T\_R_1$, $T\_R_2$ and $T\_R_3$ between said target T and said master units $M_1$, $M_2$ and $M_3$, respectively.

115. The method for finding a target of claim 114, further comprising the step of: determining position ambiguity between said master units $M_1$, $M_2$ and $M_3$ and said distances $D_{12}$, $D_{13}$ and $D_{23}$ so as to minimize ambiguity error between said target T distances $T\_R_1$, $T\_R_2$ and $T\_R_3$ and said master units $M_1$, $M_2$ and $M_3$, respectively.

116. The circuit of claim 115, wherein said data information and ranging signals determined from input signals are coupled through a band pass filter, a distance measurement unit, and said decoder.

117. The system of claim 1, wherein the target is stationary.

118. The system of claim 1, wherein the target is a moving target.

119. The system of claim 1, wherein multiple transponders are used such that at least one of the transponders is used as a reference point.

120. The system of claim 1, wherein multiple transceivers are used such that at least one of the transceivers is used as a reference point.

121. The system of claim 1, wherein multiple transponders are used such that at least one of the transponders is used as a reference point.

122. The system of claim 1, wherein the transceiver receives an input for determining its own position in real time.

123. The system claim 1, wherein the transceiver includes a device for determining its absolute position.

124. The system claim 123, wherein the device is a GPS receiver.

125. The system claim 1, wherein the transceiver includes a device for determining its direction of movement.

126. The system claim 125, wherein the device is a compass.

127. The system of claim 1, wherein the processor determines the virtual triangulation based on successive values of the position information with minimal interaction with a user of the transceiver.

128. The system of claim 1, wherein the virtual triangulation uses an average speed of a motion of the transceiver.

129. The system of claim 1, wherein the virtual triangulation relies on a Point Search technique.

130. The system of claim 1, wherein the virtual triangulation relies on a successive pattern movement.

131. The system of claim 1, wherein the virtual triangulation relies on a successive pattern movement with minimal user unit interaction.

* * * * *